(12) United States Patent
Roper, Jr. et al.

(10) Patent No.: US 12,259,995 B2
(45) Date of Patent: Mar. 25, 2025

(54) SECURING AN INTERCONNECTED DIGITAL ENGINEERING AND CERTIFICATION ECOSYSTEM

(71) Applicant: Istari Digital, Inc., Charleston, SC (US)

(72) Inventors: William Roper, Jr., Charleston, SC (US); Christopher Lee Benson, Arlington, VA (US); Sriram Krishnan, Cambridge, MA (US); Omar Valverde, Fairfax, VA (US); Ellie Marie Daw, Kirkland, WA (US); Mohammad Zahra, Amman (JO); James C. Pavur, Arlington, VA (US); Danne Stayskal Huffaker, Eastsound, WA (US); Brendan Lee, Kenmore, WA (US)

(73) Assignee: Istari Digital, Inc., Charleston, SC (US)

( * ) Notice: Subject to any disclaimer, the term of this patent is extended or adjusted under 35 U.S.C. 154(b) by 0 days.

(21) Appl. No.: 18/793,542

(22) Filed: Aug. 2, 2024

(65) Prior Publication Data
US 2025/0045441 A1   Feb. 6, 2025

Related U.S. Application Data

(60) Provisional application No. 63/530,863, filed on Aug. 4, 2023.

(51) Int. Cl.
*G06F 21/62* (2013.01)
(52) U.S. Cl.
CPC .. *G06F 21/6218* (2013.01); *G06F 2221/2141* (2013.01)
(58) Field of Classification Search
None
See application file for complete search history.

(56) References Cited

U.S. PATENT DOCUMENTS 7,787,888 B2   8/2010 Haran et al.
8,229,984 B2   7/2012 Khader et al.
(Continued)

FOREIGN PATENT DOCUMENTS

EP   3920051   12/2021
EP   4178155   5/2023
(Continued)

OTHER PUBLICATIONS

US 11,061,891 B2, 07/2021, Yan (withdrawn)
(Continued)

*Primary Examiner* — William J. Goodchild
(74) *Attorney, Agent, or Firm* — Fish & Richardson P.C.

(57) ABSTRACT

Methods, systems, and apparatus, including computer programs encoded on computer storage media, for secure communications in a digital engineering ecosystem. In some implementations, a digital platform receives a request from a user device to interact with a digital model. The digital platform determines whether a user operating the user device is authorized. In response to determining the user is authorized to access the digital platform, the digital platform generates a token that provides the user with access to the digital platform. The digital platform determines whether the request includes malicious activity. In response to determining that the request is absent of the malicious activity, the digital platform executes a digital thread that executes one or more operations using digital tools and the digital model. The digital platform provides data indicative of the one or more operations executing the digital thread to the user device.

25 Claims, 44 Drawing Sheets

(56) References Cited

U.S. PATENT DOCUMENTS

| | | |
|---|---|---|
| 8,296,563 B2 | 10/2012 | Tu et al. |
| 8,315,794 B1 | 11/2012 | Strelow et al. |
| 8,627,484 B2 | 1/2014 | Beckley et al. |
| 9,524,648 B1 | 12/2016 | Gopalakrishnan et al. |
| 9,689,686 B1 | 6/2017 | Carmack et al. |
| 9,725,171 B1 | 8/2017 | Carmack et al. |
| 9,764,837 B2 | 9/2017 | Phan et al. |
| 9,847,033 B1 | 12/2017 | Carmack et al. |
| 9,849,978 B1 | 12/2017 | Carmack et al. |
| 9,902,495 B2 | 2/2018 | Phan et al. |
| 10,017,266 B2 | 7/2018 | Phan et al. |
| 10,035,596 B2 | 7/2018 | Phan et al. |
| 10,065,726 B1 | 9/2018 | Phan et al. |
| 10,198,011 B2 | 2/2019 | DeBitetto et al. |
| 10,266,262 B2 | 4/2019 | Phan et al. |
| 10,308,358 B2 | 6/2019 | Phan et al. |
| 10,400,840 B2 | 9/2019 | Davis et al. |
| 10,437,953 B2 | 10/2019 | Irissou et al. |
| 10,452,802 B2 | 10/2019 | Irissou et al. |
| 10,469,007 B2 | 11/2019 | Nayfeh et al. |
| 10,571,932 B2 | 2/2020 | DeBitetto et al. |
| 10,708,068 B2 | 7/2020 | Cheng et al. |
| 10,747,201 B2 | 8/2020 | Biernat et al. |
| 10,764,160 B1 | 9/2020 | Shtrauch et al. |
| 10,796,266 B2 | 10/2020 | Lamkin et al. |
| 10,853,536 B1 | 12/2020 | Steingrimsson et al. |
| 10,928,803 B2 | 2/2021 | Biernat et al. |
| 10,984,016 B2 | 4/2021 | Gunther |
| 11,055,279 B2 | 7/2021 | Yan |
| 11,139,980 B2 | 10/2021 | Herrin et al. |
| 11,144,540 B2 | 10/2021 | Yan |
| 11,250,336 B2 | 2/2022 | Guim et al. |
| 11,329,995 B2 | 5/2022 | Zhang |
| 11,356,275 B2 | 6/2022 | Valdez et al. |
| 11,429,565 B2 | 8/2022 | Kaguma et al. |
| 11,468,048 B2 | 10/2022 | Yan |
| 11,468,528 B2 | 10/2022 | Salvo et al. |
| 11,475,176 B2 | 10/2022 | Glunz |
| 11,481,651 B2 | 10/2022 | Donoho et al. |
| 11,496,291 B2 | 11/2022 | Chakra et al. |
| 11,544,291 B2 | 1/2023 | Iftemi |
| 11,775,707 B1 | 10/2023 | Roper et al. |
| 11,855,971 B2 | 12/2023 | Harris et al. |
| 11,861,026 B2 | 1/2024 | Adkins et al. |
| 2002/0099952 A1* | 7/2002 | Lambert ............... G06F 21/53 726/27 |
| 2003/0233418 A1 | 12/2003 | Goldman |
| 2004/0217850 A1 | 11/2004 | Perttunen et al. |
| 2005/0251494 A1 | 11/2005 | Maria Jansen |
| 2008/0228521 A1 | 9/2008 | Wilmering et al. |
| 2010/0257581 A1 | 10/2010 | Leconte et al. |
| 2011/0023016 A1 | 1/2011 | Khader et al. |
| 2011/0032870 A1 | 2/2011 | Kumar |
| 2012/0159156 A1* | 6/2012 | Barham ............... G06F 21/604 726/4 |
| 2012/0167207 A1 | 6/2012 | Beckley et al. |
| 2012/0201477 A1 | 8/2012 | Jesneck et al. |
| 2013/0002477 A1 | 1/2013 | Dehnie et al. |
| 2013/0011078 A1 | 1/2013 | Phan et al. |
| 2014/0044340 A1 | 2/2014 | Phan et al. |
| 2014/0142881 A1 | 5/2014 | Storm |
| 2014/0325656 A1 | 10/2014 | Sallam |
| 2015/0229619 A1 | 8/2015 | Costa et al. |
| 2016/0091894 A1 | 3/2016 | Zhang et al. |
| 2016/0188686 A1 | 6/2016 | Hopkins et al. |
| 2016/0299233 A1 | 10/2016 | Levien et al. |
| 2017/0214701 A1 | 7/2017 | Hasan |
| 2018/0011948 A1 | 1/2018 | Irissou et al. |
| 2018/0011958 A1 | 1/2018 | Irissou et al. |
| 2018/0060573 A1 | 3/2018 | Roger et al. |
| 2018/0373866 A1 | 12/2018 | Sweeney et al. |
| 2019/0199756 A1 | 6/2019 | Correnti et al. |
| 2019/0340269 A1 | 11/2019 | Biernat et al. |
| 2020/0169408 A1 | 5/2020 | Herrin et al. |
| 2020/0213110 A1 | 7/2020 | Cage et al. |
| 2020/0226220 A1 | 7/2020 | Eck et al. |
| 2020/0286049 A1 | 9/2020 | Basu et al. |
| 2020/0380080 A1 | 12/2020 | Glunz |
| 2020/0382961 A1 | 12/2020 | Shattil et al. |
| 2021/0075825 A1 | 3/2021 | Davis |
| 2021/0103603 A1 | 4/2021 | Iftemi |
| 2021/0349442 A1 | 11/2021 | Tarnofsky et al. |
| 2022/0038260 A1 | 2/2022 | Chakra et al. |
| 2022/0067249 A1 | 3/2022 | Steingrimsson et al. |
| 2022/0092450 A1 | 3/2022 | Donoho et al. |
| 2022/0334764 A1 | 10/2022 | Sadeh-Weinraub et al. |
| 2023/0008331 A1 | 1/2023 | Gupta et al. |
| 2023/0017142 A1 | 1/2023 | Dunn et al. |
| 2023/0028912 A1 | 1/2023 | Steingrimsson et al. |
| 2023/0067777 A1 | 3/2023 | Hadar et al. |
| 2023/0132505 A1 | 5/2023 | Lee et al. |
| 2023/0419304 A1 | 12/2023 | Cella et al. |
| 2024/0076056 A1 | 3/2024 | Roper, Jr. et al. |
| 2024/0135058 A1 | 4/2024 | Roper, Jr. et al. |
| 2024/0135059 A1 | 4/2024 | Roper, Jr. et al. |
| 2024/0135061 A1 | 4/2024 | Roper, Jr. et al. |
| 2024/0135063 A1 | 4/2024 | Roper, Jr. et al. |
| 2024/0135071 A1 | 4/2024 | Roper, Jr. et al. |

FOREIGN PATENT DOCUMENTS

| | | |
|---|---|---|
| GB | 2595984 | 12/2021 |
| WO | WO 2018163044 | 9/2018 |
| WO | WO 2019217323 | 11/2019 |

OTHER PUBLICATIONS

[No Author Listed], "Advisory Circular," U.S. Dept. of Transportation Federal Aviation Administration, Oct. 2014, 23 pages.

[No Author Listed], "Department of Defense Handbook, Airworthiness Certification Criteria," MIL-HDBK-516C 4.1.4 & 5.2 failure conditions, Dec. 12, 2014, 527 pages.

[No Author Listed], "Department of Defense Joint Service Specification Guide, Aircraft Structures," JSSG-2006, Oct. 30, 1998, 497 pages.

[No Author Listed], "EN 1090—part 1-5, Execution of steel structures and aluminum structures," European Standards, 2012, 7 pages (abstract only).

[No Author Listed], "IEC 60601-1-11:2015, Medical electrical equipment," International Organization for Standardization, Jan. 2015, 109 pages (abstract only).

[No Author Listed], "IEC 62304:2006, Medical device software, Software life cycle processes," International Organization for Standardization, May 2006, 151 pages (abstract only).

[No Author Listed], "ISO 10204:2017, Iron ores, Determination of magnesium, Flame atomic absorption spectrometric method," International Organization for Standardization, Jul. 2017, 14 pages (abstract only).

[No Author Listed], "ISO 10993-1:2018, Biological evaluation of medical devices, Part 1: Evaluation and testing within a risk management process," International Organization for Standardization, Oct. 2018, 41 pages (abstract only).

[No Author Listed], "ISO 11135:2014, Sterilization of health-care products, Ethylene oxide, Requirements for the development, validation and routine control of a sterilization process for medical devices," International Organization for Standardization, Jul. 2014, 78 pages (abstract only).

[No Author Listed], "ISO 11137-1:2006, Sterilization of health care products, Radiation," International Organization for Standardization, Apr. 2006, 37 pages (abstract only).

[No Author Listed], "ISO 11607-1:2019, Packaging for terminally sterilized medical devices," International Organization for Standardization, Feb. 2019, 44 pages (abstract only).

[No Author Listed], "ISO 13485:2016, Medical devices, Quality management systems, Requirements for regulatory purposes," International Organization for Standardization, Mar. 2016, 36 pages (abstract only).

[No Author Listed], "ISO 14004:2016 Environmental management systems, General guidelines on implementation," International Organization for Standardization, Mar. 2016, 59 pages (abstract only).

(56) References Cited

OTHER PUBLICATIONS

[No Author Listed], "ISO 14971:2019, Medical devices, Application of risk management to medical devices," International Organization for Standardization, Dec. 2019, 36 pages (abstract only).
[No Author Listed], "ISO 15223-1:2021, Medical devices, Symbols to be used with information to be supplied by the manufacturer, Part 1: General requirements," International Organization for Standardization, Feb. 2022, 36 pages (abstract only).
[No Author Listed], "ISO 9001:2015, Quality management systems, Requirements," International Organization for Standardization, Sep. 2015, 29 pages (abstract only).
[No Author Listed], "ISO 9013:2017, Thermal cutting, Classification of thermal cuts, Geometrical product specification and quality tolerances," International Organization for Standardization, Feb. 2017, 28 pages (abstract only).
Aaf.dau.edu [online], "Major Capability Acquisition (MCA)," available on or before Dec. 7, 2020, retrieved on May 28, 2024, retrieved from URL<https://aaf.dau.edu/aaf/mca>, 5 pages.
Aaf.dau.edu [online], "Technical Reviews and Risk Assessments," available on or before Jan. 21, 2021, retrieved on May 28, 2024, retrieved from URL<https://aaf.dau.edu/aaf/mca/tech-reviews/>, 7 pages.
Ansys [online], "Ansys Systems Tool Kit (STK)," retrieved online Nov. 14, 2022, retrieved from URL <https://www.ansys.com/products/missions/ansys-stk#tab1-2>, 4 pages.
Ansys [online], "Artificial Intelligence, Machine Learning and Deep Learning," retrieved on Nov. 14, 2022, retrieved from URL <https://www.ansys.com/technology-trends/artificial-intelligence-machine-learning-deep-learning>, 9 pages.
Benson et al., "Data-Driven Investment Decision-Making: Applying Moore's Law and S-Curves to Business Strategies," White Paper, May 2018, 32 pages.
Benson et al., "On Improvement Rates for Renewable Energy Technologies: Solar PV, Wind Turbines, Capacitors, and Batteries," Renewable Energy, Aug. 2014, 8 pages.
Benson et al., "Quantitative Determination of Technological Improvement from Patent Data," PLoS One, Apr. 2015, 10(4), 23 pages.
Binance.com [online], "logo Algorand (ALGO)," Jun. 21, 2019, retrieved on May 28, 2024, retrieved from URL<https://research.binance.com/en/projects/algorand>, 11 pages.
Cdsco.gov.in [online], "Central Drugs Standard Control Organization," available on or before Aug. 1, 2018, retrieved on Apr. 4, 2024, retrieved from URL<https://cdsco.gov.in/opencms/opencms/en/Home>, 1 page.
Code of Federal Regulations, Title 14, Part 25, "Airworthiness Standards: Transport Category Airplanes," Federal Aviation Administration, DOT, Jan. 2021, 276 pages.
coinbureau.com [online], "Algorand Review: Is Algo the Future of Finance?," Jan. 23, 2024, retrieved on May 28, 2024, retrieved from URL<https://www.coinbureau.com/review/algorand>, 53 pages.
Construction Products Regulation (CPR) [online], "CPR / EN 1090," retrieved on Nov. 14, 2022, retrieved from URL <https://www.eco-cert.it/en/servizi/en-1090-certification-for-steel-or-aluminium-structural-components/>, 4 pages.
Cpsc.gov [online], "General Certificate of Conformity," available on or before Jan. 20, 2014, retrieved on Apr. 4, 2024, retrieved from URL<https://www.cpsc.gov/Business--Manufacturing/Testing-Certification/General-Certificate-of-Conformity>, 4 pages.
Dassault Systèmes [online], "Cameo Systems Modeler," retrieved on Nov. 11, 2022, retrieved from URL <https://www.3ds.com/products-services/catia/products/no-magic/cameo-systems-modeler/>, 7 pages.
Dassault Systèmes [online], "Solidworks 3D CAD Software," retrieved on Nov. 16, 2022, retrieved from URL <https://www.solidworks.com/product/solidworks-3d-cad>, 11 pages.
Daubert et al., "HoneyDrone: A Medium Interaction Unmanned Aerial Vehicle Honeypot," NOMS 2018—2018 IEEE/IFIP Network Operations and Management Symposium, Apr. 2018, 6 pages.

Daytonaero.com [online], "Airworthiness Circular, SUAS AW Assessments," Jul. 31, 2020, retrieved on May 28, 2024, retrieved from URL<https://daytonaero.com/wp-content/uploads/AC-20-02.pdf>, 13 pages.
Daytonaero.com [online], "United States Air Force (USAF) Airworthiness Bulletin (AWB)-350," Jul. 31, 2020, retrieved on May 28, 2024, retrieved from URL<https://daytonaero.com/wp-content/uploads/AWB-350.pdf>, 5 pages.
Defense Acquisition University [online], "Technical Reviews Across the Acquisition Lifecycle," Sep. 3, 2021, retrieved on May 28, 2024, retrieved from URL<https://www.youtube.com/watch?v=hplD891ZYuE>, 147 pages.
Defense Acquisition University, "Defense Acquisition System: DoD 5000 Policies," retrieved on Nov. 10, 2022, retrieved from URL <https://aaf.dau.edu/aaf/policies/>, 6 pages.
Developer.apple.com [online], "App Sandbox," available on or before Apr. 5, 2020, retrieved on May 28, 2024, retrieved from URL<https://developer.apple.com/documentation/security/app_sandbox>, 5 pages.
Doyle et al., "LLIMAS: Revolutionizing Integrating Modeling and Analysis at MIT Lincoln Laboratory," Optomechanical Engineering 2017, Aug. 2017, 10371(1), 11 pages.
Euromoney.com [online], "What is blockchain?" Feb. 29, 2020, retrieved on May 28, 2024, retrieved from URL<https://www.euromoney.com/learning/blockchain-explained/what-is-blockchain>, 2 pages.
Federal Aviation Administration, "Aeroelastic Stability Substantiation of Transport Category Airplanes," Advisory Circular, AC No. 25.629-18, Oct. 27, 2014, 23 pages.
Federal Communications Commission [online], "Equipment Authorization Procedures," retrieved on Nov. 14, 2022, retrieved from URL <https://www.fcc.gov/general/equipment-authorization-procedures-0#:~:text=A%20Declaration%20of%20Conformity%20is,with%20the%20appropriate%20technical%20standards>, 2 pages.
Ferguson, "Seven Ways in Which Artificial Intelligence Will Change Engineering Forever," Siemens, Feb. 14, 2020, 5 pages.
Flaherty et al., "Solid geometry morphing for specialized optomechanical design using LLIMAS," Optomechanics and Optical Alignment, August 20121, 11816(1), 22 pages.
Fox et al., "Test and Evaluation Trends and Costs for Aircraft and Guided Weapons," Rand Project Air Force, 2004, 233 pages.
Garrick et al., "Historical development of aircraft flutter," J. Aircr., Nov. 1981, 18(11):897-912.
Goatboy29 [online], "MachUp—Free Online Aircraft Design Program," FliteTest.com, retrieved on Nov. 16, 2022, retrieved from URL <https://www.flitetest.com/articles/machup-free-online-aircraft-design-program>, May 25, 2018, 11 pages.
Goodwins, "114 Billion Transistors, One Big Meh. Apple's M1 Ultra Wake-up Call," The Register, Mar. 14, 2022, 6 pages.
GovInfo.gov [online], "Airworthiness Standards: Transport Category Airplanes," 2021, retrieved on Jul. 19, 2023, retrieved from URL<https://www.govinfo.gov/content/pkg/CFR-2021-title14-vol1/pdf/CFR-2021-title14-vol1-part25.pdf>, 276 pages.
Hart, "Introduction to Model-Based System Engineering (MBSE) and SysML," Delaware Valley INCOSE Chapter Meeting, Jul. 30, 2015, 43 pages.
IBM [online], "IBM Doors," retrieved online Nov. 16, 2022, retrieved from URL <https://www.ibm.com/products/requirements-management>, 2 pages.
Iecee.org [online], "CB scheme," available on or before Feb. 21, 2023, retrieved on Apr. 4, 2024, retrieved from URL<https://www.iecee.org/who-we-are/cb-scheme>, 3 pages.
International Electrotechnical Commission (IEC) [online], "About IECEE," IEC System of Conformity Assessment Schemes for Electrotechnical Equipment and Components (IECEE), retrieved online Nov. 14, 2022, retrieved from URL <https://www.iecee.org/about/what-it-is/>, 2 pages.
International Search Report and Written Opinion in International Appln. No. PCT/US2023/73513, mailed on Nov. 20, 2023, 16 pages.
International Search Report and Written Opinion in International Appln. No. PCT/US2023/77750, mailed on Mar. 1, 2024, 9 pages.

(56) References Cited

OTHER PUBLICATIONS

International Search Report and Written Opinion in International Appln. No. PCT/US2024/019234, mailed on Jun. 21, 2024, 16 pages.
International Trade Administration [online], "Certifying Your Product with CE Marking," retrieved on Nov. 14, 2022, retrieved from URL <https://www.trade.gov/ce-marking, 5 pages.
Kevan [online], "Can AI Take Simulation to a New Level?" Digital Engineering 247, retrieved on Nov. 10, 2022, retrieved from URL <https://www.digitalengineering247.com/article/can-ai-take-simulation-to-a-new-level/>, Nov. 16, 2020, 11 pages.
La Rocca, "Knowledge based engineering: Between AI and CAD. Review of a language based technology to support engineering design," Advanced engineering informatics, Apr. 2012, 26(2):159-179 (Abstract Only).
Leonardo R. [online], "ANSYS and NVIDIA: Closing the Gap between CAE and GAMES," Linkedin.com, retrieved on Nov. 10, 2022, retrieved from URL <https://www.linkedin.com/pulse/early-guess-breaking-boundary-between-cae-games-leonardo-rosa/>, Sep. 10, 2017, 17 pages.
Light et al., "Trends in U.S. Air Force Aircraft Mishap Rates (1950-2018)," Rand Corporation, Jan. 2020, 16 pages.
ll.mit.edu [online], "Air, Missile, And Maritime Defense Technology," 2022, retrieved on Jul. 19, 2023, retrieved from URL<https://www.ll.mit.edu/r-d/air-missile-and-maritime-defense-technology>, 10 pages.
ll.mit.edu [online], "Flight Test Facility, Lincoln Laboratory, Massachusetts Institute of Technology," 2022, retrieved on Jul. 19, 2023, retrieved from URL<https://www.ll.mit.edu/about/facilities/flight-test-facility>, 3 pages.
ll.mit.edu [online], "Lincoln Laboratory Supercomputing Center," 2022, retrieved on Jul. 19, 2023, retrieved from URL <https://www.ll.mit.edu/about/facilities/lincoln-laboratory-supercomputing-center>, 3 pages.
Macstories.net [online], "The Initial iPhone SDK," Mar. 15, 2018, retrieved on May 28, 2024, retrieved from URL<https://www.macstories.net/stories/the-initial-iphone-sdk/>, 6 pages.
Medium.com [online], "K-Scripts: The fastest and most flexible way to articulate a user experience," Oct. 6, 2016, retrieved on May 28, 2024, retrieved from URL<https://medium.com/@bladekotelly/k-scripts-the-fastest-and-most-flexible-way-to-articulate-a-user-experience-97264d9c4786>, 15 pages.
Medium.datadriveninvestor.com [online], "GPT Zero Is Designed To Recognize Texts Written By AI," Jan. 12, 2023, retrieved on Mar. 15, 2024, retrieved from URL<https://medium.datadriveninvestor.com/gpt-zero-is-designed-to-recognize-texts-written-by-ai-ab7ff4d11fd6>, 7 pages (preview only).
Mitre.org [online], "Systems Engineerings Innovation Center," retrieved on Nov. 10, 2022, retrieved from URL: <https://www.mitre.org/publications/systems-engineering-guide/se-lifecycle-building-blocks/test-and-evaluation/verification-and-validation>, 4 pages.
Mobin et al., "An approach for design Verification and Validation planning and optimization for new product reliability improvement," Reliability Engineering & System Safety, Oct. 2019, 190: 14 pages.
National Security Commission on Artificial Intelligence, "Final Report," Mar. 2021, 756 pages.
NVIDIA.Developer [online], "CUDA Toolkit," retrieved on Nov. 10, 2022, retrieved from URL <https://developer.nvidia.com/cuda-toolkit>, 8 pages.
Oertel et al., "Paper: Interoperable Requirements Engineering: Tool Independent Specification, Validation and Impact Analysis," Paper, Presented at Proceedings of the Embedded World 2012 Exhibition and Conference, Nuremberg, Germany, Feb. 28-Mar. 1, 2012, 4 pages.
OSLC [online], "Open Services for Lifecycle Collaboration," retrieved online Nov. 10, 2022, retrieved from URL <https://open-services.net/>, 11 pages.
Palau et al., "Introduction to Interoperability for Heterogeneous IOT Platforms," Springer Nature Switzerland AG, Dec. 2021, 26 pages.
PCT [online], "ThingWorx IIOT Platform," retrieved on Nov. 16, 2022, retrieved from URL <https://www.ptc.com/en/resources/iiot/product-brief/thingworx-platform>, 3 pages.
Pergatory.mit.edu [online], "FUNdaMENTALS of Design Topic 2 Creating Ideas," Jan. 1, 2008, retrieved on May 28, 2024, retrieved from URL<https://pergatory.mit.edu/resources/FUNdaMENTALs%20Book%20pdf/FUNdaMENTALs%20Topic%202.PDF>, 75 pages.
PTC [online], "Vuforia: Market-Leading Enterprise AR," retrieved on Nov. 11, 2022, retrieved from URL <https://www.ptc.com/en/products/vuforia>, 7 pages.
Roper [online], "Exclusive: AI Just Controlled a Military Plane for the First Time Ever," Popular Mechanics, retrieved Nov. 10, 2022, retrieved from URL <https://www.popularmechanics.com/military/aviation/a34978872/artificial-intelligence-controls-u2-spy-plane-air-force-exclusive/>, Dec. 16, 2020, 20 pages.
Roper, "Bending the Spoon: Guidebook for Digital Engineering," Jan. 19, 2021, 19 pages.
Roper, "There is No Spoon: The New Digital Acquisition Reality," Oct. 7, 2020, 19 pages.
Siemens [online], "TeamCenter Software," retrieved on Nov. 16, 2022, retrieved from URL <https://www.plm.automation.siemens.com/global/en/products/teamcenter/>, 18 pages.
U.S. Dept. of Commerce, "Protecting Controlled Unclassified Information in Nonfederal Systems and Organizations," NIST Special Publication 800-171, Revision 2, Feb. 2020, 114 pages.
U.S. Dept. of Commerce, "Security and Privacy Controls for Information Systems and Organizations," NIST Special Publication 800-53, Revision 5, Sep. 2020, 492 pages.
U.S. Food and Drug Administration [online], "Development & Approval Process Drugs," retrieved on Nov. 14, 2022, retrieved from URL <https://www.fda.gov/drugs/development-approval-process-drugs>, Aug. 8, 2022, 4 pages.
United States Consumer Product Safety Commission [online], "General Certificate of Conformity," retrieved on Nov. 14, 2022, retrieved from URL <https://www.cpsc.gov/Business--Manufacturing/Testing-Certification/General-Certificate-of-Conformity>, 4 pages.
Unreal Engine 5 [online], "Unreal Engine API Reference," Unreal Engine 5 Early Access Documentation, retrieved on Nov. 10, 2022, retrieved from <https://docs.unrealengine.com/5.0/en-US/API/>, 67 pages.
Voss et al., "Investigation on flutter stability of the DLR-F19/SACCON configuration," Aerospace Science and Technology, 2019, 93:105320, 11 pages.
Wikipedia [online], "Systems Modeling Language," Wikipedia reference, retrieved on Nov. 14, 2022, retrieved from URL <https://en.wikipedia.org/wiki/Systems_Modeling_Language>, 5 pages.
International Search Report and Written Opinion in International Appln. No. PCT/US2024/040862, mailed on Oct. 18, 2024, 16 pages.

* cited by examiner

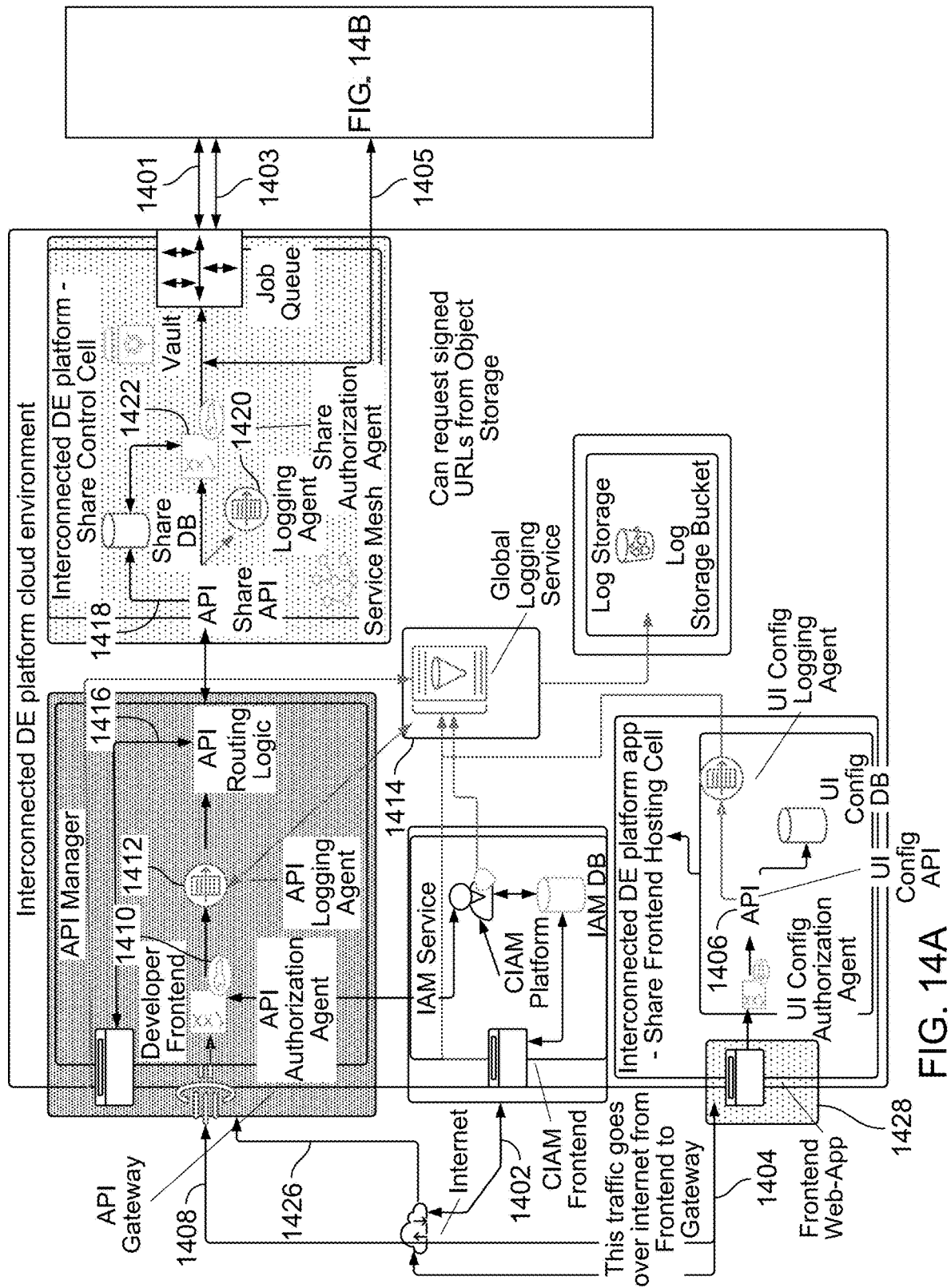

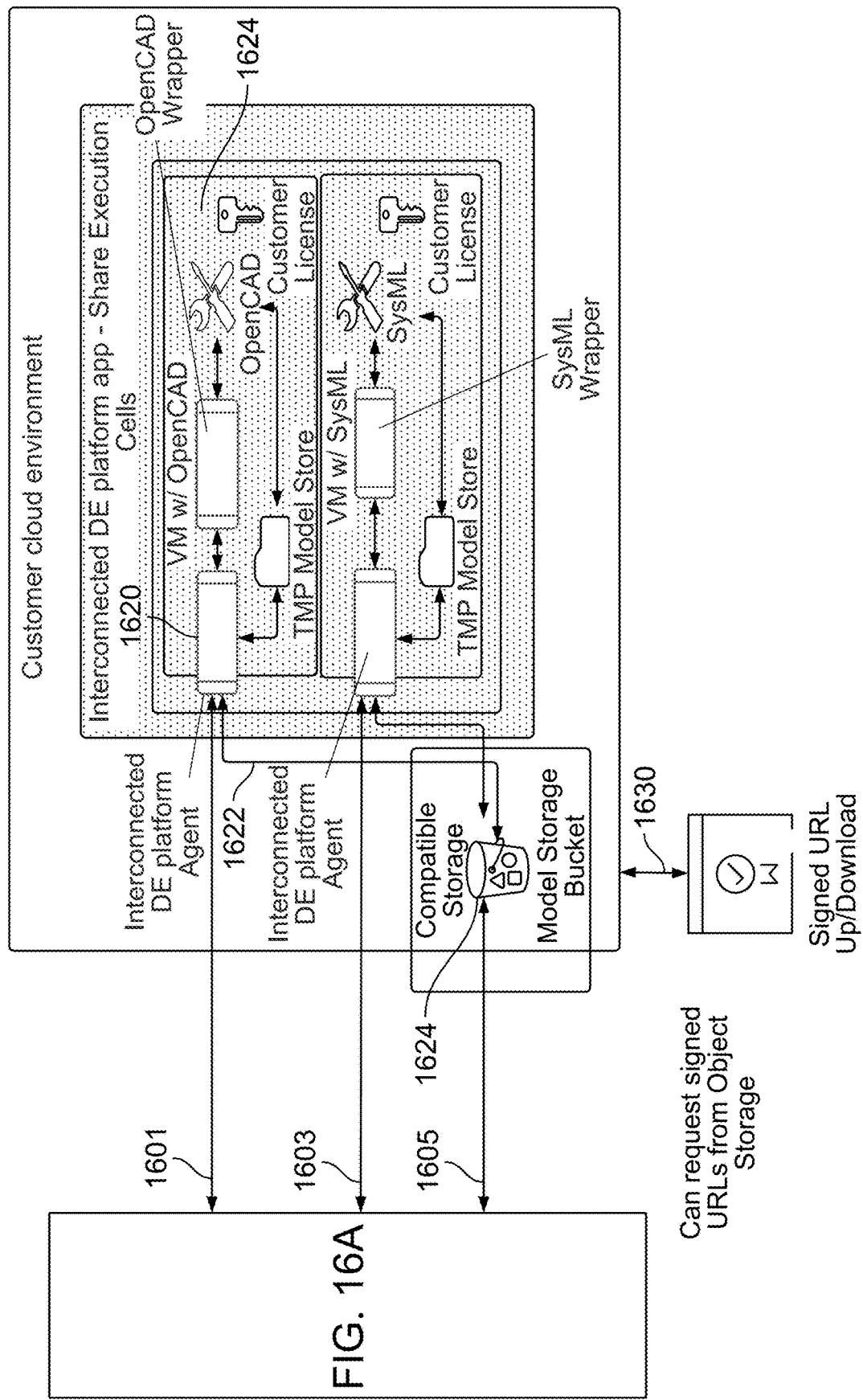

3002

Embodiment with IDENTITY/TRANSACTION BLOCKCHAIN

3012
Stand up a secure separate storage for models and blockchain to securely store series pointers or memory addresses related the stored in storage.

3014
Mint an NFT representing a pointer to the model in database after transaction execution. It can have sub-traits that contain information regarding metrics hit, certification, or certain public properties.

3016
Transaction executions that happen on a model are recorded the blockchain. Consensus mechanisms can be used to validate blocks chain.

3018
Customers can link to the main platform blockchain and validate actions that happen a model by checking whether cryptographic hash of or model-type file matches stored with corresponding transaction block 3020
Once the system verifies and validates a model, transaction is then certified new NFT can be minted to reflect model after validated occurred.

3022
Transactions that update or change a model result in newly minted NFT, which could contain different ancillary information than the NFT representing original model.

FIG. 30 (Cont.)

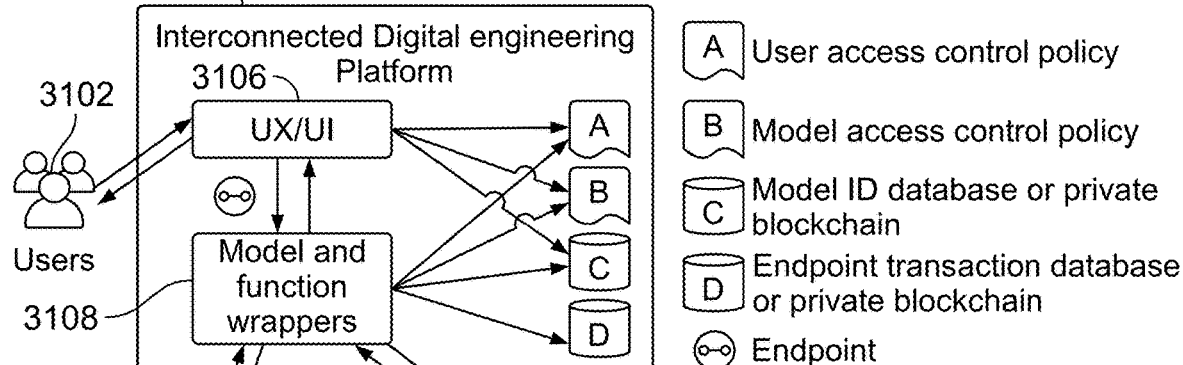
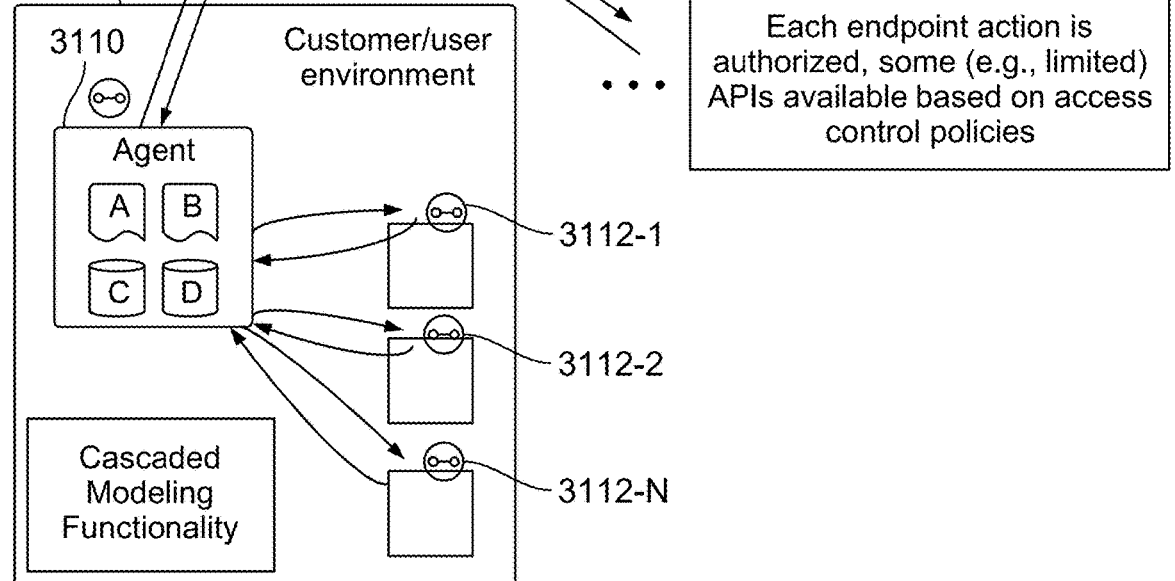
FIG. 31

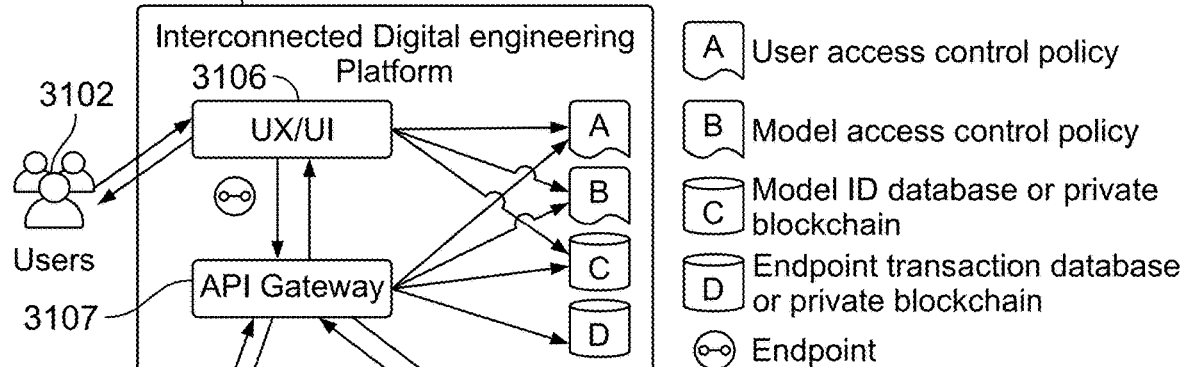
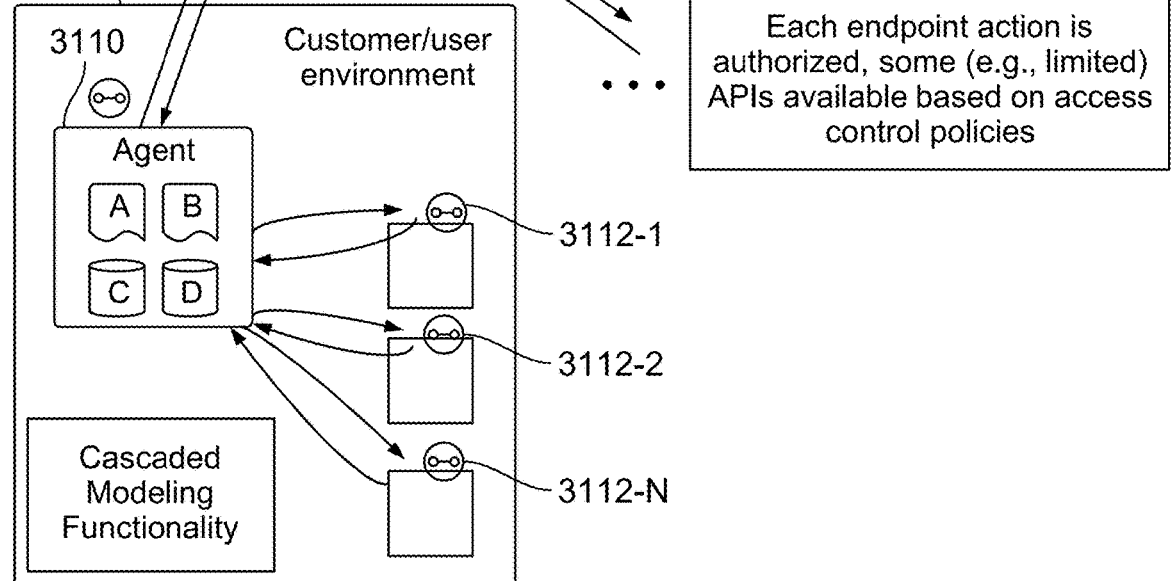
FIG. 32

Example Model Types and File Extensions for Steps of a
Data Flow Generated by Digital Thread

| Stage | Document Type | File Formats |
|---|---|---|
| Requirements Analysis | Functional flow block diagram (FFBD) | .vsd (Visio), .dia (Dia), .mm (FreeMind) |
| Requirements Analysis | Use case model | .uml (Unified Modeling Language), .docx (Microsoft Word), .pdf (Adobe |
| Requirements Analysis | Requirements traceability matrix (RTM) | .xlsx (Microsoft Excel), .ods (OpenOffice), .csv (Comma |
| Requirements Analysis | Systems modeling language (SysML) | .xml (eXtensible Markup Language), .uml (Unified Modeling Language) |
| Requirements Analysis | User stories | .txt (Plain text), .md (Markdown), .docx (Microsoft Word) |
| Concept Development | Concept of operations (ConOps) | .docx (Microsoft Word), .pdf (Adobe Acrobat), .pptx PowerPoint) |
| Concept Development | System architecture diagram | .vsd (Visio), .dia (Dia), .mm (FreeMind) |
| Concept Development | Block definition diagram (BDD) | .uml (Unified Modeling Language) |
| Concept Development | Object-oriented analysis (OOA) | .uml (Unified Modeling Language) |
| System design | Technical data package (TDP) | .pdf (Adobe Acrobat), .docx (Microsoft Word), .xlsx Excel) |
| Implementation | Source code | .java (Java), .py (Python), .c (C), .cpp (C++) |
| Verification and Validation | Test plans and procedures | .docx (Microsoft Word), .pdf (Adobe Acrobat), .xlsx Excel) |
| Operation and Maintenance | Configuration management database (CMDB) | .xlsx (Microsoft Excel), .ods (OpenOffice), .csv (Comma |
| Retirement | Data archiving and preservation | zip (ZIP archive), .tar (TAR .rar (RAR archive) |
| Retirement | Decommissioning procedures and documentation | .docx (Microsoft Word), .pdf (Adobe Acrobat), .xlsx Excel) |
| Retirement | Asset management and inventory control | .xlsx, .csv |

FIG. 34

SECURING AN INTERCONNECTED DIGITAL ENGINEERING AND CERTIFICATION ECOSYSTEM

CROSS-REFERENCE TO RELATED APPLICATIONS

This application claims the benefit of U.S. Provisional Application No. 63/530,863 filed on Aug. 4, 2023, which is incorporated herein by reference.

TECHNICAL FIELD

This disclosure relates to the secure provision and usage of tools for digital engineering (including modeling and simulation applications) and certification of digitally engineered products.

BACKGROUND

Digital engineering tools, including modeling and simulation tools that accurately virtualize physical systems or processes for real-world decisions, enable agile development of components and/or systems. Certification of these components and/or systems still largely occurs in the physical world using physical manifestations of digitally engineered components and/or systems (sometimes referred to generally herein as "products").

SUMMARY

This document describes an interconnected digital engineering and certification ecosystem having several advantages over existing techniques for designing, engineering, testing, and certifying products.

In recent years, digital engineering tools such as modeling and simulation (M&S) tools, computer-aided design (CAD) tools, model-based systems engineering (MBSE) tools, augmented reality (AR) tools, product lifecycle management (PLM) tools, and simulation engines can be utilized to access corresponding digital engineering models. The digital engineering models can include, for example, requirements models, electronics models, test-plan models, cost-models, schedule models, software modeling, supply-chain models, manufacturing models, cyber security models, multi-attribute trade-space tools, mission effects models, etc., The proliferation of the digital engineering tools and the digital engineering models have increased the agility of hardware development and manufacturing by virtualizing physical systems and/or processes for real-world decisions. However, a number of challenges remain given the current state of these digital engineering tools and digital engineering models.

First, a large number and variety of digital engineering tools and models exist (often designed by different parties), which presents challenges for interoperability and can result in vendor lock-in issues. In particular, direct integration of individual digital engineering tools with one another is costly in terms of both time and money, with the number of interfaces between digital engineering tools scaling with the square of the number of distinct digital engineering tools (i.e., $N^2$ complexity). The large number and variety of digital engineering tools that exist can also present challenges for implementing scalable applications, automations, machine learning, and/or artificial intelligence across digital engineering tools. Better interoperability between digital engineering tools can play an important role for developing, testing, and certifying products via processes that may involve a number of distinct digital engineering tools used in parallel or in sequence. Seamless interoperability between digital engineering tools are therefore desirable for implementing such processes by enabling the development of "digital threads" or pipelines that string together the inputs and outputs of multiple digital engineering tools for particular tasks.

Second, because of the highly technical nature of many digital engineering tools and models, operating such tools effectively often requires a highly specialized skillset, which limits the number of individuals qualified to make use of these digital engineering tools. Moreover, individuals skilled at utilizing one digital engineering tool (e.g., a CAD tool produced by a first software company) may not be qualified to use a different kind of digital engineering tool (e.g., a MBSE tool) or even a similar digital engineering tool produced by a different company (e.g., a CAD tool produced by a second software company). This applies not only to using the tools via their custom graphical user interfaces, but also via their tool-specific or vendor-specific APIs, which can also require a highly specialized skillset.

Third, products and solutions designed using one digital engineering tool may not only be non-shareable between digital engineering tools (e.g., due to lack of interoperability), but in some cases, previously designed products and solutions may not be shareable with or searchable by others using the same digital engineering tool to solve a similar problem. For example, no repository of previously designed products, solutions, etc. may exist to share information about said products, solutions, etc. between individuals within the same team, company, technical field, etc. Moreover, even if such a repository of previously designed products and solutions do exist, it is unlikely to include information about how and why the previously designed products and solutions were arrived at, or to include simple ways to reuse the prior engineering work from the models which can potentially limit duplicative efforts and/or provide useful suggestions to an individual working on a similar, but slightly different product or problem. This can result in many engineering problems needing to be redeveloped from scratch, rather than building upon the work of past efforts.

Fourth, products and solutions designed using digital engineering often require the use of many different tools that not all people will know how to use. For example, a digital engineering model may be built using a particular MBSE tool, i.e., digital engineering tool, and someone who needs to access the model (or data generated from the model) may not know how to use this tool. This problem compounds with the fact that many complex systems use many different kinds of tools, meaning that in order to understand such systems, an individual may have to know how to use many different tools, which can be quite rare. This problem is compounded even further by the fact that the people who review information for certification of a product may not be familiar with some or all of the digital engineering tools, and may seek to review all of the data in a legacy format (e.g. PDF report). This poor case-of-use between different modeling tools can cause significant delays and cost increases when developing new products, as models cannot be easily shared between different people or organizations, especially if those people or organizations have different technical skill sets.

For the reasons provided above, most digital engineering tools today are still built by people, for people in a world that increasingly operates with machine-to-machine autonomy. For example, in designing a complex system such as an aircraft, various regulatory standards may need to be adhered to, which may require a host of distinct models and simulations to assess (and consequently, the use of a host of distinct digital engineering tools). Today, such efforts require collaboration between a large number of highly specialized subject matter experts consulting a host of regulatory standard documents, necessarily involving many slow and expensive human steps in the design and engineering process. Moreover, current certification processes typically require producing physical manifestations of digitally engineered components and/or systems for evaluation in the physical world (e.g., for physical testing), which can slow down the iterative design and engineering process.

The interconnected digital engineering and certification ecosystem described herein (sometimes referred to as a "digital engineering metaverse") addresses each of these issues, and more. Among other things, the interconnected digital engineering and certification ecosystem can include a computing system (e.g., including network-connected centralized or distributed computing subsystems or components) that interfaces with various centralized or distributed digital engineering tools (e.g., via an application programming interface (API) and/or software development kit (SDK)), which can be separate from the computing system or can themselves be considered part of the computing system. The digital engineering tools can be interfaced with by an API, and/or an SDK can allow for users of the ecosystem (including digital engineering tool providers) to develop their own APIs for their tools or models to enable them to interact with the system. For example, a new company can create a new MBSE tool, then use the SDK to add their tool to the ecosystem, thus allowing it to be automatically interoperable with the rest of the tools within the ecosystem via an API. The new company can then maintain that API over time such that the manager of the overall ecosystem does not have to maintain all of the different APIs for all of the different tools. This architecture can have the advantage of increasing the case of interoperability between digital engineering tools. For example, rather than requiring each individual digital engineering tool to be integrated with every other individual digital engineering tool in the ecosystem, the computing system can enable the interoperable use of multiple digital engineering tools implemented in multiple other computing systems (or, in some cases, within the same computing system) as long as each of the tools is integrated with the computing system. Furthermore, rather than requiring a user of the digital engineering tools to interact separately with the various digital engineering tools to perform modeling and simulations, the computing system can enable the user to interface with and utilize a single user interface of the ecosystem's computing system which, in turn, interfaces with a host of digital engineering tools. This can result in a more gradual learning curve for the user, who only has to become familiar with a single user interface (e.g., a user interface associated with the computing system) rather than several distinct user interfaces (e.g., associated with the various digital engineering tools). It can also simplify the number of interfaces between digital engineering tools from $N^2$ to N complexity, where N represents the number of digital engineering tools included in the ecosystem. This, in turn, can simply create scalable applications, automations, and/or machine learning and artificial intelligence across a variety of digital engineering tools.

The interconnected digital engineering and certification ecosystem also has the advantage of including digitized regulatory and certification standards, compliances, calculations, and tests (e.g., for the development, testing, and certification of products and/or solutions), which can enable users to incorporate relevant regulatory and certification standards, compliances, calculations, and test data directly into their digital engineering workflow. Regulatory and certification standards, compliances, calculations, and tests are sometimes referred to herein as "common validation and verification (V&V) products." In some implementations, the computing system of the ecosystem can interface with regulatory and/or certification authorities (e.g., via websites operated by the authorities) to retrieve digitized common V&V products published by the regulatory authorities that may be relevant for a product that a user is designing. In some implementations, the user can upload digitized common V&V products to the ecosystem themselves. The inclusion of digitized common V&V products in the ecosystem can be particularly beneficial for the completion of complex systems engineering projects, where many regulatory requirements may need to be satisfied using a number of different digital engineering tools. By connecting both digital engineering tools and digitized common V&V products, the entire product design and engineering process (or part of it) can be digitized, removing or reducing time-intensive and costly steps (e.g., human review of regulatory standards to identify regulatory requirements, human determination of what digital engineering tools are needed, human evaluation of whether the regulatory requirements are satisfied, etc.). For example, the computing system of the digital engineering and certification ecosystem can be configured to process regulatory and/or certification data corresponding to the digitized common V&V products, and engineering-related data outputs received from one or more digital engineering tools to automatically evaluate whether one or more regulatory and/or certification requirements specified in a common V&V product are satisfied. The computing system can generate a report, which can be presented to the user in an easily readable format, and can even include recommendations for improvements to a user's digital prototype of a product (e.g., to satisfy a failed regulatory and/or certification requirement). Importantly, all of this can be done without the need for any physical manifestation of the product to be manufactured, and without physical testing. As digital models and simulations continue to become more and more high fidelity, certification of products such as unmanned aerial vehicles or other aircraft can also be performed digitally, saving time, cost, and materials associated with the physical evaluation and certification of products. Although unmanned aerial vehicles and other aircraft are mentioned as example products throughout this description, the ecosystem can be readily used for the design, engineering, testing and/or certification of any product or solution (e.g., automobiles, drugs, medical devices, processes, etc.) that can be developed using digital engineering tools and/or that is subject to regulatory and/or certification requirements.

The interconnected digital engineering and certification ecosystem also has the advantage of providing a single computing system (which may be a centralized or distributed computing system) through which various kinds of data flow throughout the design, engineering, testing, and/or certification process. Further, this unlocks collaborative computing techniques even when models or model-like files are maintained at the edge, such as a client device. The security architecture provides zero trust access to digital models on a one-off basis for individual models, and also provides greater security through machine learning and data analytics on security related implementations of other models and model transactions in the digital engineering ecosystem. For example, data related to prototypes, common V&V products, the use of digital engineering tools to satisfy particular common V&V products, the successes or failures of particular digital engineering models and simulations, and various design iterations of a product can all be configured to securely flow through, and be corroborated by, the computing system of the ecosystem (e.g., using zero trust security). In some implementations, these data can be tracked and stored. This stored data can be audited for various purposes (e.g., to prevent a security breach or to perform data quality control). The stored data can also be explored to identify patterns in the data (e.g., using a machine-learning engine). For example, after many uses of the digital engineering and certification ecosystem by subject matter experts, patterns in the stored data can be used to determine what digital engineering tools will be most useful for satisfying certain regulatory requirements, to suggest adjustments to inputs or parameters for effectively running models and simulations, to perform sensitivity analyses on a particular design, to design or partially design systems using machine learning and artificial intelligence, etc. This can have the advantage of making the digital engineering and certification ecosystem increasingly user-friendly for non-subject matter experts, who can be assisted by the computing system throughout the design and engineering process based on data collected from more specialized and/or experienced users, as well as accelerating the entire engineering and certification process.

The interconnected digital engineering and certification ecosystem can further have the advantage of enabling the development of a repository of previous designs and/or solutions that have already been evaluated in relation to one or more common V&V products that can be easily re-used with minimal additional engineering effort. Such designs and/or solutions can be suggested to users (e.g., both human and artificial intelligence users) for use as is, or as a starting point for modifications, thereby reducing duplicative work and streamlining the design, engineering, testing, and certification process. In some implementations, the repository can be searchable by the user to identify previous designs and/or solutions generated by others. In some implementations, the repository (or certain elements within the repository) can also be specific to users with particular credentials (e.g., users associated with a particular company, team, technical field, etc.) to avoid the disclosure of confidential materials while still promoting effective collaboration. In some cases, user credentials can additionally or alternatively be used in the interconnected digital engineering and certification ecosystem for other purposes such as moderating the kinds of digital engineering tools (or functionalities within the digital engineering tools) that a user may access. For example, the user credentials may correspond to a skill level of a user, and can be checked to ensure that a user is not overwhelmed with the functionalities of a digital engineering tool beyond their skillset.

The interconnected digital engineering and certification ecosystem can further have the advantage of allowing highly valuable digital engineering models to be shared while still protecting the intellectual property contained within the models. Many modern technology development projects include multiple entities working together (e.g., a customer, a prime integrator, a supplier, etc.), requiring access to one another's models, but with different access permissions to the data. This system allows for the detailed specification of exactly which data within a model is to be shared with each individual entity, without exposing all of the data to all of the entities. This selective sharing of information allows for the measurement and tracking of which data is consumed by each entity (e.g., only sharing the inputs and outputs of a hydrodynamic pressure model) and how much data is consumed (e.g., how many runs of the hydrodynamics model are performed). This measuring and tracking allows for new business models based upon the creation of models and data that can be monitored and monetized. In some implementations, this measurement and tracking go beyond the first sharing of the data, but can also be applied to measuring and/or tracking subsequent or derivative uses of the data by third parties not engaged in the initial sharing agreement. For example, a prime contractor can share data with a first government organization, who is then free to share the data with a second government organization, and the prime contractor can have the ability to allow/disallow, track, and potentially monetize this further sharing. Such implementations have the advantage of enabling extremely close capturing and traceability of model data.

Maintaining the security of assets within the interconnected digital engineering ecosystem (e.g. models, model inputs, model outputs, user information, data flows throughout the interconnected digital engineering ecosystem, etc.) is important to avoid liability and to maintain the trust of parties (e.g., users, model providers, regulatory authorities, certification authorities, etc.) who may interact with the interconnected digital engineering ecosystem. Thus, the present document discloses various implementations of security architectures and security-related processes for the interconnected digital engineering ecosystem, which are particularly well suited for the structure and purpose of the interconnected digital engineering ecosystem, compared to existing security solutions. These security architectures and security-related processes aim to protect digital models and their data in addition to traditional zero trust security measures for users and computer networks. The zero trust security architecture includes policy, embodiments, and example implementations of a secure storage environment, restricted access to models, attribute-based access control, handling of read vs. write queries, traceability and auditability, and model trust policy.

In some implementations, the security architectures and security-related processes described herein can have the advantage of implementing zero trust not only for users and networks within the interconnected digital engineering ecosystem, but also for the models themselves. In other words, the security architecture and security-related processes are able to ensure (i) the right authenticated users are able to access the right authenticated models (and only the right authenticated parts of models) for specific types of data, (ii) models are credibly authentic because access to read and write must be explicitly granted, and (iii) complex computations involving multiple models can be executed securely because access must be explicitly granted for each step at the user, network, model, and model splice levels.

The security architecture and security-related processes described herein can also have the advantage of least privilege. In some implementations, the security architecture and secure-related processes can extend the traditional implementation of least privilege where the smallest amount of access is granted to include an extension where the smallest amount of data exists within the digital engineering platform itself because models remain in the customer's (e.g., a model owner's or a model developer's) own storage. This decreases potential compromise of intellectual property, decreases the amount of legal process required to share models (e.g., sharing parties signing NDAs), and, when used in the security architecture described throughout this specification, it allows for models to assess integrations without leaving each customer's environment.

The security architecture and security-related processes described herein can additionally have the advantages of traceability, auditability, and model integrity. In some examples, the endpoint transactions can be logged so there is comprehensive traceability of all actions on models connected via the digital engineering ecosystem. Further, outputs from approved actions may produce updated models, hashes of which are stored in the endpoint transaction database, which can be implemented in various embodiments including a secure database, a distributed database, or a ledger, to name a few examples. This ensures the integrity of the models being used in further actions without requiring customers (e.g., model owners or model developers) to entrust their full model to the digital engineering platform.

In some implementations, the interconnected digital engineering ecosystem can provide security features that ensure secure processing of various requests. In further detail, the interconnected digital engineering ecosystem can ensure secure processing of various requests by implementing a cell-based architecture, treating digital engineering models as microservices, where the microservices can be bundled together according to logical technical actions. The security features of this ecosystem are enhanced by the combined use of a micro gateway and a Wide Application Firewall (WAF) to control traffic entry into each cell. Additionally, an API Gateway (also known as an API Manager) manages traffic direction and is fortified with a Customer Identity Access Management (CIAM) system, responsible for generating and verifying access tokens at each gateway. This setup ensures that access is granted only to authorized individuals and designated cells. In some implementations, the API Manager plays a crucial role in this ecosystem by enforcing access policies and establishing network traffic control. This comprehensive approach to securing the digital engineering ecosystem allows for robust protection of intellectual property and sensitive information within requests while maintaining the necessary accessibility and functionality for efficient operation in various environments.

In some implementations, this secure architecture enables the orchestration of discrete digital engineering tasks on third-party data while providing strong privacy guarantees. Through the use of a hybrid deployment model, the system enables an untrusted third-party to execute specific digital engineering tasks on models and simulations without direct access to sensitive data. In this way, users may collaborate on sensitive projects—such as company research and development efforts—with third parties who would otherwise be untrusted with direct access to the constituent digital models.

In one general aspect, a method is performed by a server. The method includes: receiving, from a user device and by a digital platform, a request to access a stored digital engineering model; extracting, from the received request and by the digital platform, data that identifies the stored digital engineering model a user seeks to access; retrieving, by the digital platform, a location of the stored digital engineering model based on the extracted data from the request; providing, by the digital platform, the request to the location of the stored digital engineering model; receiving, by a digital agent at the location of the stored digital engineering model, the request to access the stored digital engineering model; determining, by the digital agent, the request is authenticated to access the stored digital engineering model; in response to determining the request is authenticated to access the stored digital engineering model, determining, by the digital agent, a type of the request to access the stored digital engineering model; in response to determining the type of the request to access the stored digital engineering model is to update the stored digital engineering model, generating, by the digital agent, a copy of the stored digital engineering model; performing, by the digital agent, an action associated with the type of the request to the copy of the digital engineering model; providing, by the digital agent, a revised copy of the digital engineering model to the digital platform; and providing, by the digital platform and to a user interface of the user device, the revised copy of the digital engineering model for user review.

Other embodiments of this and other aspects of the disclosure include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

The foregoing and other embodiments can each optionally include one or more of the following features, alone or in combination. For example, one embodiment includes all the following features in combination.

In some implementations, the method includes: storing, by the digital agent, one or more digital engineering tools in a tools database, the one or more digital engineering tools comprise model-based systems engineering (MBSE) tools, augmented reality (AR) tools, computer aided design (CAD) tools, data analytics tools, modeling and simulation (M&S) tools, product lifecycle management (PLM) tools; and storing one or more digital engineering models, the one or more digital engineering models comprise simulation engines, requirements models, electronics models, test-plan models, cost-models, schedule models, software modeling, supply-chain models, manufacturing models, cyber security models, multi-attribute trade-space tools, and mission effects models.

In some implementations, determining the type of the request to access the stored digital engineering model includes at least one of reading data from the stored digital engineering model or writing data to the stored digital engineering model.

In some implementations, the method includes: obtaining, by the digital platform, one or more credentials of the user using the user device prior to accessing the stored digital engineering model; and determining, based on the one or more obtained credentials, that the user is qualified to access the stored digital engineering model.

In some implementations, the digital platform and the digital agent communicate in a bi-directional manner through one or more firewalls.

In some implementations, the method includes: in response to determining the type of the request to access the stored digital engineering model is to read data from the stored digital engineering model, retrieving, by the digital agent, a splicer that enables access to one or more functions of the stored digital model; providing, by the digital agent, the retrieved splicer to the digital platform; and providing, by the digital platform and to a user interface of the user device, the retrieved splicer of the stored digital model for user review.

In some implementations, the retrieved splicer is configured to restrict user access to a subset of functionalities of the stored digital engineering model.

In some implementations, the retrieved splicer is configured to redact a portion of the stored digital engineering model.

In some implementations, the retrieved splicer is configured to secure the subset of functionalities of the stored digital engineering model on the user device.

In some implementations, performing the action associated with the type of the request to the copy of the digital engineering model includes performing the action associated with the type of the request to the copy of the digital engineering model without modifying the stored digital engineering model.

In one general aspect, a method is performed by a server. The method includes: receiving, from a user device and by a digital platform, a request to interact with a digital model; determining whether a user operating the user device is authorized to access the digital platform; in response to determining the user is authorized to access the digital platform, generating a token that provides the user with access to the digital platform; determining whether the request includes malicious activity; in response to determining that the request is absent of the malicious activity, executing, using data from the request and the generated token enabling the user access to the digital platform, a digital thread that executes one or more operations using one or more digital tools and the digital model; and providing data indicative of the one or more operations executing the digital thread to the user device for presenting on a user interface of the user device.

Other embodiments of this and other aspects of the disclosure include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

The foregoing and other embodiments can each optionally include one or more of the following features, alone or in combination. For example, one embodiment includes all the following features in combination.

In some implementations, determining whether the request includes malicious activity includes analyzing, using a permissions model, the request to detect a presence of the malicious activity.

In some implementations, the method includes: in response to determining the request includes the malicious activity, preventing, by the permissions model, the request from accessing the digital platform; or in response to determining the request does not include the malicious activity, permitting, by the permissions model, the request to access the digital platform.

In some implementations, executing, using the data extracted from the request and the generated token enabling access to the digital platform, the digital thread that executes the one or more operations using the one or more digital tools and the digital model includes: authenticating and authorizing, the request using the generated token; in response to authenticating the request using the generated token, extracting data from the request by a service mesh, wherein the extracted data comprises the one or more operations to be performed using the one or more digital tools upon the digital model; creating the digital thread using the extracted data from the request; and executing the digital thread upon the digital model.

In some implementations, executing the digital thread that executes the one or more operations using the one or more digital tools and the digital model includes executing, across a multi-cellular environment, the digital thread that executes the one or more operations using the one or more digital tools upon the digital model, each cell of the multi-cellular environment executing one or more of the one or more operations upon the digital model.

In some implementations, executing, across the multi-cellular environment, the digital thread that executes the one or more operations using the one or more digital tools and the digital thread includes: executing, by a first cell, a first operation of the one or more operations on the digital model; encrypting, by the first cell, a result of performing the first operation; providing, by the first cell, the encrypted result to a second cell; decrypting, by the second cell, the encrypted result; and executing, by the second cell, a second operation of the one or more operations on the digital model based on the decrypted results.

In some implementations, each cell of the multi-cellular environment includes: one or more microservices and APIs for performing one or more operations on one or more digital models, and a splicer that enables each cell of the multi-cellular environment to communicate with one or more other cells.

In some implementations, the method includes generating audit data that tracks movement of the request across each cell in the multi-cellular environment for executing the one or more operations.

In some implementations, the method includes: monitoring an amount of network data transmitted between each cell in the multi-cellular environment; and throttling the amount of network data transmitted between each cell when the amount of network data satisfies a threshold value.

In some implementations, the method includes: storing, by the digital platform, one or more digital engineering tools in a tools database, the one or more digital engineering tools comprise model-based systems engineering (MBSE) tools, augmented reality (AR) tools, computer aided design (CAD) tools, computational fluid dynamics (CFD) tools, finite element analysis (FEA) tools, electronic design automation (EDA) tools, data analytics tools, modeling and simulation (M&S) tools, product lifecycle management (PLM) tools; and storing one or more digital engineering models, the one or more digital engineering models comprise simulation engines, requirements models, electronics models, test-plan models, cost-models, schedule models, software modeling, supply-chain models, manufacturing models, cyber security models, multi-attribute trade-space tools, and mission effects models.

The subject matter described in this specification can be implemented in various embodiments and may result in one or more of the following advantages. In some implementations, the proposed technology provides several significant advantages, primarily centered around its robust, four-layer security framework. This framework includes multiple components including the implementation of a policy by the API manager, utilization of an identity token through the CIAM, the isolation of individual cells using a gateway, and granular protection provided to each cell through the implementation of a WAF. By employing this comprehensive security approach, valuable assets and sensitive information are effectively shielded from unauthorized access.

One notable advantage is the potential to establish an "Internet of Models," where digital engineering models become the most valuable distributed assets across various stacks. The proposed system described in this specification facilitates seamless sharing of these models through a cell-based methodology, enabling isolation and decoupling of logical systems and processes. The isolation and sharing of specific digital engineering models is specifically safeguarded through the use of a WAF, ensuring the protection of these valuable assets.

In some examples, the proposed architecture maintains accessibility through APIs while simultaneously enforcing robust protection by isolating each digital model. The combination of accessibility and security within the digital engineering ecosystem provides significant benefits to stakeholders, particularly in safeguarding critical intellectual property and enabling efficient collaboration across multiple platforms.

The technology described embodies an architecture based on cells that supports scalability. The architecture features decoupled logic, enabling scaling as the demand for models and users increases. Additionally, the technology provides for flexibility due to the isolation of models and the incorporation of APIs, which allows the system to adapt to changing business requirements and integrate with various platforms.

The technology includes a customizable security feature characterized by the granular protection of a Web Application Firewall (WAF). This functionality enables the application of distinct security measures to individual cells based on specific operational needs. Moreover, the technology includes a comprehensive security framework designed to mitigate unauthorized access and potential data breaches, thereby enhancing data protection.

Improved collaboration is another feature of the technology. The cell-based security methodology facilitates secure sharing of models across platforms, promoting collaboration between stakeholders while ensuring protection for proprietary data and intellectual insights.

The technology includes an access management system, namely, the Customer Identity and Access Management (CIAM) system, which cases the task of granting and verifying access permissions for authorized individuals. The access management system simplifies the process of granting and verifying access permissions, thereby reducing administrative burdens. The inclusion of robust security measures serves to foster an environment of increased trust among stakeholders, potentially leading to a broader adoption of the digital engineering ecosystem.

In some embodiments, the proposed cellular security architecture can be deployed in a hybrid manner across on-premises and cloud environments. This approach merges the scalability of public cloud infrastructure with the reliability and security-control afforded by on-premises deployments, resulting in cost-effectiveness and optimal performance. The hybrid model accommodates both specific regulatory and security compliance requirements, allowing the cloud components to prioritize less-sensitive high-volume data while ensuring appropriate safeguards around sensitive files held by enterprise customers of the platform. This division enhances security with minimal cost-consequence and assures superior resilience, bolstering continuity and disaster recovery capabilities for various customers.

In some implementations, the proposed cellular security architecture can utilize a trained machine learning model to identify security risks associated with requests. The machine learning model can be trained using prior requests that include both malicious and non-malicious data. In this manner, the machine learning model can be trained to identify portions of a request or the request itself that appear to be malicious and/or not malicious and signal this information. The trained machine learning model can output a score that reflects a likelihood of the maliciousness of the request, which can aid the WAF in determining whether to allow the request to be passed into the cell architecture. Should the WAF determine the score output by the trained machine learning models satisfies, e.g., meet or exceed, the threshold, the WAF can discard the request as the request may include a likelihood of malicious activity.

The proposed cellular security architecture provides advantages that ensure network congestion is minimized between one or more cells. The cellular security architecture can rely on an API manager that enables close monitoring of network traffic, applications, performance, and resources between the one or more cells, among other features. The API manager can utilize API throttling and rate limiting, for example, to avoid or reduce the amount of congestion when such network traffic or other features satisfies a threshold value. In particular, the API manager can vary or throttle the amount of network data between cells based on monitored events between the cells. Periodically, a-periodically, or on a continuous basis, the API manager can monitor the network traffic between one or more cells, and compare the network traffic to a predefined threshold value. If the API manager determines the network traffic between the one or more cells satisfies the threshold value, e.g., exceeds or meets the threshold value, then the API manager can throttle the traffic between the one or more cells whose network traffic satisfies the threshold value. In some cases, the API manager can analyze the network traffic to determine a cause for the congestion if the network traffic between one or more cells satisfies the threshold value.

Moreover, the hybrid infrastructure facilitates the use of advanced cloud services like artificial intelligence, machine learning, and analytics, in a privacy-preserving manner thereby enriching the value of digital engineering models. A hybrid model also facilitates a smoother transition for organizations aiming for a full cloud-based model, allowing a gradual shift due to operational, financial, and/or security considerations. Consequently, this hybrid deployment offers a balanced, flexible, and secure solution that efficiently navigates the complexity of managing security across varied platforms.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 14A and 14B are diagrams which include step-by-step annotations detailing the components involved in a file upload using the notional infrastructure described in FIGS. 13A and 13B.

FIGS. 31 and 32 are diagrams showing a security implementation that extends to access and collaboration with multiple models in a computing environment.

FIG. 34 shows a table of example model types and file extensions for steps of a data flow generated by a digital thread, that are handled by a secure interconnected digital engineering platform.

DETAILED DESCRIPTION

This disclosure describes an interconnected digital engineering and certification ecosystem that can enable new capabilities and improve the process for digital product development, including the digital design, digital engineering, digital testing, and digital certification of products. For the purposes of this disclosure the terms "design" and "engineer" are used largely synonymously and are broadly defined to encapsulate the process of intelligently developing a product to solve a particular problem (e.g., to improve performance, increase aesthetic appeal, satisfy one or more regulatory requirements, etc.).

Figure 1:
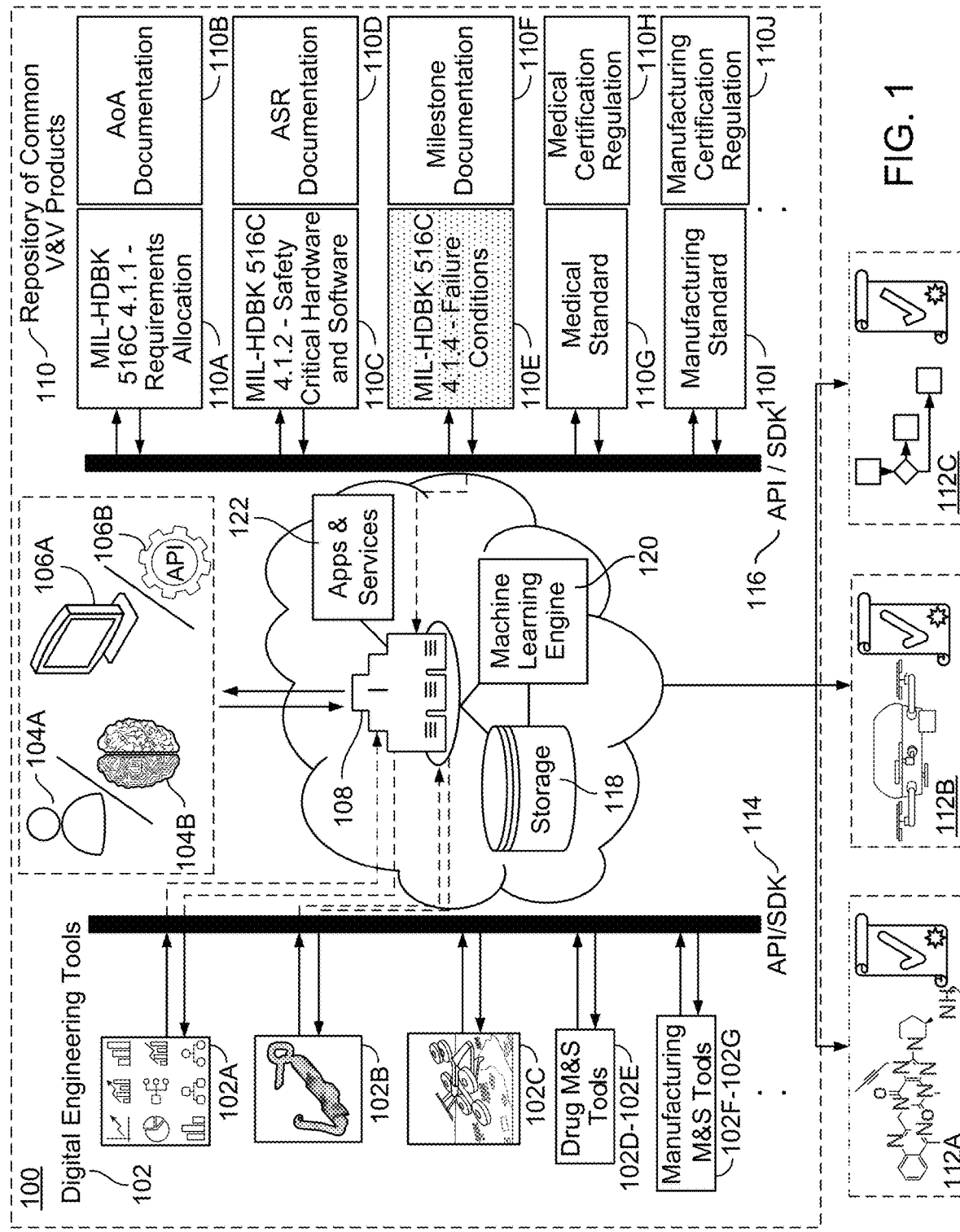
FIG. 1 is a diagram showing an example interconnected digital engineering and certification ecosystem, and digitally certified products.

FIG. 1 shows an example interconnected digital engineering and certification ecosystem 100 and examples of digitally certified products 112A-112C (collectively referred to as digitally certified products 112). For example, in some implementations, the digitally certified product 112A can be an unmanned aerial vehicle (UAV) or other aircraft, the digitally certified product 112B can be a drug or other chemical or biologic compound, and the digitally certified product 112C can be a process such as a manufacturing process. In general, the digitally certified products 112 can include any product, process, or solution that can be developed, tested, or certified (partially or entirely) using digital engineering tools (e.g., the digital engineering tools 102). In some implementations, the digitally certified products 112 may not be limited to physical products, but can include non-physical products as well (e.g., processes, software, etc.). While physical and physically-interacting systems often require multiple digital engineering tools to assess for compliance with common V&V products simply by virtue of the need for M&S, many complex non-physical systems may also require multiple digital engineering tools for product development, testing, and/or certification. With this in mind, various other possibilities for digitally certified products will be recognized by one of ordinary skill in the art.

The digitally certified products 112 can be designed and/or certified using the interconnected digital engineering and certification ecosystem 100. The interconnected digital engineering and certification ecosystem 100 can include a user device 106A or API 106B (or other similar machine-to-machine communication interface) operated by a user (e.g., human users 104A of various skill levels, or artificial users 104B such as algorithms, artificial intelligence, or other software), and a computing system 108 connected to (and/or including) a data storage unit 118, a machine learning engine 120, and an application and service layer 122. For the purposes of clarity, any user selected from the various potential human users 104A or artificial users 104B are referred to herein simply as the user 104. In some implementations, the computing system 108 can be a centralized computing system, while in other implementations, the computing system 108 can be a distributed computing system. In some cases, the user 104 can be considered part of the ecosystem 100, while in other implementations, the user 104 can be considered separate from the ecosystem 100. The ecosystem 100 also includes one or more digital engineering tools 102 (e.g., data analysis tool 102A, CAD and finite element analysis tool 102B, simulation tool 102C, drug M&S tools 102D-102E, manufacturing M&S tools 102F-102G, etc.) and a repository of common V&V products 110 (e.g., regulatory standards 110A-110F related to the development and certification of a UAV, medical standard 110G [e.g., CE marking (Europe), FCC Declaration of Conformity (USA), IECEE CB Scheme (Europe, North America, parts of Asia and Australia), CDSCO (India), FDA (USA), etc.], medical certification regulation 110H [e.g., ISO 13485, ISO 14971, ISO 9001, ISO 62304, ISO 10993, ISO 15223, ISO 11135, ISO 11137, ISO 11607, IEC 60601, etc.], manufacturing standard 110I [e.g., ISO 9001, ISO 9013, ISO 10204, EN 1090, ISO 14004, etc.], manufacturing certification regulation 110J [e.g., General Certification of Conformity (GCC), etc.], etc.).

The computing system 108 of the ecosystem 100 is centrally disposed within the architecture of the ecosystem 100 and is configured to communicate with (e.g., receive data from and transmit data to) the user device 106A or the API 106B (e.g., an API associated with an artificial user 104B), the digital engineering tools 102 (e.g., via an application programming interface [API]/software development kit [SDK] 114), and the repository of common V&V products 110 (e.g., via the API/SDK 116). For example, the computing system 108 can be configured to communicate with the user device 106A and/or the API 106B to send or receive data corresponding to a prototype of a design, information about a user (e.g., user credentials), engineering-related inputs/outputs associated with the digital engineering tools 102, digitized common V&V products, an evaluation of a product design, user instructions (e.g., search requests, data processing instructions, etc.), and more. The computing system 108 can also be configured to communicate with one or more digital engineering tools 102 to send engineering-related inputs for executing analyses, digital engineering models, simulations, tests, etc. and to receive engineering-related outputs associated with the results. The computing system 108 can also be configured to communicate with the repository of common V&V products 110 to retrieve data corresponding to one or more digitized common V&V products 110 and/or upload new common V&V products (e.g., those received from the user 104) to the repository of common V&V products 110. All communications can be transmitted and corroborated securely, for example, using methods relying on zero trust security.

In some implementations, the computing system 108 can employ zero trust security for various components within the digital engineering and certification ecosystem. Specifically, the computing system 108 can employ zero trust security under the various industries that can utilize the computing system 108. For example, these industries can include automotive industries, aerospace industries, and medical device industries. The computer system 108 can include secure storage of various models within customer environments (e.g., environments owned, accessible, or operated by customers such as model developers or owners) or in a secure storage environment from the digital engineering platform. The computer system 108 can offer restricted access to models through attribute-based access control, handling of read requests versus write requests, traceability and auditability through digitally signed endpoint transactions, and a model trust policy that assesses model truth and user credibility. The zero trust security aspect related to the computing system 108 is further described below.

In some implementations, the computing system 108 can utilize security architecture policies to employ the zero trust security feature. The security architecture policies can include, for example, a model storage policy, a model access policy, a data restrictions policy, a traceability and auditability policy, and an authenticity policy. In some cases, the computing system 108 can employ a model storage policy for the zero trust policy. The model storage policy can ensure the secure storage of models within customer environments or in a secure storage environment separate from the digital engineering platform. Moreover, the models may be linked to the platform through private model storage. By implementing the model storage policy, the computing system 108 can ensure the confidentiality and integrity of the models themselves, and the data of those models.

In some implementations, the computing system 108 can employ a model access policy for the zero trust policy. The model access policy can restrict access to a specific subset of API functions through a model wrapper or a model splicer. For example, the model wrapper and wrapping of the models can be used interchangeably with a model splicer and splicing of the models. The restricted access can be based on an authentication level of the user, for example. Moreover, the model access policy can enable model authentication and user authentication from various endpoints. In some cases, a customer (e.g., a model owner or model developer) may provide additional access control policies that can be implemented at the various endpoints. For example, the additional access control policies can include read access from the models and write access to the models. In some examples, the authentication of models and users can be achieved through attribute-based access control. As further described below, the models may be digitally watermarked (e.g., with digitally signed endpoint transactions) to improve the overall traceability and auditability of the models.

In some implementations, the computing system 108 can employ a data restrictions policy for the zero trust policy. The data restrictions policy can enable and allow customers to set policies for the handling of the data of the respective models. In this implementation, customers can determine how to secure their digital engineering models. For example, customers can implement policies that include data restrictions such as encryption, security controls, and zero-knowledge approaches. Moreover, customers can configure the digital engineering ecosystem to provide verification of transactions and consensus mechanisms to validate outputs from the models for open-access storage models. Consensus mechanisms can enable a group of nodes, which comprise different digital engineering tools to evaluate or verify a specific digital model or multiple digital models within open-access storage, to agree on the output from the specific model. The consensus mechanisms may include methods such as Proof of Stake (PoS), or Proof of Reputation (PoR) approaches. These consensus mechanisms can ensure that all nodes in a network of open-access storage digital engineering models have the same view of the specific model's data, even in the presence of faulty or malicious nodes. For example, the PoR approach can include a blockchain consensus mechanism that depends on the reputation of the participants to keep the network secure. The PoS approach can include a consensus mechanism for blockchain networks, where cryptocurrency holders can validate block transactions by staking transactions.

In some implementations, the computing system 108 can employ a traceability and auditability policy for the zero trust policy. The traceability and auditability policy can ensure the recorded transactions at endpoints are in a standard format within a secure database, on a cloud network, on a blockchain network, or some combination of the aforementioned networks. Moreover, the computing system 108 can utilize various data analytics approaches to support threat detection, alerts, threat mitigation, and threat debugging. Moreover, the traceability and auditability policy can help aid the computing system 108 in meeting specific standards, such as those established by standards organizations such as NIST, or various customer needs or criteria.

In some implementations, the computing system 108 can employ an authenticity policy for the zero trust policy. The authenticity policy ensures the right or correct authenticated user has access to the right authenticated model attributes. The right authenticated model attributes can include the models in which the users are authenticated to access and perform updates with respect to the authenticated models. The authenticity policy ensures the correct authenticated user accesses the right authenticated model attributes by addressing the issues of (i) user identity, (ii) continuity, and (iii) accord, to assess model truth and user credibility. In some examples, the computing system 108 can employ the authenticity policy to help ensure the validity and reliability of models, along with the validity and reliability of the data used by the models.

In some implementations, the authenticity policy addresses user identity by ensuring the right authenticated user can access the models and the right authenticated user can access the specific data from the right authenticated model. The authenticity policy ensures the user accessing the authenticated model is a credible user. Moreover, continuity is addressed by assessing user credibility within a digital engineering platform, such as the digital engineering platform of computing system 108. Moreover, the authenticity policy addresses accord by determining how to assess model truth. Specifically, model truth can be addressed when the model owner owns ground truth or when the model owner does not own ground truth of the model data.

The computing system 108 can process and/or store the data that it receives, and in some implementations (e.g., using the storage 118), can access a machine learning engine 120 and/or an application and service layer 122 (either included as part of the computing system 108 or external to it) to identify useful insights based on the data, as further described herein. The central disposition of the computing system 108 within the architecture of the ecosystem 100 has many advantages including reducing the technical complexity of integrating the various digital engineering tools 102; improving the product development experience of the user 104; intelligently connecting common V&V products (e.g., standards 110A-110F) to the digital engineering tools 102 most useful for satisfying requirements associated with the common V&V products; and enabling the monitoring, storing, and analysis of the various data that flows between the elements of the ecosystem 100 throughout the product development process. In some implementations, the data flowing through (and potentially stored by) the computing system 108 can also be auditable to prevent a security breach, to perform data quality control, etc.

Referring to one particular example shown in FIG. 1, the user 104 can use the digital engineering and certification ecosystem 100 to produce a digitally certified UAV 112B. For example, the user 104 may be primarily concerned with certifying the UAV as satisfying the requirements of a particular regulatory standard 110E relating to failure conditions of the UAV (e.g., "MIL-HDBK 516C 4.1.4—Failure Conditions"). In this usage scenario, the user 104 can develop a digital prototype of the UAV on the user device 106A or using the API 106B and can transmit the prototype data (e.g., as at least one of a CAD file, a MBSE file, etc.) to the computing system 108. Along with the prototype data, the user 104 can transmit, via the user device 106A, additional data including an indication of the common V&V product for which the user 104 is interested in certifying the product (e.g., regulatory standard 110E), user credential information for accessing one or more capabilities of the computing system 108, and/or instructions for running one or more digital models, tests, and/or simulations using a subset of the digital engineering tools 102.

Referring to another example shown in FIG. 1, the user 104 can use the digital engineering and certification ecosystem 100 to produce a digitally certified drug, chemical compound, or biologic 112A. For example, the user 104 may be primarily concerned with certifying the drug, chemical compound, or biologic 112A as satisfying the requirements of a particular medical standard 110G and medical certification regulation 110H. In this usage scenario, the user 104 can develop a digital prototype of the drug, chemical compound, or biologic on the user device 106A or using the API 106B and can transmit the prototype data (e.g., as a molecular modeling file) to the computing system 108. Along with the prototype data, the user 104 can transmit, via the user device 106A, additional data including an indication of the common V&V products for which the user 104 is interested in certifying the product (e.g., medical standard 110G and medical certification regulation 110H), user credential information for accessing one or more capabilities of the computing system 108, and/or instructions for running one or more digital models, tests, and/or simulations using a subset of the digital engineering tools 102 (e.g., drug M&S tools 102D-102E).

Referring to yet another example shown in FIG. 1, the user 104 can use the digital engineering and certification ecosystem 100 to produce a digitally certified manufacturing process 112C. For example, the user 104 may be primarily concerned with certifying the manufacturing process 112C as satisfying the requirements of a particular manufacturing standard 110I and manufacturing certification regulation 110J. In this usage scenario, the user 104 can develop a digital prototype of the manufacturing process on the user device 106A or using the API 106B and can transmit the prototype data to the computing system 108. Along with the prototype data, the user 104 can transmit, via the user device 106A, additional data including an indication of the common V&V products for which the user 104 is interested in certifying the process (e.g., manufacturing standard 110I and manufacturing certification regulation 110J), user credential information for accessing one or more capabilities of the computing system 108, and/or instructions for running one or more digital engineering models, tests, and/or simulations using a subset of the digital engineering tools 102 (e.g., manufacturing M&S tools 102F-102G).

In any of the above examples, the computing system 108 can receive the data transmitted from the user device 106A and/or the API 106B and can process the data to evaluate whether the common V&V product of interest (e.g., regulatory standard 110E, medical standard 110G, medical certification regulation 110H, manufacturing standard 110I, manufacturing certification regulation 110J, etc.) is satisfied by the user's digital prototype. For example, this can involve communicating with the repository of common V&V products 110 (via the API/SDK 116) to retrieve the relevant common V&V product of interest and processing the regulatory and/or certification data associated with the common V&V product to identify one or more requirements for the UAV prototype; the drug, chemical compound, or biologic prototype; the manufacturing process prototype; etc. In some implementations, the repository of common V&V products 110 can be hosted by a regulatory and/or certification authority (or another third party), and retrieving the regulatory and/or certification data can involve using the API/SDK 116 to interface with one or more data resources maintained by the regulatory and/or certification authority (or the another third party). In some implementations, the regulatory and/or certification data can be provided directly by the user 104 via the user device 106A and/or the API 106B (e.g., along with the prototype data).

Evaluating whether the common V&V product of interest (e.g., regulatory standard 110E, medical standard 110G, medical certification regulation 110H, manufacturing standard 110I, manufacturing certification regulation 110J, etc.) is satisfied by the user's digital prototype can also involve processing the prototype data received from the user device 106A or the API 106B to determine if the one or more identified requirements are actually satisfied. In some implementations, the computing system 108 can include one or more plugins, local applications, etc. to process the prototype data directly at the computing system 108. In some implementations, the computing system can simply pre-process the received prototype data (e.g., to derive inputs for the digital engineering tools 102) and can then transmit instructions and/or input data to a subset of the digital engineering tools 102 via the API/SDK 114 for further processing.

Not all digital engineering tools 102 are necessarily required for the satisfaction of particular regulatory and/or certification standards. Therefore, in the UAV example provided in FIG. 1, the computing system 108 may determine that only a data analysis tool 102A and a finite element analysis tool 102B are required to satisfy the regulatory standard 110E for failure conditions. In the drug, chemical compound, or biologic example provided in FIG. 1, the computing system 108 may determine that only drug M&S tools 102D-102E are required to satisfy the medical standard 110G and medical certification regulation 110H. In the manufacturing process example provided in FIG. 1, the computing system 108 may determine that only manufacturing M&S tools 102F-102G are required to satisfy the manufacturing standard 110I and manufacturing certification regulation 110J. In other implementations, the user 104 may themselves identify the particular subset of the digital engineering tools 102B that should be used to satisfy the common V&V product of interest, provided the user 104 is a qualified subject matter expert. In other implementations, the user 104 may input to the computing system 108 some suggested digital engineering tools 102 to satisfy a common V&V product of interest, and the computing system 108 can recommend to the user 104 a modified subset of the digital engineering tools 102 for final approval by the user 104, provided the user 104 is a qualified subject matter expert. After a subset of the digital engineering tools 102 has been identified, the computing system 108 can then transmit instructions and/or input data to the identified subset of the digital engineering tools 102 to run one or more digital engineering models, tests, and/or simulations. The results (or "engineering-related data outputs") of executing these models, tests, and/or simulations can be transmitted back and received at the computing system 108.

In some implementations, the user 104 may input a required digital engineering tool (e.g., digital engineering tool 102F) for meeting a common V&V product 110I, and the computing system 108 can determine that another digital engineering tool (e.g., digital engineering tool 102G) is also required to satisfy the common V&V product 110I. The computing system can then transmit instructions and/or input data to both digital engineering tools (e.g., digital engineering tools 102F and 102G), and the outputs of these digital engineering tools can be transmitted and received at the computing system 108. In some cases, the input data submitted to one of the digital engineering tools (e.g., digital engineering tool 102G) can be derived (e.g., by the computing system 108) from the output of another of the digital engineering tools (e.g., digital engineering tool 102F).

After receiving engineering-related data outputs from the digital engineering tools 102, the computing system 108 can then process the received engineering-related data outputs to evaluate whether the requirements identified in the common V&V product of interest (e.g., regulatory standard 110E, medical standard 110G, medical certification regulation 110H, manufacturing standard 110I, manufacturing certification regulation 110J, etc.) are satisfied. In some implementations, the computing system 108 can generate a report summarizing the results of the evaluation and can transmit the report to the user device 106A or the API 106B for review by the user 104. If all of the requirements are satisfied, then the prototype can be certified, resulting in the digitally certified product 112 (e.g., the digitally certified drug, chemical compound, or biologic 112A; the digitally certified UAV 112B; the digitally certified manufacturing process 112C, etc.). However, if some of the regulatory requirements are not satisfied, additional steps may need to be taken by the user 104 to certify the prototype of the product. In some cases, when some of the regulatory requirements are not satisfied, the prototype may be partially certified. In some implementations, the report that is transmitted to the user can include recommendations for these additional steps (e.g., suggesting one or more design changes, suggesting the replacement of one or more components with a previously designed solution, suggesting one or more adjustments to the inputs of the models, tests, and/or simulations, etc.). If the requirements of a common V&V product are partially met, or are beyond the collective capabilities of the distributed engineering tools 102, the computing systems 108 may provide the user 104 with a report recommending partial certification, compliance, or fulfillment of a subset of the common V&V products (e.g., digital certification of a subsystem or a sub-process of the prototype). The process of generating recommendations for the user 104 is described in further detail below.

In response to reviewing the report, the user 104 can make design changes to the digital prototype locally and/or can send one or more instructions to the computing system 108 via the user device 106A or the API 106B. These instructions can include, for example, instructions for the computing system 108 to re-evaluate an updated prototype design, use one or more different digital engineering tools 102 for the evaluation process, and/or modify the inputs to the digital engineering tools 102. The computing system 108 can, in turn, receive the user instructions, perform one or more additional data manipulations in accordance with these instructions, and provide the user 104 with an updated report. Through this iterative process, the user 104 can utilize the interconnected digital engineering and certification ecosystem 100 to design and ultimately certify (e.g., by providing certification compliance information) the prototype (e.g., the UAV prototype, drug prototype, manufacturing process prototype, etc.) with respect to the common V&V product of interest. Importantly, since all of these steps occur in the digital world (e.g., with digital prototypes, digital models/tests/simulations, and digital certification), significant time, cost, and materials can be saved in comparison to a process that involves the physical prototyping, evaluation, and/or certification of a similar UAV, drug, manufacturing process, etc. If the requirements associated with a common V&V product are partially met, or are beyond the collective capabilities of the digital engineering tools 102, the computing system 108 may provide the user 104 with a report recommending partial certification, compliance, or fulfillment of a subset of the common V&V products (e.g., digital certification of a subsystem or a sub-process of the prototype).

While the examples described above focus on the use of the interconnected digital engineering and certification ecosystem 100 by a single user, additional advantages of the ecosystem 100 can be realized through the repeated use of the ecosystem 100 by multiple users. As mentioned above, the central positioning of the computing system 108 within the architecture of the ecosystem 100 enables the computing system 108 to monitor and store the various data flows through the ecosystem 100. Thus, as an increasing number of users utilize the ecosystem 100 for digital product development, data associated with each use of the ecosystem 100 can be stored (e.g., in the storage 118) and analyzed to yield various insights, which can be used to further automate the digital product development process and to make the digital product development process easier to navigate for non-subject matter experts.

In some implementations, user credentials for the user 104 can be indicative of the skill level of the user 104, and can control the amount of automated assistance the user is provided. For example, non-subject matter experts may only be allowed to utilize the ecosystem 100 to browse pre-made designs and/or solutions, to use the digital engineering tools 102 with certain default parameters, and/or to follow a predetermined workflow with automated assistance directing the user 104 through the product development process. Meanwhile, users that are more skilled may still be provided with automated assistance, but may be provided with more opportunities to override default or suggested workflows and settings.

In some implementations, the computing system 108 can host applications and services 122 that automate or partially automate components of common V&V products; expected or common data transmissions, including components of data transmissions, from the user 104; expected or common interfaces and/or data exchanges, including components of interfaces, between various digital engineering tools 102; expected or common interfaces and/or data exchanges, including components of interfaces, with machine learning models implemented on the computing system 108 (e.g., models trained and/or implemented by the machine learning engine 120); and expected or common interfaces and/or data exchanges between the applications and services themselves (e.g., within the applications and services layer 122).

In some implementations, the data from multiple uses of the ecosystem 100 (or a portion of said data) can be aggregated to develop a training dataset. This training dataset can then be used to train machine learning models (e.g., using the machine learning engine 120) to perform a variety of tasks including the identification of which of the digital engineering tools 102 to use to satisfy a particular common V&V product; the identification of specific models, tests, and/or simulations (including inputs to them) that should be performed using the digital engineering tools 102; the identification of the common V&V products that need to be considered for a product of a particular type; the identification of one or more recommended actions for the user 104 to take in response to a failed regulatory requirement; the estimation of model/test/simulation sensitivity to particular inputs; etc. The outputs of the trained machine learning models can be used to implement various features of the interconnected digital engineering and certification ecosystem 100 including automatically suggesting inputs (e.g., inputs to the digital engineering tools 102) based on previously entered inputs, forecasting time and cost requirements for developing a product, predictively estimating the results of sensitivity analyses, and even suggesting design changes, original designs, or design alternatives (e.g. via assistive or generative AI) to a user's prototype to overcome one or more requirements (e.g., regulatory and/or certification requirements) associated with a common V&V product. In some implementations, with enough training data, the machine-learning engine 120 may generate new designs, models, simulations, tests, and/or common V&V products on its own based on data collected from multiple uses of the ecosystem 100.

In addition to storing usage data to enable the development of machine learning models, previous prototype designs and/or solutions (e.g., previously designed components, systems, models, simulations and/or other engineering representations thereof) can be stored within the ecosystem 100 (e.g., in storage 118) to enable users to search for and build upon the work of others. For example, previously designed components, systems, models, simulations and/or other engineering representations thereof can be searched for by the user 104 and/or suggested to the user 104 by the computing system 108 in order to satisfy one or more requirements associated with a common V&V product. The previously designed components, systems, models, simulations, and/or other engineering representations thereof can be utilized by the user 104 as is, or can be utilized as a starting point for additional modifications. This store, or repository, of previously designed components, systems, models, simulations, and/or other engineering representations thereof (whether they were ultimately certified) can be monetized to create a marketplace of digital products, which can be utilized to save time during the digital product development process, inspire users with alternative design ideas, avoid duplicative efforts, and more. In some implementations, data corresponding to previous designs and/or solutions may only be stored if the user who developed the design and/or solution opts to share the data. In some implementations, the repository of previous designs and/or solutions can be containerized for private usage within a single company, team, organizational entity, or technical field for private usage (e.g., to avoid the unwanted disclosure of confidential information). In some implementations, user credentials associated with the user 104 can be checked by the computing system 108 to determine which designs and/or solutions stored in the repository can be accessed by the user 104. In some implementations, usage of the previously designed components, systems, models, simulations, and/or other engineering representations thereof may be available only to other users who pay a fee for a usage.

Figure 2A:
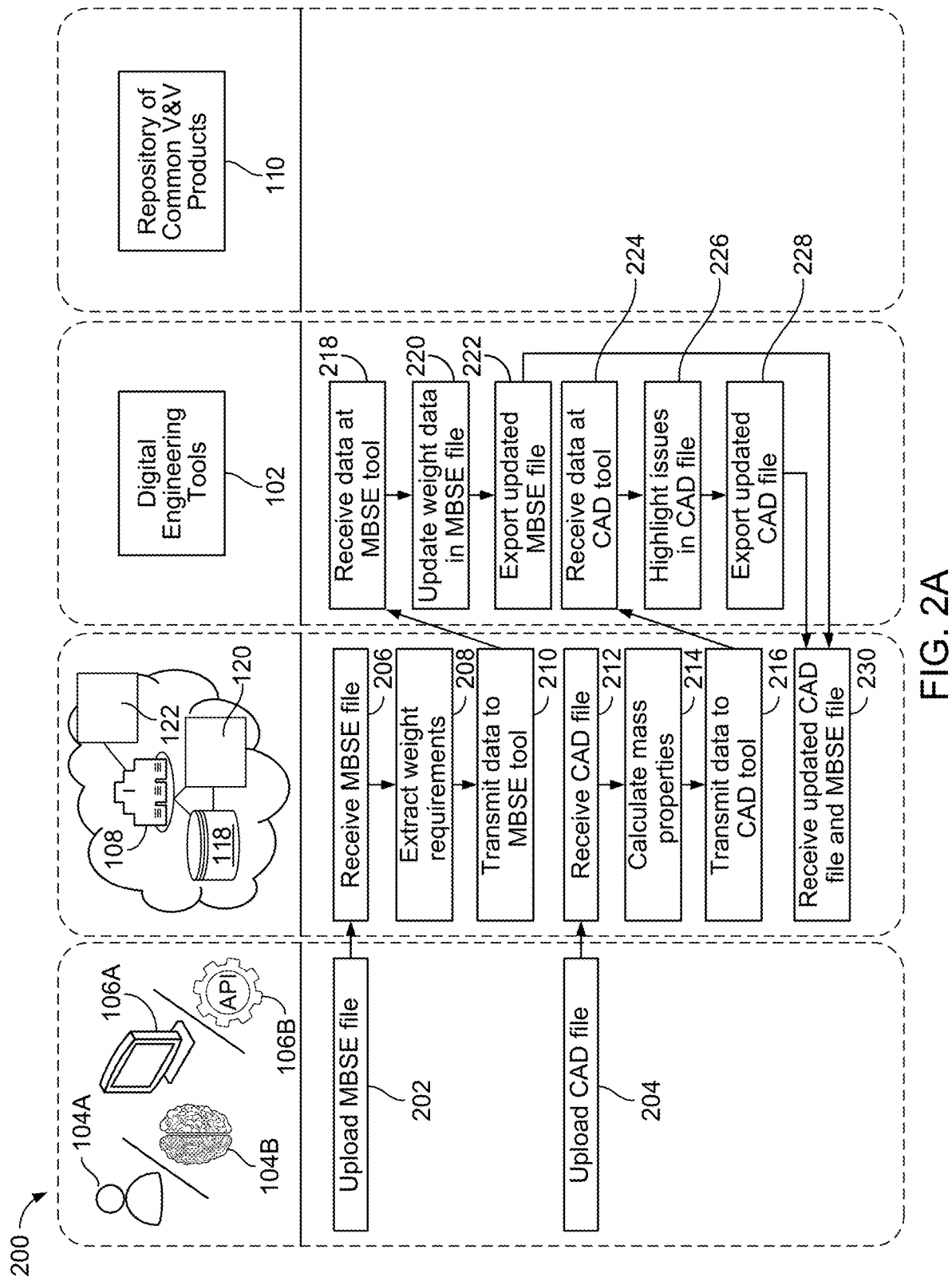
FIGS. 2A-2B are flow charts showing an example workflow involving an interconnected digital engineering and certification ecosystem.
Figure 2B:
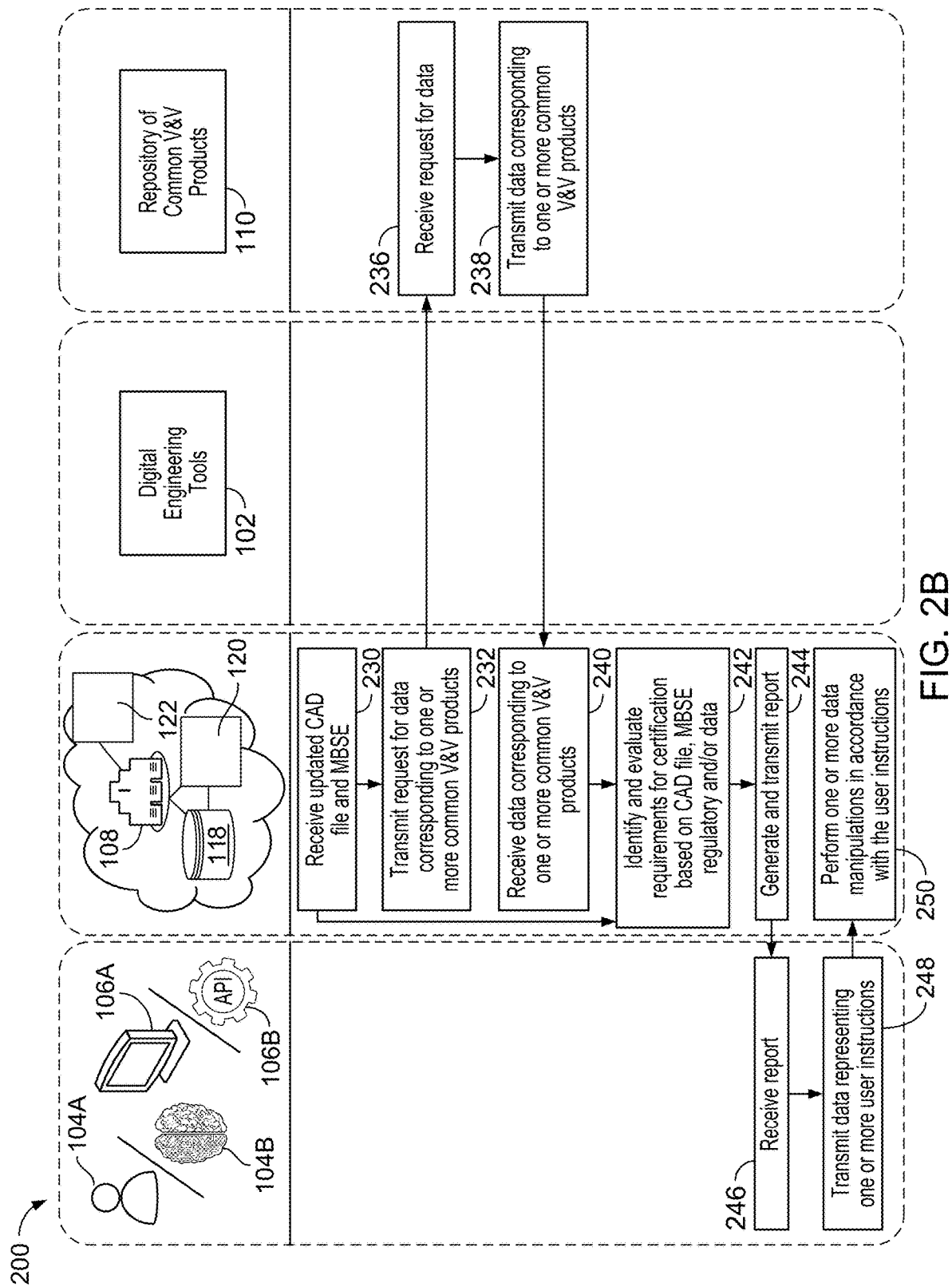

Referring now to FIGS. 2A-2B, an example digital product development and certification workflow 200 is shown, which can be implemented using the integrated digital engineering and certification ecosystem 100 (shown in FIG. 1). While not intended to be limiting, the workflow 200 is used to describe a demonstrative and practical example illustrative of the kinds of workflows enabled by the ecosystem 100 and its various features. In FIGS. 2A-2B, individual steps of the workflow 200 are grouped by the elements of the ecosystem 100 that perform them (i.e., the user device 106A or the API 106B operated by the user 104;

the computing system 108 connected to (and/or including) the storage 118, the machine learning engine 120, and the applications and services layer 122; the digital engineering tools 102; and the repository of common V&V products 110).

At step 202, the user 104 can upload a MBSE file corresponding to a digital representation of a product (e.g., a UAV) from the user device 106A or the API 106B to the computing system 108. At step 204, the user 104 can also upload a CAD file corresponding to the digital representation of the product from the user device 106 to the computing system 108.

The computing system 108 can receive the MBSE file (206), process the MBSE file to extract weight requirements (208), and transmit data to a MBSE tool (210). For example, the data transmitted to the MBSE tool can include updated weight data, which the computing system 108 can request the MBSE tool to update the MBSE file. The request can be made, for example, via the API 114 shown in FIG. 1.

Likewise, the computing system 108 can receive the CAD file (212), process the CAD file to calculate (e.g., mass properties (214) of the digital prototype), and can transmit data to a CAD tool (216). For example, the data transmitted to the CAD tool can include identified weight issues, which the computing system 108 can request the CAD tool to update the CAD file with (e.g., by highlighting the identified issues in the CAD file). This request can also be made via the API/SDK 114 shown in FIG. 1.

At step 218, the MBSE tool (e.g., one of the digital engineering tools 102) can receive the data transmitted to the MBSE tool from the computing system 108. The MBSE tool can then update the weight data in the MBSE file (220) and export the updated MBSE file (222) to the computing system 108.

Likewise, at step 224, the CAD tool (e.g., another one of the digital engineering tools 102) can receive the data transmitted to the CAD tool from the computing system 108. The CAD tool can then update the CAD file to highlight issues in the CAD file (226) and export the updated CAD file (228) to the computing system 108.

At step 230, the computing system 108 can receive the updated CAD file and MBSE file exported by the CAD tool and the MBSE tool, respectively.

At step 232, the computing system 108 can transmit a request for data (e.g., regulatory and/or certification data) corresponding to one or more common V&V products (232). For example, the request can be transmitted via the API/SDK 116 shown in FIG. 1 to be processed at the repository of common V&V products 110, which, as described previously, can be hosted by a regulatory and/or certification authority or another third party. While step 232 is shown subsequent to the communication of the computing system 108 with the digital engineering tools 102 in the workflow 200 (e.g., steps 210, 216, 222, 228, and 230), in some implementations, the computing system 108 can retrieve the data corresponding to the one or more common V&V products from the repository of common V&V products 110 prior to communicating with the digital engineering tools 102. In the example shown in FIGS. 2A-2B, the data requested at step 232 can correspond to "MIL HDBK 516c 5.5.2 (JSSG-2006)"—a regulatory standard that sets forth weight and center of gravity requirements for an aircraft to be certified as "airworthy." The repository of common V&V products 110 can receive the request for data corresponding to the one or more common V&V products (236) and transmit the corresponding data (238) to the computing system 108, which can, in turn, receive the data corresponding to the one or more common V&V products (e.g., regulatory and/or certification data) (240).

At step 242, the computing system 108 can process the updated CAD file and MBSE file (received at step 230) and the data corresponding to the one or more common V&V products (received at step 240) to identify and evaluate one or more requirements for certification. For example, the computing system can automatically process the CAD file and MBSE file to compute the weight and center of gravity for a physical manifestation of the digital prototype. The computing device can then compare these to the requirements for weight and center of gravity of aircraft identified within the data corresponding to "MIL HDBK 516c 5.5.2 (JSSG-2006)."

At step 244, based on the computing system's evaluation of the requirements identified within the data corresponding to "MIL HDBK 516c 5.5.2 (JSSG-2006)," the computing system 108 can generate and transmit a report to the user device 106A or API 106B. The report can summarize the results of the evaluation, including an indication of whether the identified requirements were satisfied. In some implementations, the report can also include one or more recommended actions for the user. The recommendations can be generated, for example, using the machine-learning engine 120 as previously described above in relation to FIG. 1.

At step 246, the user device 106A or the API 106B can receive the report, and the user 104 can review the report. For example, the report can be presented on a display of the user device 106A in order to be reviewed by the human user 104A and/or be received at the API 106B for processing by the artificial user 104B. In response to reviewing the report, the user 104 can operate the user device 106A or the API 106B to update the prototype design and/or transmit data representing one or more user instructions (248) to the computing system 108. As described previously, such user instructions can include instructions for the computing system 108 to re-evaluate an updated prototype design, use one or more different digital engineering tools 102 for the evaluation process, and/or modify the inputs to the digital engineering tools 102. At step 250, the computing system 108 can receive the one or more user instructions and perform one or more data manipulations in accordance with the one or more user instructions. In this way, the workflow 200 can enable the iterative design of a digital prototype using the interconnected digital engineering and certification ecosystem 100 to design and certify a product such as a UAV, drug, manufacturing process, etc. entirely within the digital world.

Figure 3:
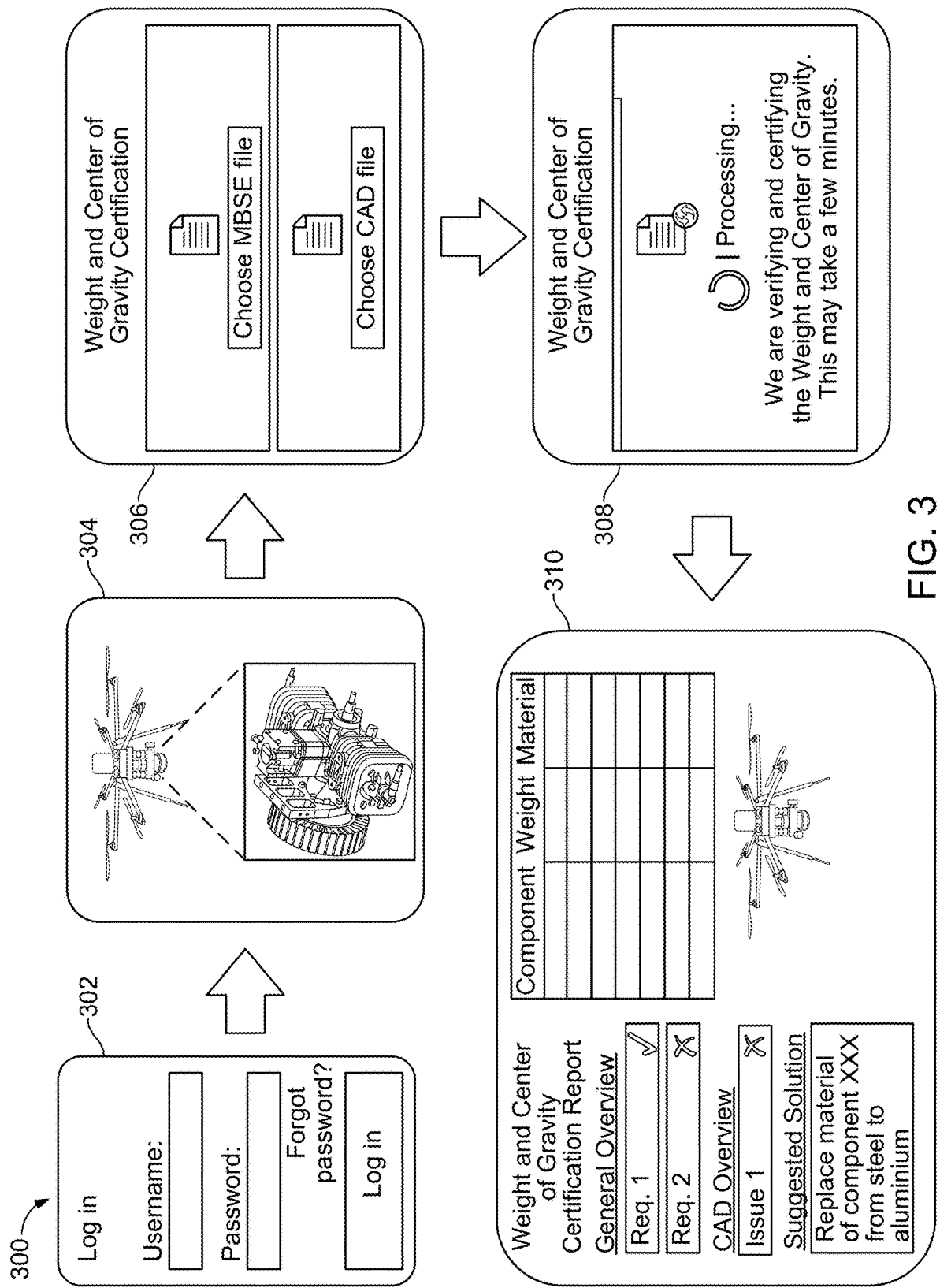
FIG. 3 shows a series of example displays shown on a user device corresponding to the example workflow of FIGS. 2A-2B.

In FIG. 3, a series of example displays 300 shown on the user device 106A is illustrated. It is noted that in implementations involving artificial users 104B that interface with the computing system via an API 106B, no displays are needed since artificial users 104B can directly process digital computer files received at the API 106B without further visualization. The series of example displays 300 can correspond to the example workflow 200 described in relation to FIGS. 2A-2B. Once again, these displays are not intended to be limiting, but are merely demonstrative of the kinds of user experiences that user 104 (and in particular, a human user 104A) may encounter while using the interconnected digital engineering and certification ecosystem 100 for digital product development. The series of example displays 300, as described herein, highlight the case of use of the ecosystem 100 and the avoided complexity of requiring a user to separately interface with individual digital engineering tools and manually review complex common V&V products to evaluate if a prototype of a product should be certified.

Display 302 shows a login screen that can be displayed on the user device 106A. The login screen can prompt the user 104 to input user credentials (e.g., username and password) to access the computing system 108 and the rest of the interconnected digital engineering and certification ecosystem 100. The user credentials associated with user 104 can serve a variety of functions. For example, as previously described, the user credentials can be associated with a skill level of the user, which can control what functionalities of the ecosystem 100 the user 104 can access. In some implementations, the user credentials can additionally or alternatively be associated with an affiliation of the user (e.g., with a particular company and/or organizational entity), which can govern the previously designed products and/or solutions that a user may search for and/or be suggested by the computing system 108. In general, user credentials can help ensure that the user 104 is only able to access information within the ecosystem 100 the user 104 is qualified and/or authorized to access.

Once the user 104 has logged in from the user device 106A, the user device 106A can be used to develop a digital prototype for a product. For example, display 304 shows a modeling screen the user 104 might see while developing a digital model of a UAV (e.g., using a CAD tool). Once the prototype has been developed, the user can upload prototype data, such as a CAD file and/or a MBSE file to the computing system 108 (e.g., as in step 202 and step 204 of the workflow 200). Accordingly, display 306 shows a screen that can prompt the user 104 to upload the MBSE file and the CAD file to the computing system 108.

Once the user has uploaded the MBSE file and the CAD file to the computing system 108, the computing system 108 can perform a number of steps to evaluate the prototype with respect to one or more requirements identified in a common V&V product and to generate a report summarizing the evaluation (e.g., steps 206, 207, 210, 212, 214, 216, 230, 232, 240, 242, and 244 of the workflow 200). In doing so, the computing system 108 may also communicate with the digital engineering tools 102 and repository of common V&V products 110, which can themselves perform operations to facilitate the evaluation of the prototype (e.g., steps 218, 220, 222, 224, 226, 228, 236, and 238 of the workflow 200). These steps take time to complete (e.g., ranging from a few seconds to several hours), during which the display 308 can be shown on a screen of the user device 106A, providing information about the current status of the evaluation of the prototype.

Once the evaluation of the prototype is complete, a generated report can be transmitted to the user device 106A from the computing system 108 (e.g., at step 244 of the workflow 200). Display 310 shows a screen of the user device 106A that presents the report to the user 104. The report can present information indicating whether or not one or more requirements identified in the common V&V product of interest have been satisfied and can present information about one or more issues that resulted in a failed requirement (e.g., a problematic component of the device). In some implementations, the presented information can also include more detailed data from the evaluation and/or a suggested solution for resolving the one or more issues to satisfy the requirements. The easily digestible format of the report presented on the display 310 can assist the user 104 with understanding the reasons why a prototype might fail one or more requirements and can provide the user 104 with actionable suggestions to improve the digital prototype. Even in implementations involving an artificial user 104B (where screen displays are not needed), a concise or standardized report in the form of a digital computer file sent to the API 106B can likewise assist the artificial user 104B with understanding the reasons why a prototype might fail one or more requirements and can provide the artificial user 104B with actionable suggestions to improve the digital prototype.

Figure 4:
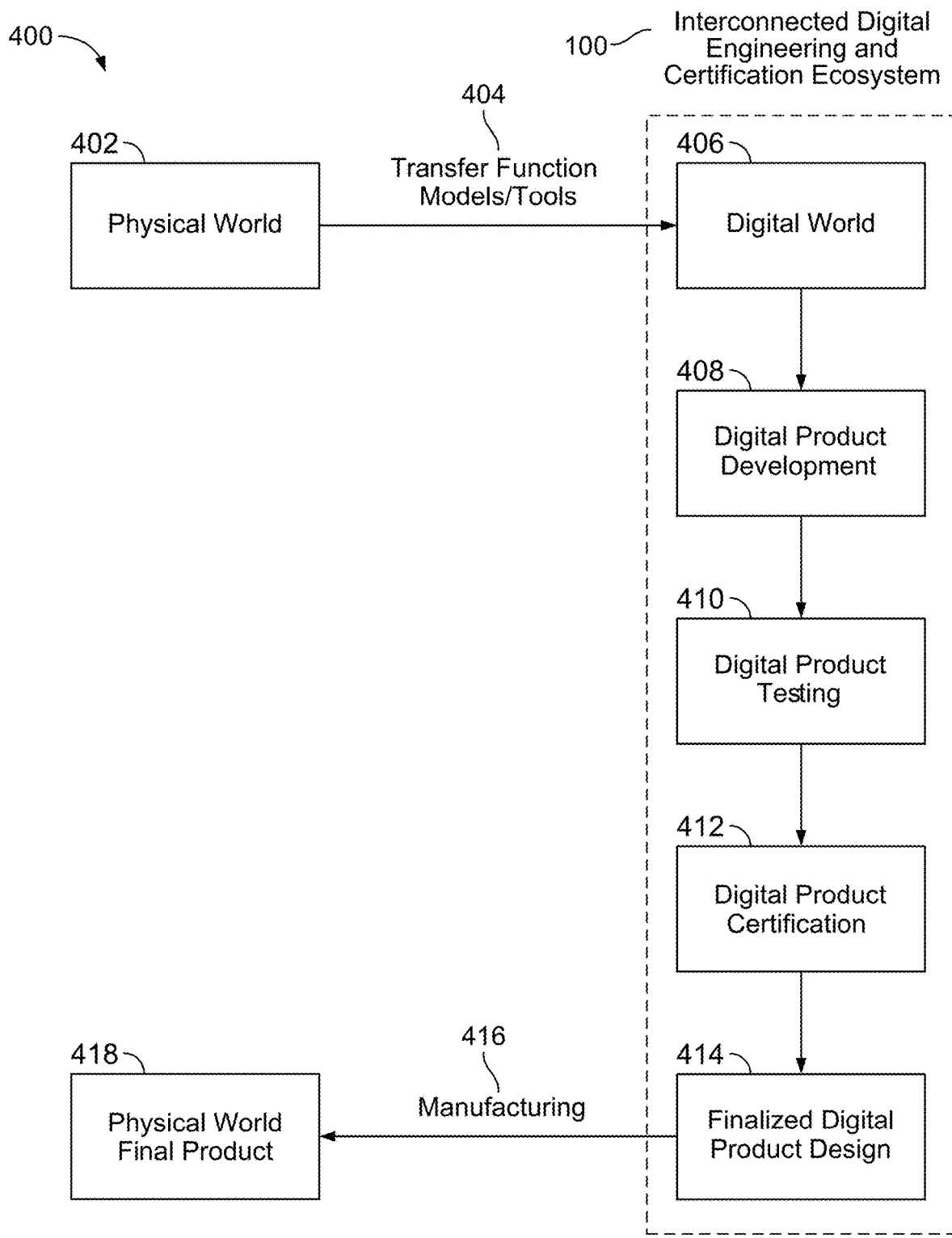
FIG. 4 is a flow chart showing an example product design process using an interconnected digital engineering and certification ecosystem.

In FIG. 4, a flow chart 400 is depicted, illustrating an example product design process using the interconnected digital engineering and certification ecosystem 100. By translating elements and characteristics such as laws of physics from the physical world 402 to a digital world 406, via transfer function models and tools 404, product development and certification can be enabled entirely (or nearly entirely or partially) within the ecosystem 100. It is noted that the entire physical world need not be perfectly replicated all at once, but in some cases, very specific subsets of the physical world can be described digitally by any number of models or simulations (e.g., a model describing turbulent flow of air between 200 and 600 knots, complemented by another model describing turbulent flow of air between 500 and 800 knots), which all together add up to a sufficient representation of the physical world so as to allow for certification of specific systems or products. An interconnected digital engineering and certification ecosystem (e.g., the ecosystem 100) can allow for each of these pieces to be added individually by many different people and many different entities without the need for coordination and with aligned incentives (e.g., enabled by protection of intellectual property, monetization of models or valuable digital representations of the physical world, etc.), to allow the digital representation of the physical world to be built in a modular and complementary manner, enabling each of the models or simulations to connect to one another and build off of one another. For example, digital product development 408, digital product testing 410, and digital product certification 412 can all occur within the ecosystem 100, taking place entirely within a digital realm or "metaverse" to produce a finalized digital product design 414. Following this product design process, the finalized digital product design need only be translated into the physical world (e.g., via manufacturing 416) to produce a physical world final product 418 at the very end of the product design process. This is in stark contrast to current product development and certification workflows, which may utilize digital engineering tools, but oftentimes still require the physical manufacturing, testing, and certification of prototypes throughout the iterative product development, product testing, and product certification process. Compared to such workflows, the product design process enabled by the interconnected digital engineering and certification ecosystem 100, can therefore yield significant savings of time, cost, materials, and environmental impact.

Figure 5:
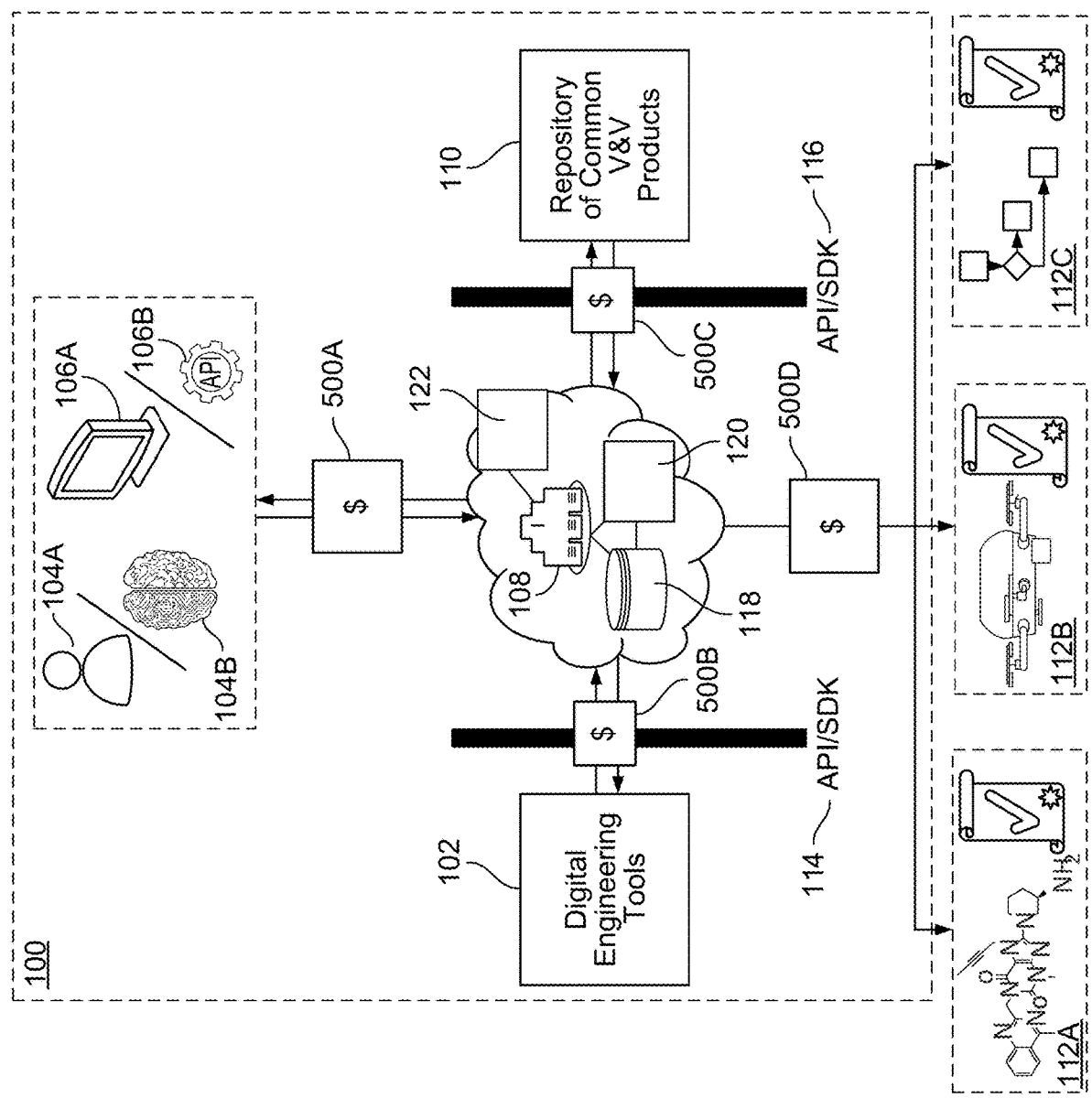
FIG. 5 is a diagram showing how an interconnected digital engineering and certification ecosystem can be monetized.

In FIG. 5, the interconnected digital engineering and certification ecosystem 100 presents various different opportunities for monetization (shown as blocks 500A-500D). In some implementations, interactions between the user 104 and the computing system 108 can include an opportunity for monetization 500A. For example, the user 104 can be charged to send instructions to the computing system 108 and/or the user 104 can be charged to download data from the computing system 106 (e.g., certification reports). Charges can be subscription-based (e.g., charging a monthly or annual fee to use the computing system 108), usage-based (e.g., charging the user 104 based on a number of interactions with the computing system 108, an amount of time spent interacting with the computing system 108, etc.), or mixed (e.g., using a freemium model).

In some implementations, interactions between the computing system 108 and the digital engineering tools 102 can include an opportunity for monetization 500B. For example, the user 104 can be charged for sending data between the computing system 108 and/or the digital engineering tools 102. In some implementations, the charges paid by the user 104 can be split between third party providers of the digital engineering tools 102 and a party that operates the computing system 108. In some implementations, the third party providers of the digital engineering tools 102 may themselves pay a fee to the operator of the computing system 108 to have their digital engineering tools be included in the ecosystem 100. Charges to the user 104 can be subscription-based (e.g., charging a monthly or annual fee to gain access to particular digital engineering tools 102), usage-based (e.g., charging the user 104 based on an amount of data transferred between the digital engineering tools 102 and the computing system 108, an amount of processing time required by the digital engineering tools 102, etc.), or mixed (e.g., using a freemium model).

In some implementations, interactions between the computing system 108 and the repository of common V&V products 110 can include an opportunity for monetization 500C. For example, the user 104 can be charged for sending data between the computing system 108 and/or the repository of common V&V products 110. In some implementations, the charges paid by the user 104 can be split between the authorities operating the repository of common V&V products 110 and a party that operates the computing system 108. Charges to the user 104 can be subscription-based (e.g., charging a monthly or annual fee to gain access to the repository of common V&V products 110), usage-based (e.g., charging the user 104 based on an amount of data transferred between the repository of common V&V products 110 and the computing system 108, a number of common V&V products requested, etc.), or mixed (e.g., using a freemium model).

In some implementations, the ultimate certification of the digitally certified products 112 by the computing system 108 can also include an opportunity for monetization 500D. For example, the user 104 can be charged a fee to perform a formal certification of the user's product. In addition or alternatively, the user 104 can be charged a fee to download a proof of certification.

Figure 6:
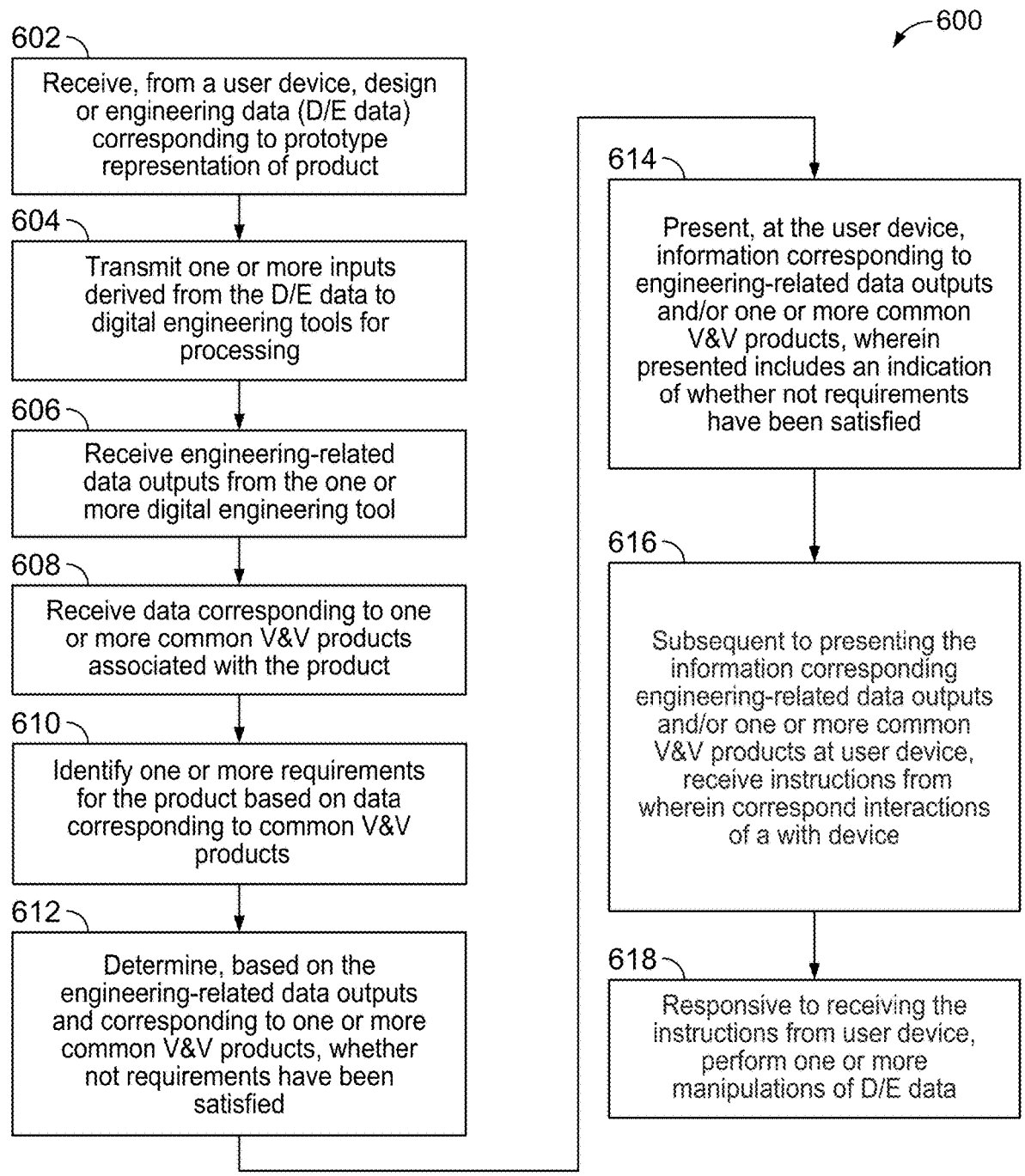
FIG. 6 is a flow chart showing a process for product development performed by a computing system of an interconnected digital engineering and certification ecosystem.

FIG. 6 illustrates an example process 600 for product development. In some implementations, the process 600 can be executed by a computing system (e.g., computing system 108) of an interconnected digital engineering and certification ecosystem (e.g., the ecosystem 100).

Operations of the process 600 include receiving, from a user device, design and/or engineering data (D/E data) corresponding to a prototype representation of a product (602). For example, the user device can correspond to the user device 106A or the API 106B, and the D/E data can correspond to a MBSE file, a CAD file, and/or other digital files or information associated with a digital prototype, as described above. In some implementations, the product can be a UAV or another type of aircraft; car; boat; underwater vehicle; industrial robotic; spacecraft; satellite; structure; tool; physical device; mobile device; drug, chemical product or biologic; manufacturing process; or any other complex system (either physical or non-physical) that may be assessed against a common V&V product.

Operations of the process 600 also include transmitting one or more inputs derived from the D/E data to one or more digital engineering tools for processing (604). For example, the one or more digital engineering tools can correspond to the digital engineering tools 102 described above. In some implementations, at least a subset of the one or more digital engineering tools can include model-based systems engineering (MBSE) tools, augmented reality (AR) tools, computer aided design (CAD) tools, robotics simulation and programming tools, data analytics tools, modeling and simulation (M&S) tools, geographic Information System (GIS) tools for spatial analysis, product lifecycle management (PLM) tools, Internet of Things (IoT) platforms, virtual and augmented reality design tools, human-machine interface (HMI) design tools, and simulation engines. The digital engineering models can include requirements models, electronics models, test-plan models, cost-models, schedule models, software modeling, supply-chain models, manufacturing models, cyber security models, multi-attribute tradespace tools, finite element analysis models, computational fluid dynamics models, computational electromagnetics models, Noise, Vibration, and Harshness (NVH) simulation models, control system design and simulation models, structural analysis and optimization models, power system analysis and simulation models, thermal analysis and simulation models, failure analysis and prediction models, digital twin models, artificial intelligence and machine learning models, environmental impact models, mission effects models, or other similar digital engineering tools that may be recognized as engineering design tools by a person of ordinary skill in the relevant field.

Operations of the process 600 also include receiving engineering-related data outputs from the one or more digital engineering tools (606). For example, the engineering-related data outputs can correspond to the results of models, tests, and/or simulations performed by the data engineering tools 102, as described above.

Operations of the process 600 also include receiving data corresponding to one or more common V&V products associated with the product (608). For example, the one or more common V&V products can be digitized regulatory and/or certification standards and can correspond to the common V&V products 110A-110J stored in the repository of common V&V products 110 described above. In some implementations, the data corresponding to the one or more common V&V products can be received from the user device (e.g., via a user upload). In some implementations, the data corresponding to the one or more common V&V products can be received from a regulatory and/or certification authority (e.g., via a repository of common V&V products hosted or maintained by the regulatory and/or certification authority).

Operations of the process 600 also include identifying one or more requirements for the product based on the data corresponding to the one or more common V&V products (610). For example, the one or more requirements can correspond to requirements that must be satisfied in order to certify a product in accordance with a particular common V&V product.

Operations of the process 600 also include determining, based on the engineering-related data outputs and the data corresponding to the one or more common V&V products, whether the one or more requirements have been satisfied (612). In some implementations, rather than making a binary determination, the operations of the process 600 can include determining whether or not the one or more requirements are likely to be satisfied by the prototype representation of the product (e.g., based on an estimated probability). In some implementations, determining whether the one or more requirements have been satisfied (or are likely to be satisfied) based on the engineering-related data outputs can include determining, with or without human input, whether the one or more requirements have been satisfied.

Operations of the process 600 also include presenting, at the user device, information corresponding to the engineering-related data outputs and/or the data corresponding to the one or more common V&V products, wherein the presented information includes an indication of whether the one or more requirements have been satisfied (614). In some implementations, the presented information can include an indication of a probability of whether the one or more requirements would be satisfied by the prototype representation of the product. For example, the information can be presented at the user device in the form of a report, as shown in the display 310 of FIG. 3 and as described above. In some implementations, the presented information can further include a recommended action the user of the user device can take to satisfy the one or more requirements. In such implementations, the recommended action can include a suggestion to use a particular digital engineering tool of the one or more digital engineering tools, a suggestion to modify the one or more inputs transmitted to the one or more digital engineering tools, a suggestion to modify one or more components of the prototype representation of the product, a suggestion to replace one or more components of the prototype representation of the product with a previously designed solution, and/or a suggestion of a wholly or partially new design generated by the system (e.g., using the machine learning engine 120).

Operations of the process also include, subsequent to presenting the information corresponding to the engineering-related data outputs and/or the data corresponding to the one or more common V&V products at the user device, receiving instructions from the user device, wherein the instructions correspond to one or more interactions of a user with the user device (616).

Operations of the process also include being responsive to receiving the instructions from the user device, performing one or more manipulations of the D/E data (618). In some implementations, performing the one or more manipulations of the D/E data can include modifying the D/E data and/or deriving modified inputs from the D/E data for transmission to the one or more digital engineering tools.

Additional operations of the process 600 can include the following. In some implementations, the process 600 can include storing, on a storage device, usage data representing the received data corresponding to the one or more common V&V products, the received D/E data, the engineering-related data outputs from the one or more digital engineering tools, the indication of whether the one or more requirements have been satisfied (or are likely to be satisfied), the one or more interactions of the user with the user device, and/or the one or more manipulations of the D/E data. The process 600 can also include incorporating applications and services (e.g., the applications and services 122) that automate or partially automate determinations of whether the one or more requirements have been satisfied or partially satisfied. The process 600 can also include incorporating at least a portion of the usage data in a training dataset, and training a machine-learning model based on the training dataset. In some implementations, the machine learning model can be configured to receive, as input, information relating to another product being designed by another user, and output a suggestion for the another user to use a particular digital engineering tool of the one or more digital engineering tools, a suggestion to modify one or more inputs transmitted to the one or more digital engineering tools by the another user, a suggestion to modify one or more components of another prototype representation associated with the another user, and/or a suggestion to replace one or more components of the another prototype representation with a previously designed solution. In some implementations, the process 600 can also include using the stored usage data for one or more sensitivity analyses. In some implementations, the process 600 can also include using the stored usage data to improve the performance of applications and services (e.g., the applications and services 122).

In some implementations, additional operations of the process 600 can include checking one or more credentials of the user prior to performing the one or more manipulations of the D/E data, and determining, based on the one or more credentials, that the user is qualified or authorized to perform the one or more manipulations of the D/E data.

The interconnected digital engineering and certification ecosystem can be implemented with methods and approaches that take a zero trust approach with the users interacting with the system. Moreover, the interconnected digital engineering and certification ecosystem can apply a zero trust approach with the computer networks through which the users interact and extend the zero trust approach methodology to the access and computation of the data related to the individual digital models, tools, or MBSE files used by the users as part of the V&V product purposes.

In some examples, the policies of the security architecture can include model storage policy, model access policy, attribute-based access control, handling of read vs. write queries, traceability and auditability, and a model trust policy, etc. The implementation details are outlined in examples described throughout the specification. For instance, this can include restricting model access to specific API functions, authenticating users and models at endpoints, allowing customers (e.g., model owners or model developers) to set additional access control policies, implementing data restrictions and encryptions, recording endpoint transactions in a secure database, and incorporating digital watermarks for traceability and auditability, etc. The goal of implementing the security architecture is to ensure the right authenticated user has access to the right authenticated model and to assess model truth and user credibility.

Figure 7:
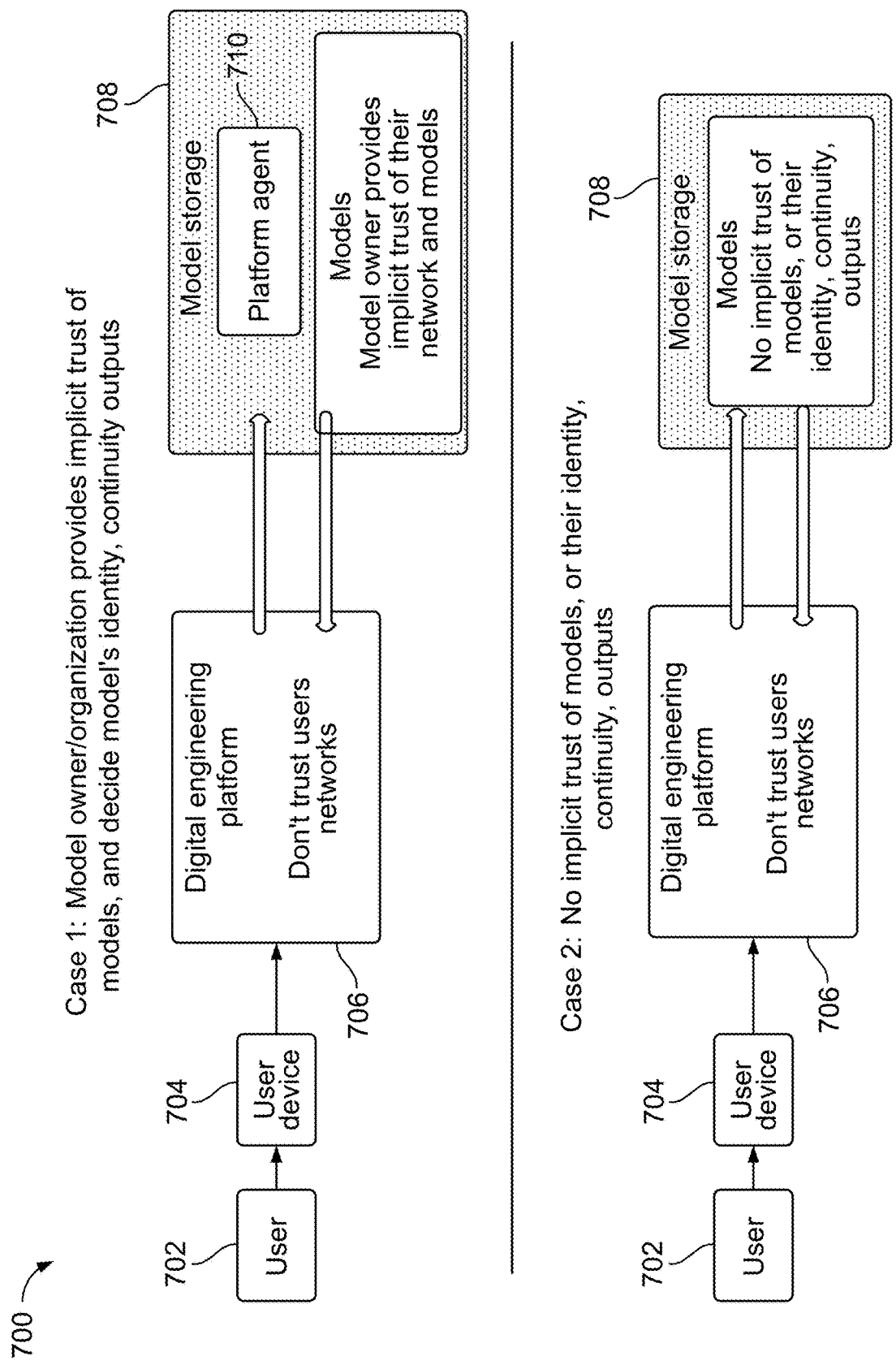
FIG. 7 is a diagram illustrating example embodiments of zero trust where models stay within a customer environment or within a secure storage, unaffiliated to any single customer.

Zero trust for models in the digital engineering and certification ecosystem, as illustrated in FIG. 7, can differ in terms of the location of model storage. In some implementations, models can stay within the customer environment and can be associated with a specific customer. In some implementations, models are stored in a secure, unaffiliated storage separate from any single customer. This allows for a more secure, centralized and more openly accessible storage of models, but also means there are no assurances about the specific model, its location, its current state and prior history, or the accuracy of its performance and outputs.

In some implementations, the digital engineering and certification ecosystem 700 illustrated in FIG. 7 can be employed by the computing system 108. In the digital engineering and certification ecosystem 700, the computing system 108 can enforce model storage policy. Specifically, the model storage policy can ensure digital engineering models stay within customer environments (e.g., as shown in case 1) or in a secure storage environment (e.g., as shown in case 2) separate from the platform. More specifically, the model storage policy can include private model storage 708 linked to the digital engineering and certification ecosystem 700.

In some implementations, the computing system 108 can enforce a model access policy with various criteria. Specifically, the computing system 108 can restrict access to model data to a specific subset of API functions through a model wrapper. More specifically, the computing system 108 can restrict access to model data by enabling users to be authenticated at endpoints for model wrappers. The user 702 can be authenticated at endpoints 704 (e.g., user devices, using attribute-based access control). These attribute-based access controls can include, for example, username, password, email, and security keys, etc. Moreover, customers (e.g., model owners) or users 702 who seek to access model data can provide additional model access control policies implemented at the endpoint device 704. These control policies can include, for example, read functions and write functions. The model access policy can provide security related to digitally watermarking the models, such as with digitally signed endpoint transactions.

In some implementations, the computing system 108 can enforce a data restrictions policy. With the data restrictions policy, a customer can configure a specific security policy, and implement encryptions and zero-knowledge succinct non-interactive argument of knowledge (zk-snarks), as applicable. The customer can configure the computing system 108 to implement a desired security, encryption, and zk-snarks policy, as desirable for accessing the model data. For no implicit trust of models, the computing system 108 can offer similar configuration policies for its users.

In some implementations, the computing system 108 can enforce a traceability and auditability policy. With the traceability and auditability policy, the computing system 108 can record endpoint transactions in a standard format. In some examples, the recorded endpoint transactions can be stored within a secure database. In some examples, the recorded endpoint transactions can be stored within a private blockchain. In some examples, the recorded endpoint transactions can be stored within both a secure database and a private blockchain. Moreover, the traceability and auditability policy enables the computing system 108 to perform threat detection, perform threat mitigation, and offer threat alerts. These threat level features enable the computing system 108 to offer customers updates should any threats be detected against their models, for example.

Additionally, as mentioned, the models can be digitally watermarked by the computing system 108. The various digital watermarks can include a human visible watermark, such as a Joint Photographic Experts Group (JPEG); a digitally signed hash value; one or more blockchains that store non-fungible tokens (NFTs); and/or GPT-Zero for how files have been modified and/or constructed. Other types of digital watermarks are also possible.

The digital engineering and certification ecosystem 700 illustrates various cases related to model trust. In some implementations, the digital engineering and certification ecosystem 700 illustrates a first case, in which a model owner or model organization provides implicit trust of models and decides a model's identity and continuity outputs. In the first case, a user 702 (e.g., a third party user) can interact with a user device 704 to access their respective model data from the digital engineering platform 706. The digital engineering platform 706 may not trust users' networks. Upon receiving the request, the digital engineering platform 706 can access the model storage 708 and access the respective models.

To access the respective models, the owners can provide implicit trust for models. The implicit trust for the models can be used within a customer environment and offer continuity outputs. The owners of the models (i.e., "model owners") can own the ground truth for models. The model owners can perform transactions on the models, such as performing transactions that are read queries that comply with the model owner's access restrictions for data and functions. Moreover, the model owners can perform transactions on the models that include writing to a model. The digital engineering platform 706 can receive the transaction and perform the requested transaction. For example, when a write transaction is performed, the digital engineering platform 706 can instruct the platform agent 710 to create a copy or fork of the model within the customer environment and apply the written transaction to the forked copy. The model owner can then decide whether to accept the edits made to the forked copy or reject the forked copy. Moreover, in the accord, the model owner can decide which models are valid and choose specific tools to validate the model itself.

In some implementations, the digital engineering and certification ecosystem 700 illustrates a second case in which there is no implicit trust of models, their identity, and continuity outputs. Similar to the first case, a user 702 (e.g., a third party user) can interact with a user device 704 to access their respective model data from the digital engineering platform 706. The digital engineering platform 706 may not trust users' networks. Upon receiving the request, the digital engineering platform 706 can access the model storage 708 and access the respective models. However, the model storage 708 may not include implicit trust of models or their identity and continuity outputs.

In the second case, the model storage 708 with no implicit trust stores models in secure storage. Specifically, the model storage 708 can store multiple secure model identifiers. The multiple secure model identifiers can include model identifiers and pointers to model addresses in a secure storage. In some examples, the model ID and pointers to model addresses can be stored in individual elements of a blockchain, and/or tokenized and stored in the individual elements of the blockchain. In this manner, should an unauthorized user gain access to the model storage with no implicit trust, the unauthorized user would not have access to the model data because of its storage in a separate and secure area. For continuity, the digital engineering platform 706 can approve endpoint transactions after the prior history of a model's V&V transactions are verified. In this manner, the digital engineering platform 706 can ensure that a subsequent transaction, such as a write function which may change the model, does not break a previously validated model state.

In some implementations, the model's transaction history can be stored within various databases. In some examples, the model's transaction history can be stored in a secure database of edit history with the associated cryptographic hashes. In some examples, the model's transaction history can be stored in a tokenized manner in a private transaction blockchain.

For enforcing the accord aspect, the digital engineering platform can seek consensus among a distributed set of models or DE tools for validation. Consensus mechanisms can enable a group of nodes, which include different digital engineering (DE) tools to evaluate or verify a specific digital model or multiple models within open-access storage, to agree on the output from the specific model. The consensus mechanisms may include PoS or PoR approaches, and ensure that all nodes in a network of open-access storage digital engineering models have the same view of the specific model's data, even in the presence of faulty or malicious nodes. The DE tools in different nodes may perform similar verification or evaluation operations on the specific model. In a zero trust policy for models, there is zero trust for these DE tools as well. No single DE tool's evaluation is relied upon and the consensus across a range of nodes with different DE tools' evaluations is instead used to seek accord. Other implementations of consensus mechanisms can ensure the models known to the network are the same, verified, and known sets able to be queried and updated. A different consensus mechanism may use an additional layer of verification and validation in the digital engineering sense to act as another voting metric within the system. In such a consensus approach, models must pass requirement thresholds specified in documentation or other metrics to meet. Once those are achieved in simulation space, models are assigned a score or weight, providing them a voting weight. In other implementations, the accord output for a model can also be managed as an entry in the model transaction database or as a fungible token within a transaction of a blockchain. Other examples are also possible.

In order to ensure the secure sharing of models in a digital engineering platform, the system for secure model sharing should meet audit and assurance requirements. In some examples, the digital engineering platform 706 can perform traceability by tracing any specific change to the system or specific model, such as changes performed by a model owner or other users. In some examples, the digital engineering platform 706 can perform monitoring and prevention functions. These functions can include maintaining an always-alert security posture for the system, such as detecting attacks, thwarting attacks, detecting threats, and providing alerts to users indicative of threats and/or attacks. Moreover, the digital engineering platform seeks to comply with NIST 800-171 and NIST 800-53.

In some implementations, the digital engineering platform 706 can share models and access to models with users who authenticate with the platform. In some cases, a user 702 can authenticate with the digital engineering platform 706 by providing their respective credentials (i.e., username and password). The digital engineering platform 706 can authenticate the user 702 upon determining their provided credentials match to stored credentials. In response to authenticating the user 702, the digital engineering platform 706 can provide the authenticated user 702 with access to the integrated development environment (IDE) that stores the various models. The IDE may store one model, thousands of models, or more. In some examples, the user 702 can access a particular model as a whole file. These models can include, for example, M&S tools, CAD tools, MBSE tools, AR tools, PLM tools, simulation engines, requirements models, electronics models, test-plan models, cost-models, schedule models, software modeling, supply-chain models, manufacturing models, cyber security models, multi-attribute tradespace tools, and mission effects models. Other models to be accessed are also available.

In some implementations, the digital engineering platform 706 can provide an authenticated user 702 access to multiple IDEs. In some examples, an IDE can be associated with a particular theme. A first IDE can include models related to finance, a second IDE can include models related to manufacturing, and so on, to name some examples. The digital engineering platform can provide the authenticated user 702 with access to one IDE, a subset of IDEs, or all of the IDEs, according to designated criteria. Specifically, the digital engineering platform 706 can provide the authenticated user with access to one or more IDEs based on their desired use.

In some implementations, the digital engineering platform 706 can provide an authenticated user 702 with access to a subset of functionalities of the models within the IDEs. For example, the digital engineering platform 706 can provide the authenticated user 702 with restricted or limited access to a limited functionality (e.g., "a slice") of the models in various IDEs or limited APIs using a wrapper of a specific model or multiple models. For example, the digital engineering platform 706 can enable the user 702 to access a first functionality or first slice of a model in a first IDE, a second functionality or second slice of a model in a second IDE, and a third functionality or third slice of a model in a third IDE. In this example, the digital engineering platform 706 can restrict the user's access to other functionalities in each of the models of the first IDE, the second IDE, and the third IDE. In some examples, the digital engineering platform 706 can enable the authenticated user 702 with access to subsets of slices in various IDEs. In this manner, the authenticated user 702 only has access to the slices afforded by the digital engineering platform in each of the various IDEs. As such, the digital engineering platform 706 can enable the authenticated user 702 to have access to any combination of slices in each of the multiple IDEs.

Figure 8:
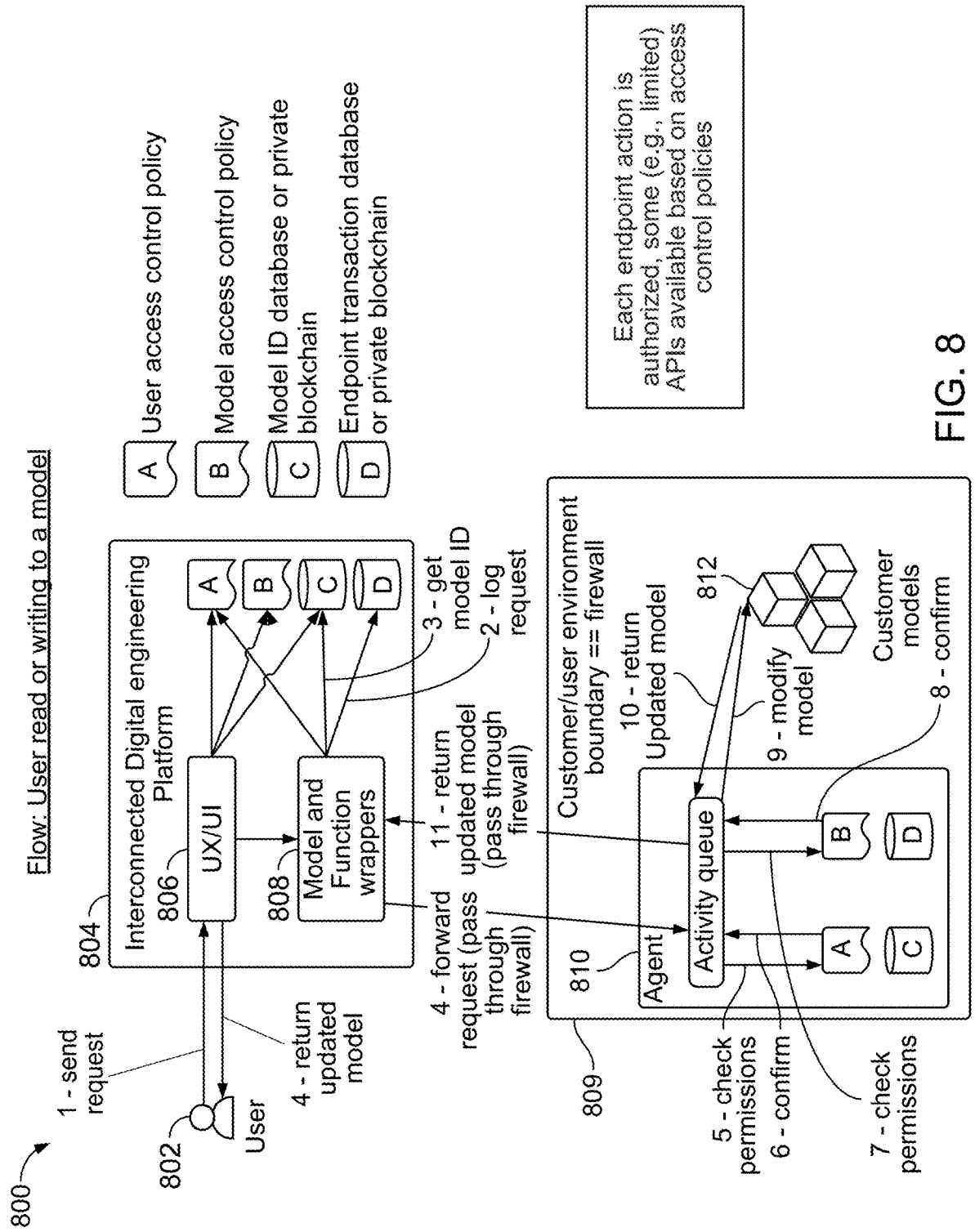
FIG. 8 is a diagram illustrating a sequence of actions to request access to a digital model within a customer's secure computing environment.

The various implementations of the computing environment illustrated in FIG. 8 differ in the location of the computing environment relative to the customer's computing environment 809. In some implementations, the computing environment can be separate from the customer's computing environment 809. In some implementations, an agent 810 of the customer's computing environment 809 can be instanced behind the customer's firewall. This can allow for more secure access and faster overall computations to the digital models 812 within the customer's computing environment 809, as the agent 810 can operate within the customer's firewall and access controls. However, having the computing environment separate from the customer's computing environment 809 can allow for more scalability and flexibility in accessing the digital models.

In some implementations, the digital engineering and certification ecosystem 800 of FIG. 8 illustrates a user 802 interacting with an interconnected digital engineering platform 804. The interconnected digital engineering platform 804 can communicate with a customer's computing environment 809 behind a firewall. Particularly, companies may safeguard their networks and limit the information they share outside their network by way of a firewall. This particular feature of limiting access to a company network can be extended to include the feature of model sharing.

When networks are not trusted, model linked information can be effectively shared across networks behind a firewall, for example. In some implementations, the models 812 can remain stored within customer companies' networks 809 and not be extracted from those networks. The model owners can own and maintain the ground truth of their models without removing models from behind the firewall, for example. Similarly, another benefit of the digital engineering and certification ecosystem 800 is that model wrappers 808 can link to a specific subset of functionality or a slice of the models within the company's own network. In this manner, an authenticated user 802 seeking access to a slice can receive output from the API or the slice of the models from behind the company's network, without the model leaving the company's network. Moreover, the model owners can define permissions for slices of their models.

As illustrated in the digital engineering and certification ecosystem 800, a user 802 can send a request to the interconnected digital engineering platform 804. The user experience (UX) or user interface (UI) component 806 can receive the request and log the request. Specifically, the UX/UI component 806 can log the request in an endpoint transaction database or a private blockchain. The endpoint transaction data or the private blockchain may be located within the interconnected digital engineering platform 804 or external to the interconnected digital engineering platform 804, such as in a cloud network.

In some implementations, the UX/UI component 806 may be located outside of the interconnected digital engineering platform 804. In this case, the UX/UI component 806 may be incorporated in a client device, for example, utilized by the user 802. The client device, with the incorporated UX/UI component 806, may communicate with the components within the interconnected digital engineering platform. For example, if the UX/UI component 806 remains outside the interconnected digital engineering platform 804, the UX/UI component 806 can continue to communicate with the model and function wrappers 808, as well as the user access control policy, the model access control policy, the model ID database or private blockchain, and the endpoint transaction database or private blockchain. The UX/UI component 806 may be located outside of the interconnected digital engineering platform in the other systems described throughout this specification.

In some implementations, such as that shown in FIG. 8, the UX/UI component 806 may be located within the interconnected digital engineering platform 804. This implementation complies with Zero Trust security principles, ensuring that only authorized users can access the user interface and interact with the platform and its associated artifacts.

Following the log of the request, the model and function wrappers 808 can communicate with the UX/UI component 806 to analyze which model the request is seeking by extracting data indicative of the model from the request. The model and function wrappers 808 can access a model ID from a model ID database or private blockchain using the extracted data indicative of the model from the request. The model ID database or private blockchain can store data that includes multiple model IDs, a location of the model, and other data that indexes the model IDS with the location of the model, to name some examples. The private blockchain that stores the data that includes the multiple model IDS and other information can be separate from the private blockchain that stores the log of the request from the user. In some examples, the private blockchains may be similar.

In response to receiving the model ID from the model ID database or private blockchain, the model and function wrappers 808 can transmit a forward request through a firewall or other network component to the customer's environment network 809. The customer's environment network 809 can include an agent 810 that monitors activity requests. The agent 810 can receive the forward request from the model and function wrappers 808 of the interconnected digital engineering platform 804 and verify the request's permission, indicating that it can access the data of the models within the customer's environment network 809. The agent 810 can verify the request's permissions with a database that stores user access control policy information. Verifying the request's permissions includes verifying the user is allowed access to the data stored in the one or more models 812 of the customer's environment network 809. If denied access, the agent 810 can provide a denial to the model and function wrappers 808. If allowed access, the agent 810 can verify the request's permissions with a database that stores model access control policy. If denied access, the agent 810 can provide a denial to the model and function wrappers.

If allowed access, the agent 810 can perform an action on the one or more customer models 812 within the customer's environment network 809. In some implementations, the action can include a read action, a write action, or some other type of action. In response to performing the action, the agent 810 can return an updated model or data indicative of an updated model through the firewall and to the model and function wrappers 808 of the interconnected digital engineering platform 804. In response, the model and function wrappers 808 can provide the data indicative of the updated model to the UX/UI component 806, and subsequently provide the same data to the user 802 via their endpoint device or user device. Other examples are also possible.

In some implementations, the digital engineering and certification ecosystem 800 ensures the models stay within the customer environment (model implicit trust) or in a secure stage (no model implicit trust). Specifically, the digital engineering and certification ecosystem 800 offers various data security protections. Specifically, the digital engineering and certification ecosystem 800 can track and authorize user access at endpoints or user devices. The tracking and authorization can be performed with attribute based access control (ABAC). For example, the interconnected digital engineering platform 804 can track and authenticate user profiles and enable access restrictions, which can be implemented by a central policy server stored at the interconnected digital engineering platform or external to the platform. In some examples, the central policy server can be updated by an endpoint transaction database or a private blockchain, to name a few examples.

In some implementations, the interconnected digital engineering platform 804 can record transactions at endpoints. Specifically, the interconnected digital engineering platform 804 can standardize transaction records at the endpoint. Moreover, the platform 804 can store various information or metadata related to the transaction records such as model owner organization, model owner ID, user ID, access rights of user, device ID, device location according to IP number and geographic location identifiers, an ID for the model and function wrappers, transaction commands related to the model and function wrappers calls, a time associated with each transaction command, and a value associated with the transaction. Other examples can include a function ID; a type of method to be called; a start time of transaction; an end time of transaction; a duration; the parameters of the call made by the model and function wrappers; the success of the call (e.g., either "TRUE" or "FALSE"); CPU cost time in money, time, and cycles; and GPU cost time in money, time, and cycles. Other examples are also possible.

In some implementations, the interconnected digital engineering platform 804 can store transaction history using cryptographic hashing. Specifically, the interconnected digital engineering platform 804 can tokenize the prior transactions and store the tokenized prior transactions on a private blockchain or an external private blockchain on a cloud network. In this manner, the interconnected digital engineering platform 804 can securely track and analyze end transactions from users who interact with the interconnected digital engineering platform 804 over time.

In some implementations, a user 802 can access the interconnected digital engineering platform 804 through their end device. Specifically, a user 802 can access the platform via their end device connecting the platform's user experience. Once connected, the user 802 can transmit the request to access a model, multiple models, or a particular slice of the model. As mentioned, the interconnected digital engineering platform 804 can record the access request in the endpoint transaction database or a private blockchain via the model and function wrappers 808 or an API. Moreover, the interconnected digital engineering platform 804 can fetch the model information (e.g., a model ID and other data) from the model ID database or private blockchain via the API. Then, the model and function wrappers 808 can forward the access request to the agent in the model owner's environment or customer owner's environment 809. The customer owner's environment 809 may be positioned behind one or more firewalls.

The firewall can either accept or deny the access request provided by the model and function wrappers 808. If the firewall accepts the access request, the request is forward to the agent 810 of the customer owner's environment 809. The agent 810 can verify the access request permissions with the user access policy server and the model access control policy. In response, the agent 810 can return the requested model to the interconnected digital engineering platform 804 via the model and function wrappers 808. If applicable, the firewall may either accept or deny the agent's access to provide the requested model. If accepted, the firewall can provide the requested model or data indicative of the requested model to the model and function wrappers 808. In response, the model and function wrappers 808 can display a model wrapper to the user 802 via their end device.

Figure 9:
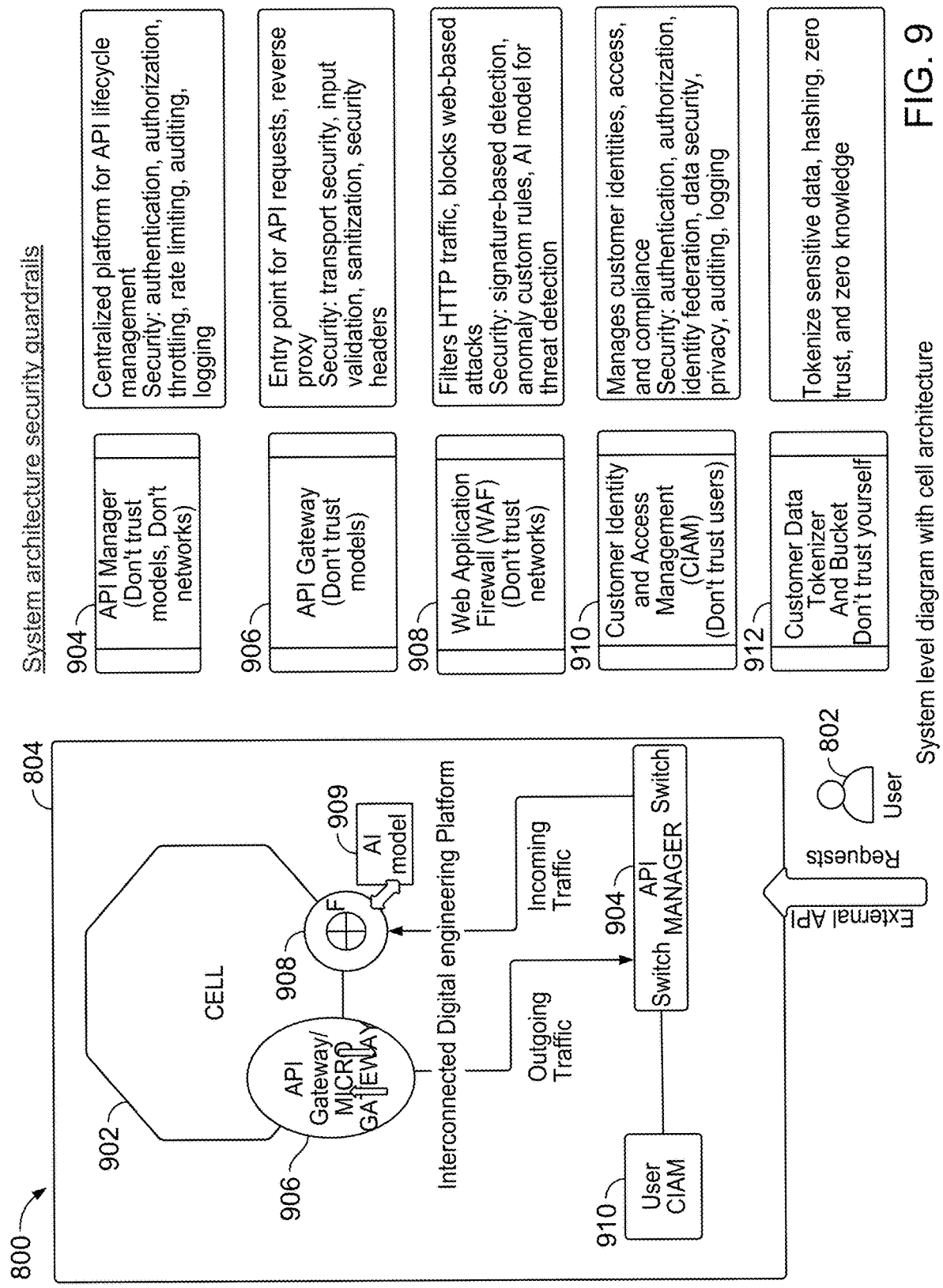
FIG. 9 is a diagram that shows the high-level components of the cell based security architecture, highlighting the security tenets that drive each one of the components.

FIG. 9 illustrates a diagram that shows high-level components of the cell based security, highlighting the security tenets that drive each one of the components. The security system includes an interconnected digital engineering platform 804. The interconnected digital engineering platform 804 includes one or more cells 902, an API manager 904, linking to one or more API gateways 906, one or more web application firewalls (WAFs) 908, a customer identity and access manager (CIAM) 910 and a user 802. The one or more cells 902 in the interconnected digital engineering platform contain API gateways 906, which serve as entry points for managing and processing API requests. In some implementations, an API gateway 906 serves only a single cell and can be referred to as a micro gateway. Each cell is securely protected by a WAF 908. The API manager 906 can communicate with each cell through a corresponding WAF and micro gateway that securely protects the cell.

Each cell is located within the interconnected digital engineering platform 804 and contains an API gateway 906. The WAF 908 is attached to the cell, providing an additional layer of security. The API manager 904 is housed in the services virtual application and is responsible for managing the entire platform's APIs. The user 802 can interact through the API manager 904 with the interconnected digital engineering platform 804.

In some implementation examples, the user interaction at the API manager 904 can itself be the output of orchestration scripts (e.g. python, java, or other scripts) executed on the digital engineering platform that reflect specific actions to be taken in a digital thread, implemented by specific actions at digital models hosted as microservices within the cells. For example, the specific actions can include modifications or adjustments to multiple digital models. The orchestration scripts can thus reflect the broader user workflow.

Cell-based security architecture manages each operation within a digital thread as a microservice within a cell. This approach enables the linking of various data, digital tools, and digital models across different networks with varying security restrictions. The architecture facilitates decentralized implementations from the outset, as it does not inherently assume any centralization or specific structure for the data environment, treating data operations as if they are in decentralized environments.

In many cases, the DE platform's cell security architecture creates and manages microservices across both centralized and decentralized environments. In other scenarios, the architecture can implement micro-centralized digital threads in air-gapped settings. For example, in an edge environment (e.g., a cyber-physical system with limited connectivity), edge nodes may need to centralize data to ensure robust operations. In such situations, a decentralized orchestration by the interconnected DE platform can also manage centralized data environments at the edge. This versatility is supported by the DE platform's consistent API ecosystem, accessible through an integrated coding environment for workflows. In some instances, this API ecosystem allows for the integration of AI models into workflows, enhancing the platform's capabilities and adaptability.

In some implementations, a "digital thread" connects two or more "model splices" through an "interpretable" platform script that connects one or more engineering model files using API wrappers (splices) for collaboration and sharing with individuals performing digital engineering tasks. A digital thread within the platform uses model splicers to connect digital engineering models. In one embodiment, a digital thread links digital models appropriately, so the appropriate outputs from a preceding model is provided as the inputs to a subsequent model (or the same model), allowing for information flow. For instance, a digital thread can be executed through the multiple cells.

A digital thread establishes the right connections between two different model splices for two different models at the corresponding endpoints. A digital thread is designed for scalability (the splices linked can themselves have digital threads within them). For instance, a digital thread develops an integration framework that enables efficient and effective monitoring and evaluation of the lifecycle by linking a wide variety of information systems and data sets across the various domains (e.g., design, manufacturing, quality) of the product lifecycle in dynamic ways without requiring one-to-one data mapping.

In some implementations, the digital platform can receive a request from the user for executing one or more modifications or adjustments to one or more digital models. The request can include one or more operations to perform upon the requested digital model. The API manager 904, in response to receiving the request, can extract the operations to be performed from the request, in sequence and thus define a digital thread for performing the operations. A requested task on a digital model is implemented as a microservice implementation within a cell. The digital platform thus implements the digital thread by utilizing the API gateway to perform each requested task on each requested digital model as a microservice within the corresponding cell. As mentioned, the digital thread can include one or more operations to be performed on the digital models using the microservices within the cells. The digital engineering platform can execute the digital thread by executing the one or more operations across the different cells. In some cases, the digital platform can perform the one or more operations of the digital thread across multiple cells. In some cases, the digital platform can perform the one or more operations of the digital thread in a single cell.

In an exemplary embodiment within a digital engineering ecosystem, the cell 902 serves as a container for one or more microservices, which includes a select set of APIs implementing logic that link to the APIs for the digital models or other client applications. A model splicer/wrapper within the cell connects various components within the ecosystem, allowing each cell to communicate and interact with each other securely and efficiently. The micro gateway 906 stores the configuration and security settings for the micro service and the micro services associated APIs, ensuring that each cell operates securely and effectively. Examples of the cell's micro gateway can include managing access to microservices, processing API requests, providing a secure entry point for client applications, and facilitating secure communication between digital models and other components within the digital engineering ecosystem.

The micro gateway 906 can include a lightweight, high-performance gateway that provides security and routing capabilities within the cell. The function of the micro gateway 906 is to enhance the security and performance of a respective cell by offloading some of the processing tasks, such as authentication and input validation, for example. Examples of the micro gateway's use include validating incoming requests, enforcing access control policies, and providing a secure communication channel between the request and the backend services, to name some examples.

In an exemplary embodiment within a digital engineering ecosystem 804, the WAF 908 inspects and filters data traffic associated with various APIs within the ecosystem. This includes monitoring requests to microservices within a cell and the outputs returned from the microservices within a cell. By inspecting and filtering the incoming traffic, the WAF 908 can provide comprehensive protection against web-based attacks and can ensure the secure exchange of data between client applications, microservices, and digital models in the ecosystem. In some cases, the WAF 908 can also inspect outgoing traffic that exits the cell 902. Examples of the WAF's use include signature-based detection of known attack patterns, anomaly detection, the implementation of custom security rules, and monitoring the communication between microservices and other components within the digital engineering ecosystem.

The WAF 908, cell 902, and micro gateway 906 are essential components for providing a comprehensive security solution for the interconnected digital engineering platform 804. Without these components, the system would be vulnerable to various web-based attacks, unauthorized access, and data breaches. Alternative methods to prevent these issues can include, for example, using other security solutions, such as intrusion detection systems (IDS) or intrusion prevention systems (IPS). However, the combination of a WAF 908, cell 902, and micro gateway 906 provides a robust and efficient security solution.

In some implementations, an AI model 909 is embedded into the WAF 908 to assist with security. The AI model 909 can assist in the operation of the WAF 908 to provide robust security through data analytics and predictions for traceability, auditability, or malicious activity detection, to name a few examples. Each cell 902 has an event log that can be accessed by a separate cell for collecting the training data for the AI model. The separate cell hosting the training data will send a request to the API gateway 906 that then provides access to the event log. In some examples, the AI model 909 can be trained to determine whether a request contains malicious activity. The AI model 909 can be trained using past data, e.g., prior requests, that include malicious activity and those that do not include malicious activity. In this manner, the AI model 909 can assist the WAF 908 in determining whether a current request includes malicious activity, and ultimately, whether the current request should be allowed access to the cell or not.

The security advantages offered by using a cell 902, WAF 908, and micro gateway 906 include enhanced protection against web-based attacks, secure access control, and efficient management of APIs. These components work together to provide a comprehensive security solution that safeguards the microservices within the cell, backend services, and customer data from potential threats and attacks. One key advantage is the implementation of zero trust security for models, where both user access is authenticated at the gateway to microservices, and access is limited to a specific subset of data for a digital model, for which the user is authenticated. This approach ensures that only authorized users can access the relevant data within the digital engineering ecosystem, further enhancing the overall security posture of the system.

Other components that can be used instead of a WAF and a micro gateway can include, for example, intrusion detection systems (IDS), intrusion prevention systems (IPS), next-generation firewalls (NGFW), or security information and event management systems (SIEM). However, the combination of a WAF and a micro gateway provides a specialized and efficient security solution in the interconnected digital engineering platform.

In the context of system 800 as illustrated in FIG. 8, the relationships among the components can be interpreted as follows: 'A' represents a User Access Database, commonly known as Customer Identity and Access Management (CIAM). The CIAM serves as a centralized identity management solution, integrating with the API manager to allow or deny system interactions based on user permissions. 'B' and 'C' portray Model Access Control Policy and Model ID Database, respectively. These components interact with the API manager to manage and verify identities and to enforce established access controls. 'D' indicates the endpoint transaction, which is recorded at the API Gateway. This Gateway interacts with the cell, hosting the microservices for the model and function wrappers, enabling the smooth exchange of information and facilitating the application's overall functionality.

Figure 10:
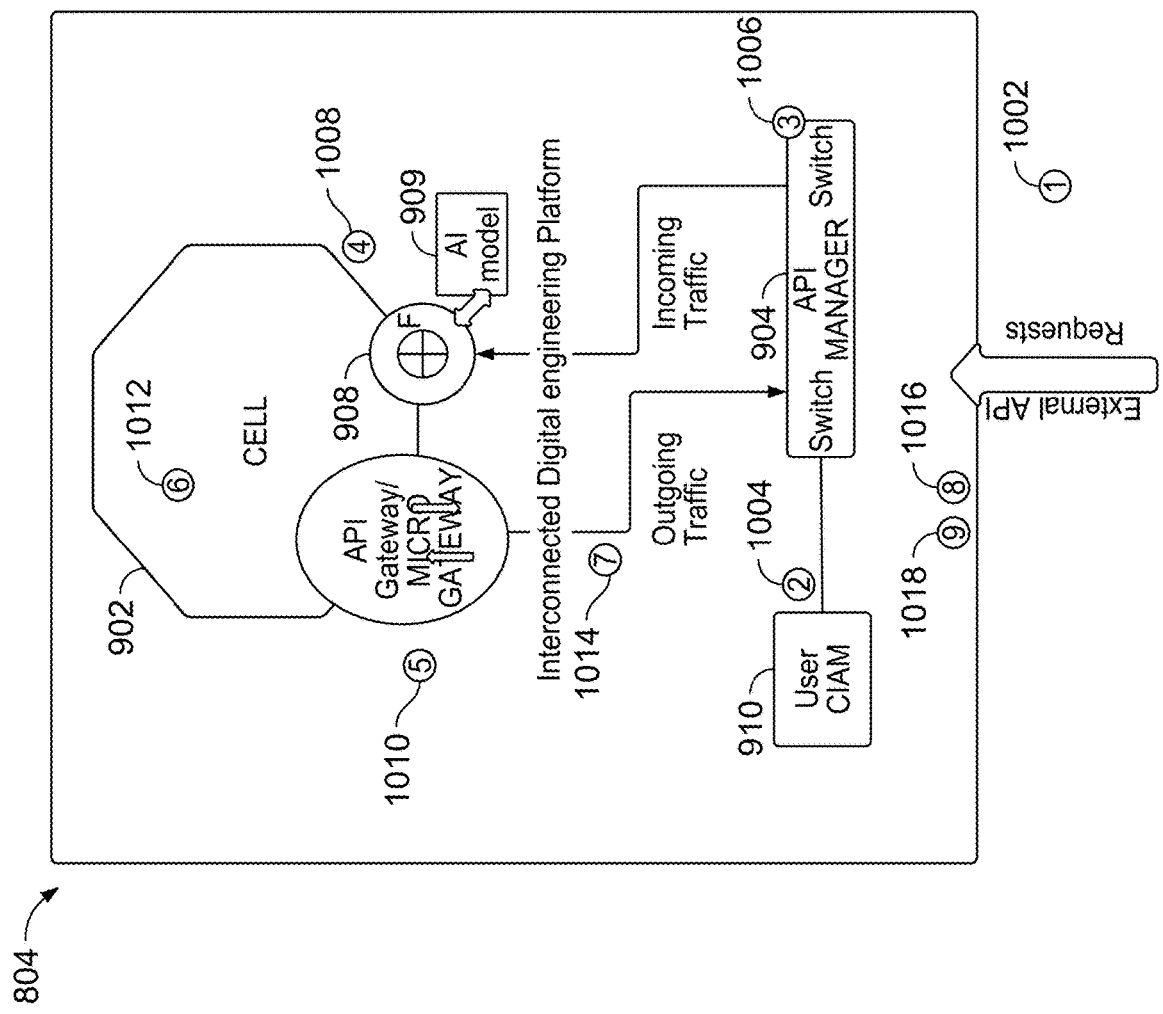
FIG. 10 is a diagram that shows the high-level components and describes the flow of the data as it goes through the basic high-level components of the cell based security architecture.

In a secure digital engineering system as shown in FIG. 10, data flow begins with a user providing a request to modify a model parameter (1). In some implementations, the user request to modify a model parameter can itself be the output of orchestration scripts (e.g. python, java, or other scripts) executed on the digital engineering platform that reflect specific actions to be taken in a digital thread, implemented by specific actions at models hosted as microservices within the cells. For instance, the user request can include execution of a digital thread, where the digital platform executes the digital thread by performing the series of actions using one or more digital models against the digital model to be modified or interacted. The orchestration scripts can thus reflect the broader user workflow. The user request is authenticated by the Customer Identity and Access Management (CIAM) 910 system using techniques like multi-factor authentication or single sign-on, which then issues an identity token to the user's request (2). The API Manager 904, adhering to the zero-trust principle, receives and verifies this token (3). The API Manager 904 logs the user request and regulates the user request using API throttling and rate limiting. The Web Application Firewall (WAF) 908 scrutinizes the data packet from the API Manager 904 for any potential threats before the data packet reaches the API Gateway 906 (4). For instance, the API Manager 904 provides the data packet to the WAF 908 and the WAF 908 scrutinizes the data packet. Then, the API Gateway 906 checks the user request's authorization using the token and a source of the user request, e.g., authentication of the user that transmitted the user request (5).

In some implementations, the interconnected digital engineering platform 804 may not include an WAF 908. Instead, the permissions layer implementation may perform the functions of the WAF 908 including, for example, filtering of unauthorized access, authorizing the user for tasks they are permitted to perform on models or tools they are permitted to access, while removing the need to access data. The removal of the WAF 908 may allow for enabling zero trust and zero knowledge principles together.

The API Gateway 906 can validate the data packet received from the WAF 908 and, once validated, decrypts and permits the decrypted data packet into the cell's trusted zone, with traffic still being regulated under the zero-trust principle (5). The cell can perform an action associated with the user request (6). Upon leaving the cell, the API Gateway 906 re-encrypts the data packet, carrying source and destination information (7).

In a multi-cell scenario, the API Manager 904, assisted by rate limiters and API throttlers, manages the traffic from each cell to avoid congestion (8). Cells 902 communicate via the API Manager 904 which keeps track of request sequences across cells. All actions are logged by both the API Manager and CIAM system, creating a comprehensive audit trail and ensuring a zero-trust environment (9).

In some implementations, the system architecture security guardrails, e.g., 904, 906, 908, and 910, include a fifth guardrail 912, called "Customer Data Tokenizer and Bucket," with the principle of "Don't trust yourself," enabling orchestration without directly handling customer data. A tokenizer can be added to expand the platform's security capabilities to include Zero Knowledge data orchestration. In some cases, the Customer Data Tokenizer and Bucket 912 can translate customer data into cryptographic fingerprints that can be exchanged with other systems or stored without divulging the original customer data. In some cases, the Customer Data Tokenizer and Bucket 912 can tokenize the customer data into cryptographically hashed tokens that can at a later time be exchanged back for access to the sensitive data. The tokenizer thus allows for performing the user request without having any access to the sensitive data but only use tokens that represent the underlying data. The addition of the tokenizer enhances the cell security architecture to further satisfy Zero Knowledge security design constraints. Alternatively, the security architecture can also implement homomorphic cryptographic techniques for further Zero Knowledge implementations.

Figure 11:
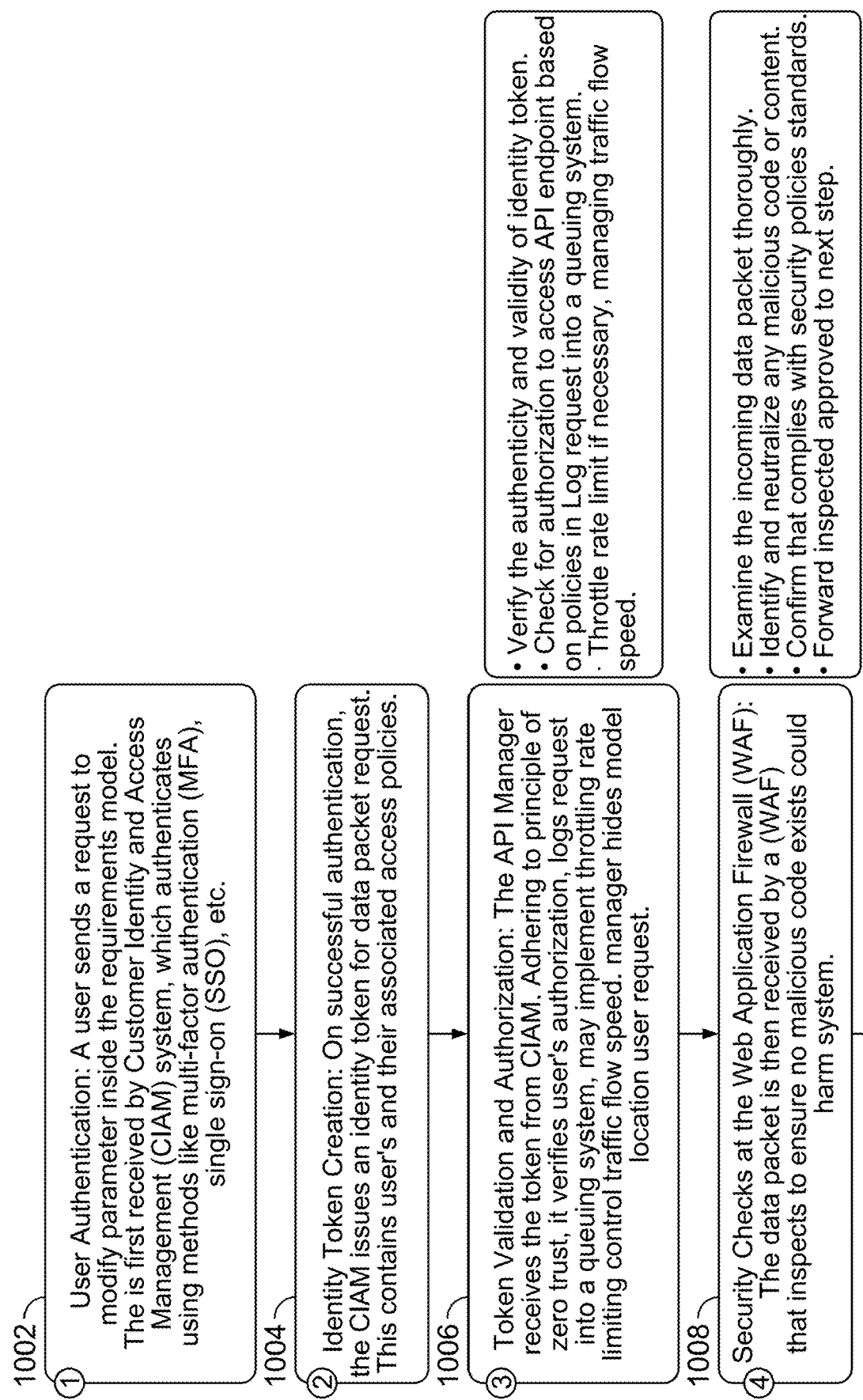
FIG. 11 is a data flow that presents the steps of the data packets from a user request to a model modification inside the cell structure.
Figure 11:
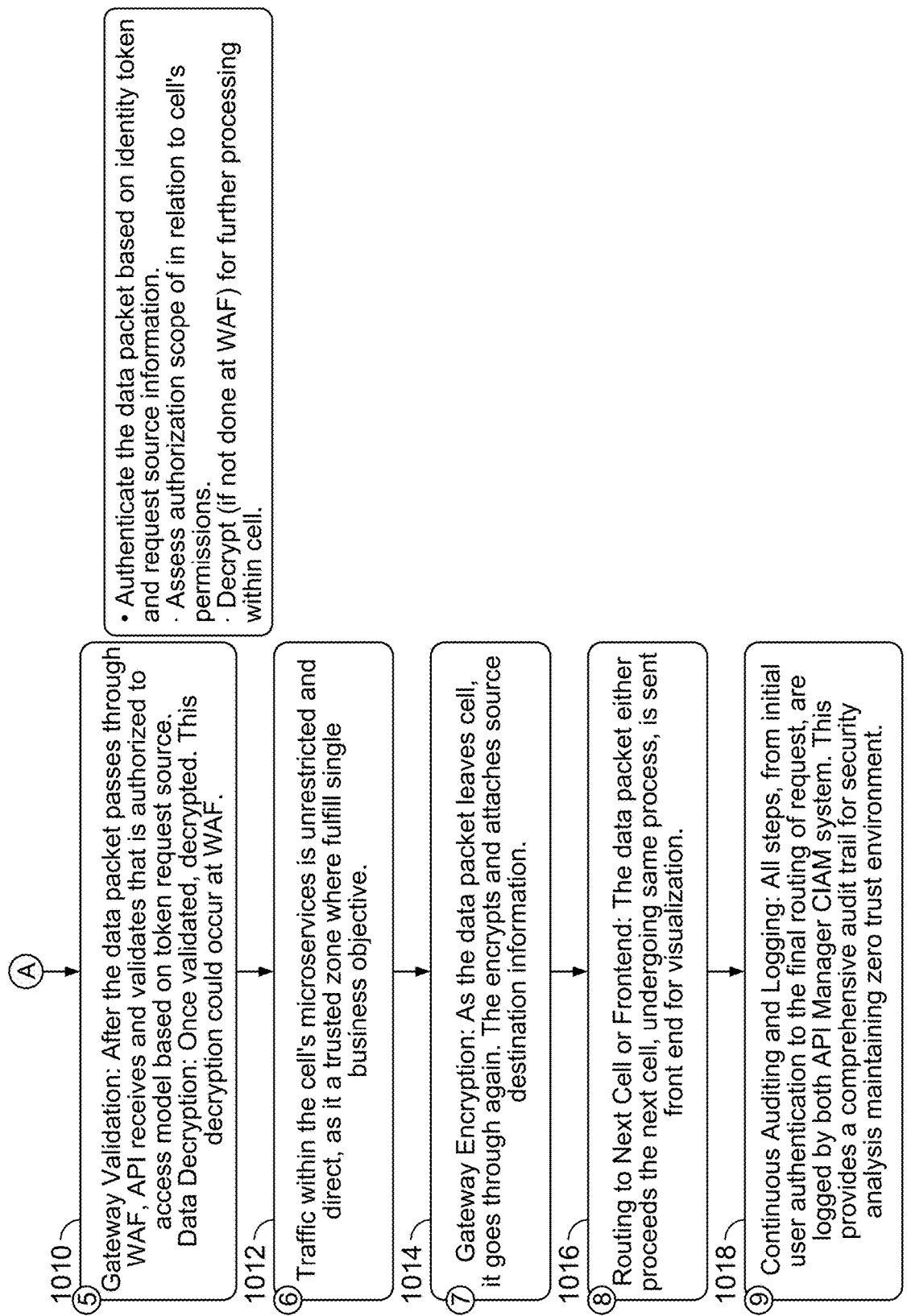

FIG. 11 illustrates a sequence of steps with the individual process steps highlighted on the cell architecture diagram in FIG. 10.

A user sends a request to modify a parameter inside the requirements model (1002). The request is first received by the Customer Identity and Access Management (CIAM) 910 system, which authenticates the user using methods like multi-factor authentication (MFA), single sign-on (SSO), etc., to name a few examples. The request to modify a parameter can include, for example, reduce the diameter in a CAD model of a wheel or the material selection of a specific part.

On successful authentication, the CIAM 910 issues an identity token for the data packet request (1004). The identity token contains the user's identity and their associated access policies.

The API Manager 904 receives the token from the CIAM 910 (1006). Adhering to the principle of zero trust, API Manager 904 verifies the token and the user's authorization, logs the request into a queuing system, and may implement API throttling and rate limiting to control traffic flow and speed. The API manager 904 hides the model location from the user request.

The WAF 908 receives the data packet (1008). The WAF 908 can perform one or more security checks on the received data packet to ensure no malicious code exists that could harm the system, for example.

After passing through the WAF 908, the API Gateway 906 receives the data packet (1010). In further detail, the API Gateway 906 receives the data packet and validates that the received data packet is authorized to access the model in the cell based on the token and request source. Once validated, the WAF 908 can decrypt the data packet and provide the decrypted contents to the cell 902.

The cell 902 can receive the decrypted contents of the data packet from the WAF 908 and perform a particular objective (1012). Traffic within the cell 902's microservices can be unrestricted and direct. The cell is a trusted zone where microservices fulfill the particular objective. For example, the particular objective can include updating the geometry of a CAD model or selecting a different material for a part in an assembly.

As the data packet leaves the cell 902, the API Gateway 906 receives the data packet (1014). The API Gateway 906 encrypts the data packet and attaches source and destination information, which can include data that identifies the next cell to transfer the data packet or data identifying a device associated with a user that transmitted the user request.

The API Manager 904 can either route the data packet to the next cell 902, undergoing the same process described with respect to 1006 through 1014, or the API Manager 904 can route the data packet to the front end for visualization (1016). The API Manager 904 routes the data packet from the cell according to the source and destination information encrypted by the API Gateway 906. The API Manager 904 can decrypt the encrypted source and destination information to determine where to route the data packet next, e.g., such as routing the data packet to another cell for performing additional operations.

In some implementations, a service mesh can replace the API gateway 906 in the interconnected digital engineering platform. A service mesh can link trusted elements and improves the efficiency of linking and configuring various services, with options to use peer-to-peer (P2P) networks. In further detail, a service mesh can be used as a networking layer that allows cluster services, e.g., identity, permissions, file service, and job service, etc., to communicate with each other dynamically and scalably. For example, a commercial service mesh such as an Istio, can be configured and used. Similar to the functions described with respect to the API gateway 906, the service mesh can verify and authenticate the issued token to allow the request to access the requested digital model.

In some cases, a service mesh allows a digital engineering platform to scale services without violating zero-trust constraints by ensuring only authorized network components are included in the communication mix. Zero trust security can be defined as the platform dynamically configuring the networks that connect its services to one another, which ensures secure, efficient, and scalable communication.

Within the digital engineering platform architecture, such as that shown in FIG. 8, for example, a service mesh exists wholly within the enclave. In an exemplary cases shown in FIG. 13A, FIG. 14A and FIG. 16A, an exemplary service mesh is shown within the Share Control Cell of the Interconnected DE platform. The service mesh can facilitate communication between internal service APIs, e.g., file service API, job service API, etc., and users of the main digital engineering platform API. Essentially, the service mesh acts as the glue that holds the various services in the enclave together, enabling seamless interactions. In some implementations, the service mesh also performs the functions that an API gateway would typically handle, ensuring that internal services can always communicate with users of the public-facing API. In this case, the dual role enhances both security and operational efficiency.

As mentioned, the service mesh can be used in place of the API gateway. In some cases, the service mesh can provide an improvement in efficiency and provide options with low-connectivity environments. The API gateway, initially part of the cell security architecture, can provide a networked means to securely access data artifacts in the customer data store. In some implementations, the API gateway can be replaced with a service mesh, e.g., a commercially available service mesh, in order to efficiently apply permissions, identity services, and other security features. In low-connectivity environments for the digital engineering platform, the service mesh, with its permissions layer, can handle P2P of data artifacts in a secure manner. Here, the platform architecture coordinates data artifacts in a decentralized manner, but a P2P version of the distributed enclaves may need to reference in a single immutable source for model or data artifact continuity.

In some cases, such immutable references could be a secure, centralized database of action logs or associated model/data artifact versions linked to an enclave. Alternatively, model continuity information could be tokenized on a blockchain. The P2P deployment of enclaves, combined with ledger-style attributes of provenance, versions, and access in low-latency/no-connection scenarios, extends the application of the digital engineering platform for a broad set of applications.

In computing systems without a service mesh, network connections between services must be provisioned and configured manually, including during scale-up and scale-down. This manual intervention would result in an enclave that could not scale without human operators. By leveraging the service mesh, such as a commercial mesh, this bottleneck is eliminated, allowing the interconnected digital engineering platform to scale automatically while maintaining high levels of security, efficiency, and scalability.

The API Manager 904 and the CIAM system 910 log data from each of the aforementioned steps, e.g., from initial user authentication to the final routing of the request (1018). By performing continuous auditing and logging, the interconnected digital engineering platform 804 can provide a comprehensive audit trail for security analysis and maintaining the zero trust environment. The comprehensive audit trail can be provided on request to a designer of system 804 or a user requesting to view how a data packet has traversed through one or more cells, for example.

In this environment, each of the cells 902 are capable of communicating with each other. For example, a cell can transmit a data packet to another cell, with each cell validating and processing the request as detailed above. In some examples, the API Manager 904 can track any response, associated with the initial request, from a secondary (or subsequent) cell sent to the first cell. In some examples, the API Manager 904 can track requests moving from a first cell to one or more subsequent cells. In this manner, the API manager 904 enables an efficient tracking system that keeps track of requests' sequences across multiple cells. Additionally, all steps in this process are logged both by the API Manager 904 and the CIAM system 910, offering a comprehensive audit trail for security analysis and upholding the zero-trust environment.

FIGS. 12-17 describe an illustrative embodiment of cell security architecture depicting a hybrid architecture platform that facilitates a secure and privacy-preserving environment for file uploads and processing, while maintaining customer control over the data. The process involves a customer's interaction with a frontend application, and a subsequent journey of their request through the cell security architecture's systems such as the Customer Identity and Access Management (CIAM) platform, Frontend Hosting Cell, API Manager, API Gateway, and the backend cells. The platform employs cryptographic tokens for user authentication and utilizes an object storage, such as an S3-compatible storage, for example, interface for restricted-use object upload. Security is maintained through measures like the Web Application Firewall (WAF), logging services, and intricate authorization protocols.

Figure 12:
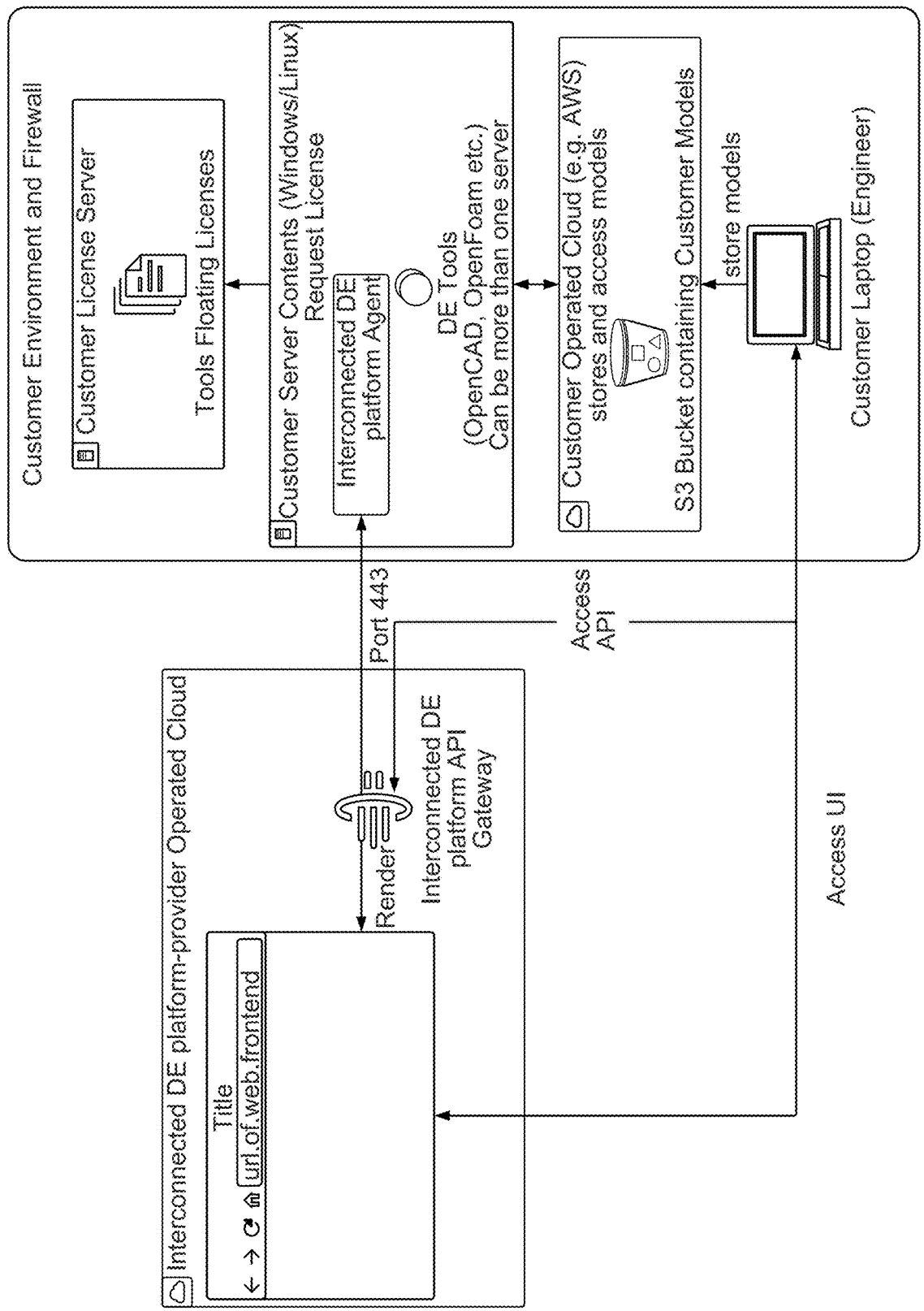
FIG. 12 is a diagram which depicts a high level overview of the hybrid architecture detailed in subsequent FIGS. 13-16.

FIG. 12 elucidates the secure file upload process to the hybrid architecture platform. In particular, FIG. 12 demonstrates the delineation between cloud-operated gateway components and customer-operated components so as to assure that sensitive models never leave the customer's security perimeter. Specifically, this process commences with user authentication via the CIAM platform and subsequent issuance of a cryptographic token. The user then initiates the frontend web application and requests an upload URL for the file through the API Gateway. The request for an upload URL is authenticated using the token which the CIAM platform generates for the user. The API Manager logs the received request from the frontend application and forwards the received request to the appropriate backend cell, in this example the Share Control Cell. The Share Control Cell can leverage an associated database to handle stateful interactions and validate user permissions based on the contents of a request received from the API manager. The Share Control cell can make fine-grained authorization decisions by leveraging the cell database for the storage of state at the cellular level. For example, in response to the Share Control Cell performing an authorization decision, the Share Control Cell emits a request for a restricted-use object upload URL from the object storage interface. The object storage interface provides the URL to the Share Control Cell in response to the Share Control Cells' request. In response, the Share Control Cell can return the URL to the frontend application, which initiated the upload request process. The frontend application can utilize the received URL to upload a file directly from the user's device to their enterprise storage environment, bypassing the hybrid product's cloud components, thereby ensuring data privacy. At every step in this process where there are intercellular communications, such as between the API manager and Share Control Cell, the security of these intercellular communications is fortified through measures such as the use of a WAF to ensure compliance and authentication for internal communications.

Figure 13A:
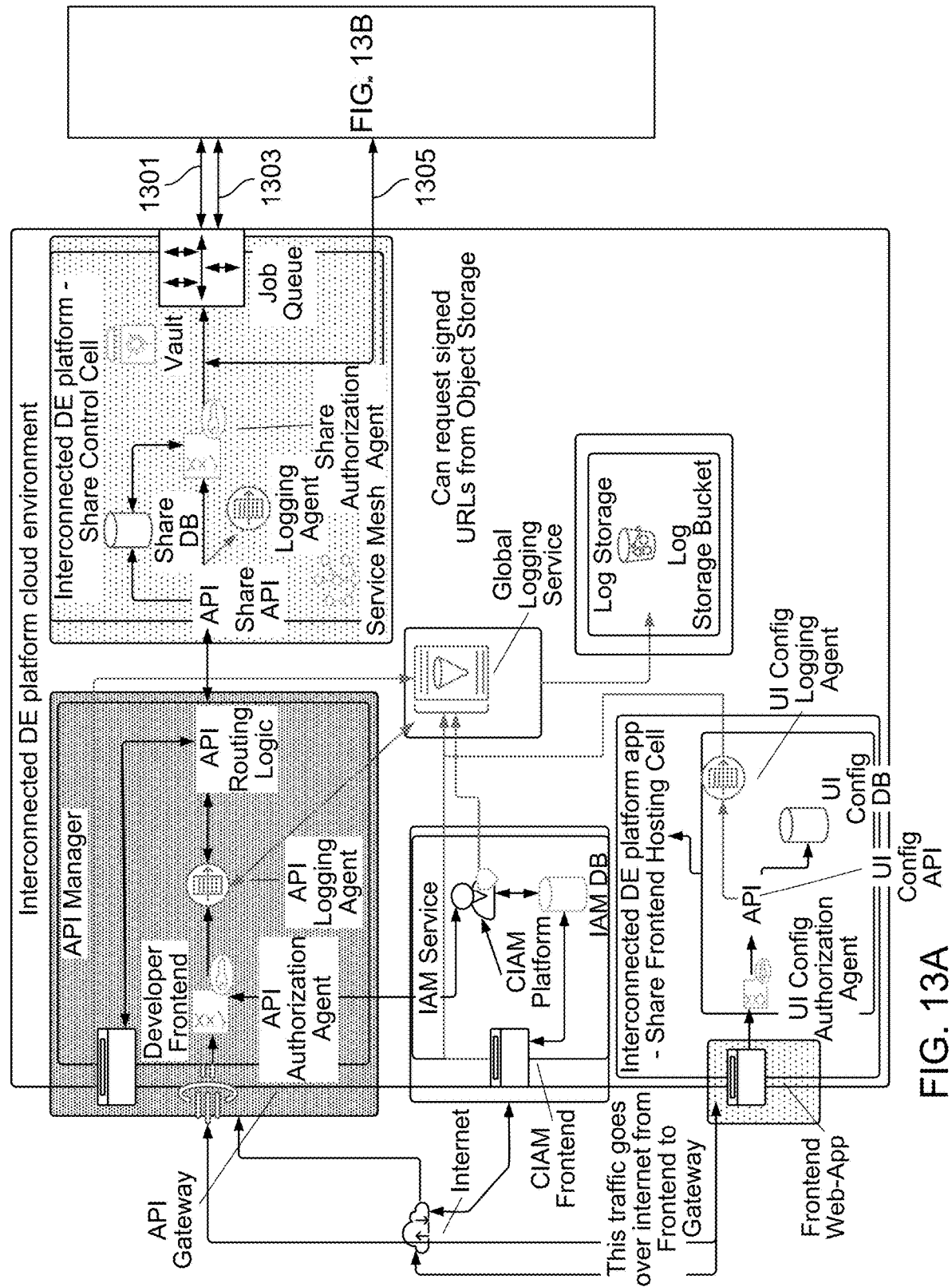
FIGS. 13A and 13B are diagrams depicting an overall architecture of an implementation of the hybrid security cell-based infrastructure.
Figure 13B:
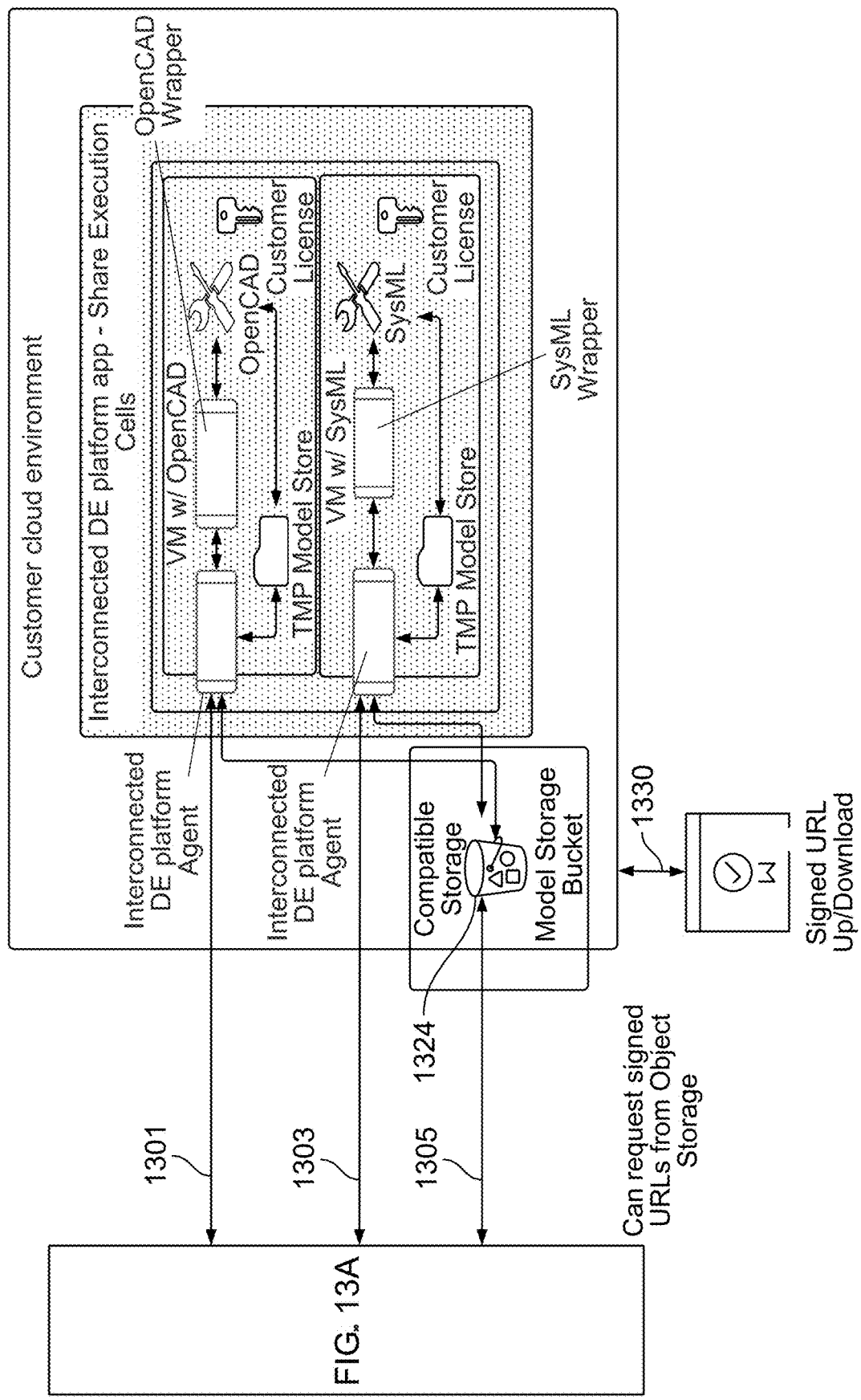
Figure 14B:
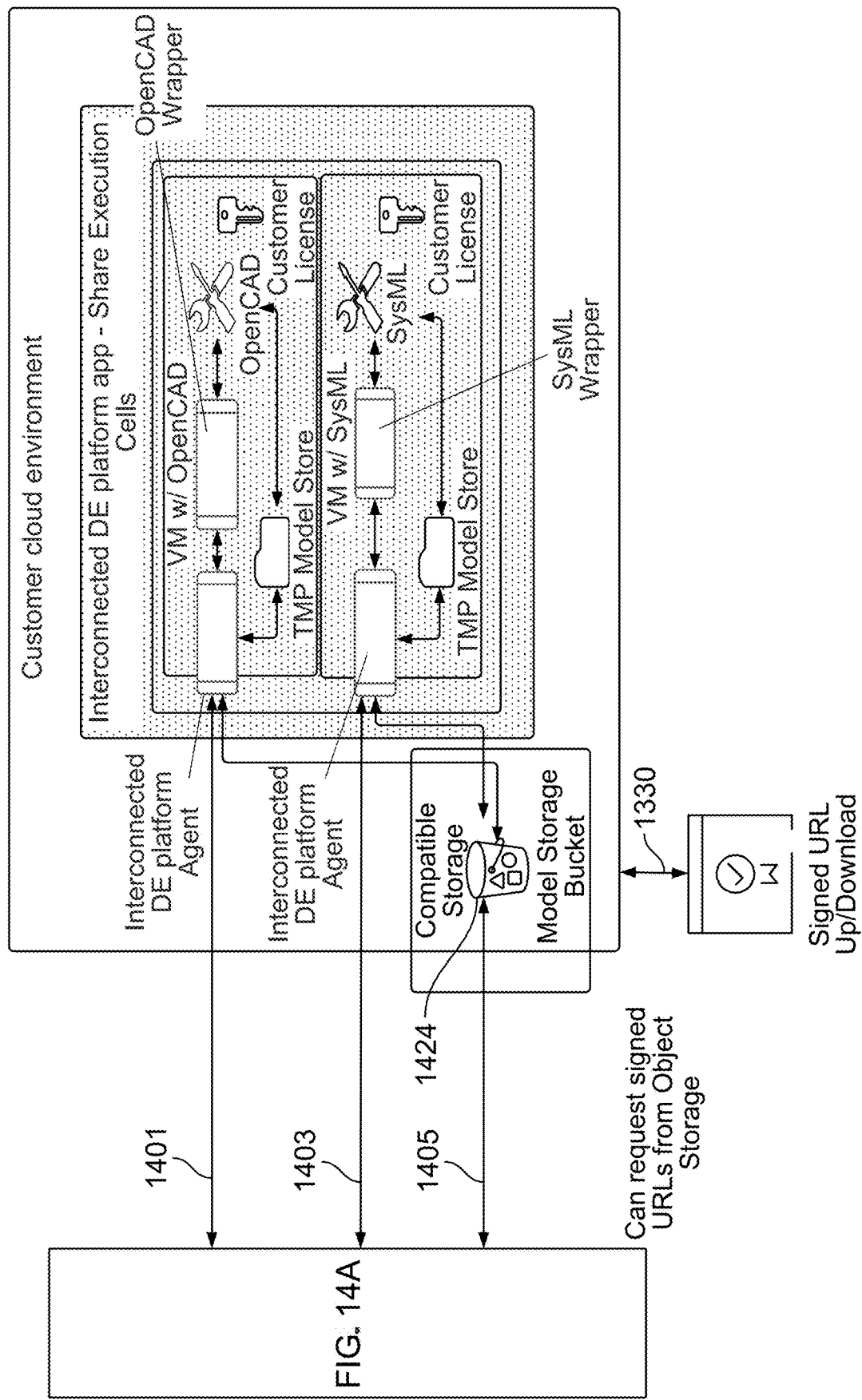
Figure 15:
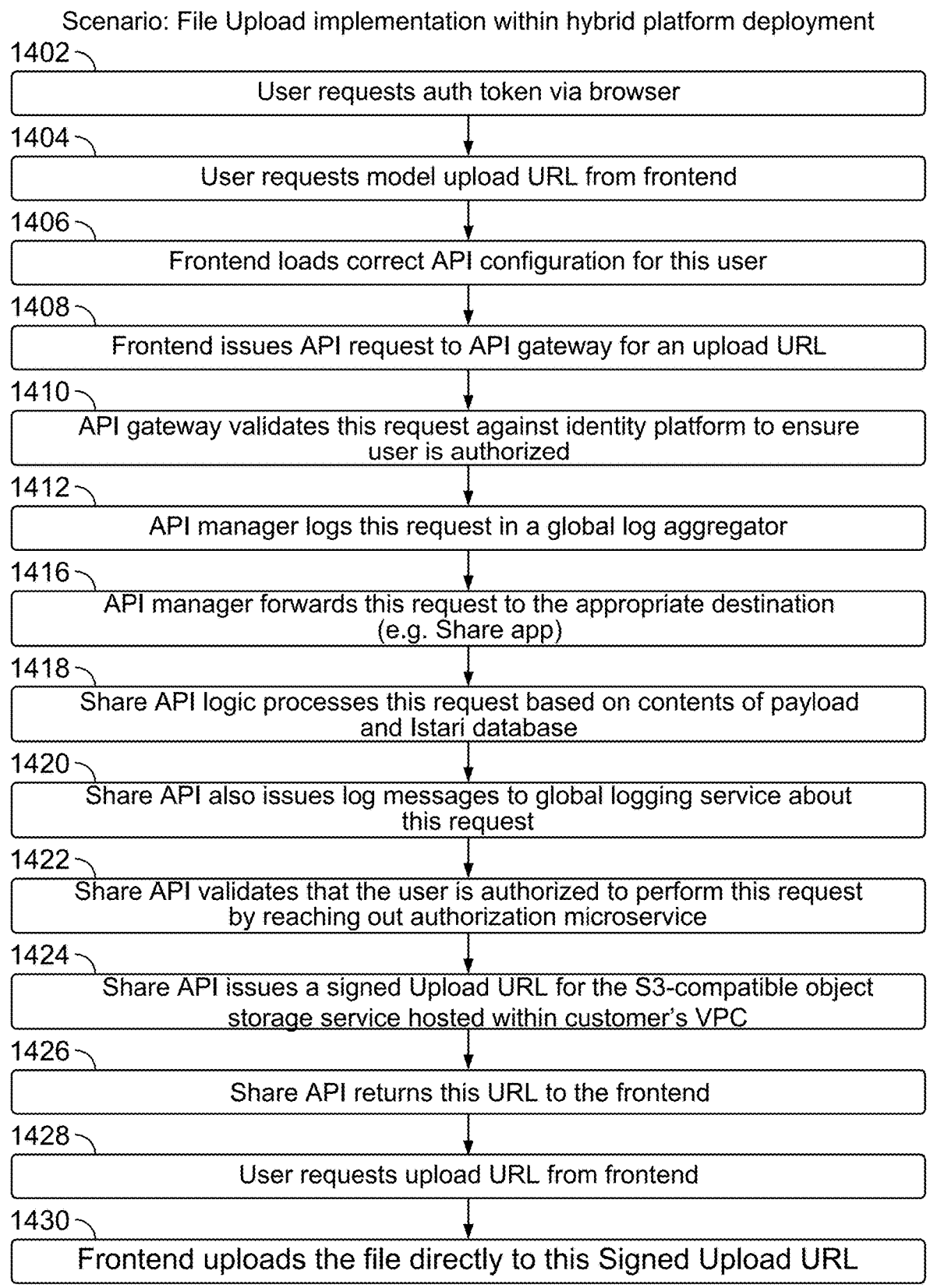
FIG. 15 is a diagram which further details the individual steps labeled in FIG. 14 for the process of a file-upload in the notional infrastructure detailed in FIG. 13.
Figures 16A, 16B:
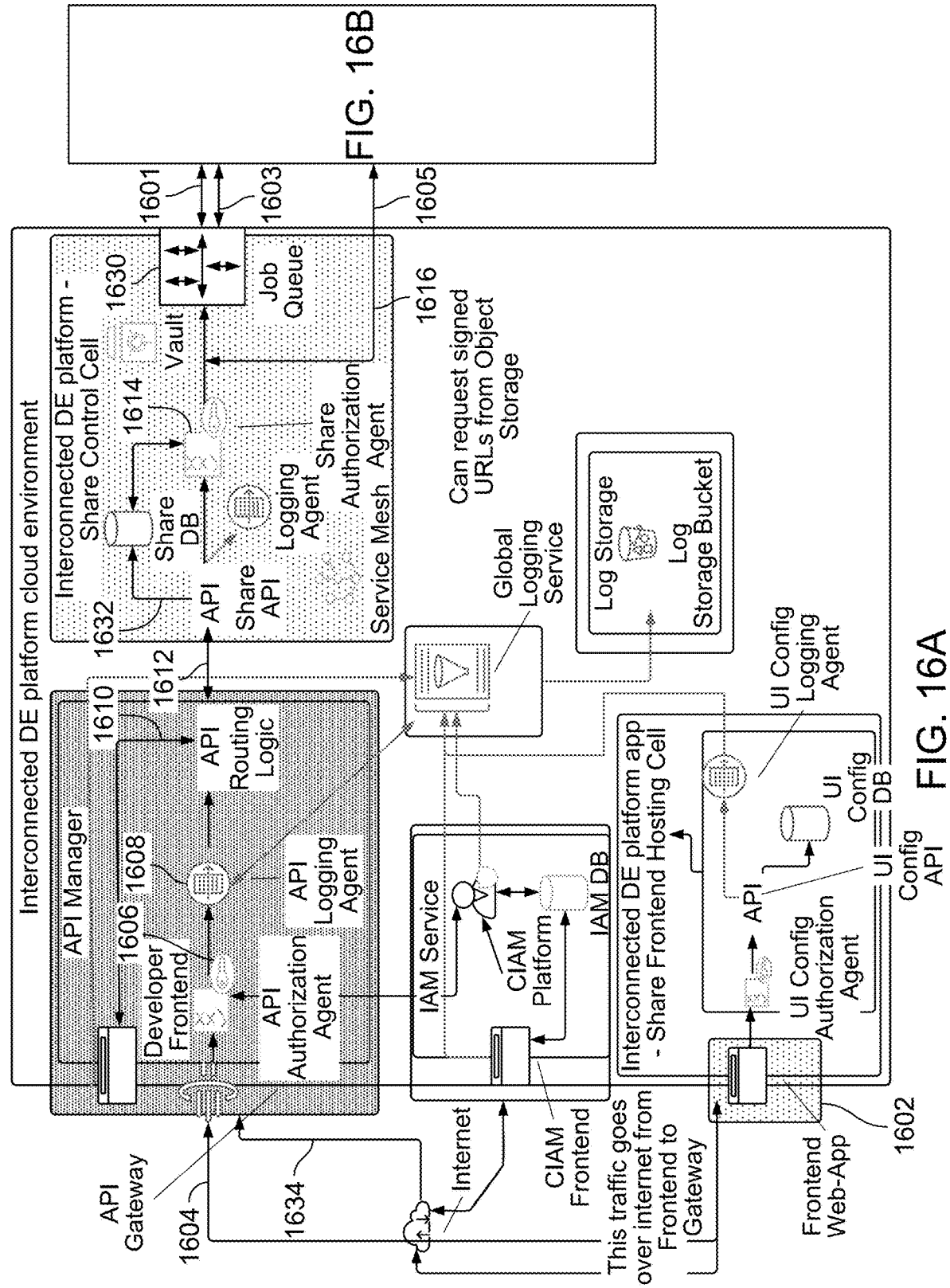
FIGS. 16A and 16B are diagrams which include step-by-step annotations detailing the components involved in a job execution using the notional infrastructure described in FIGS. 13A and 13B.
Figure 17A:
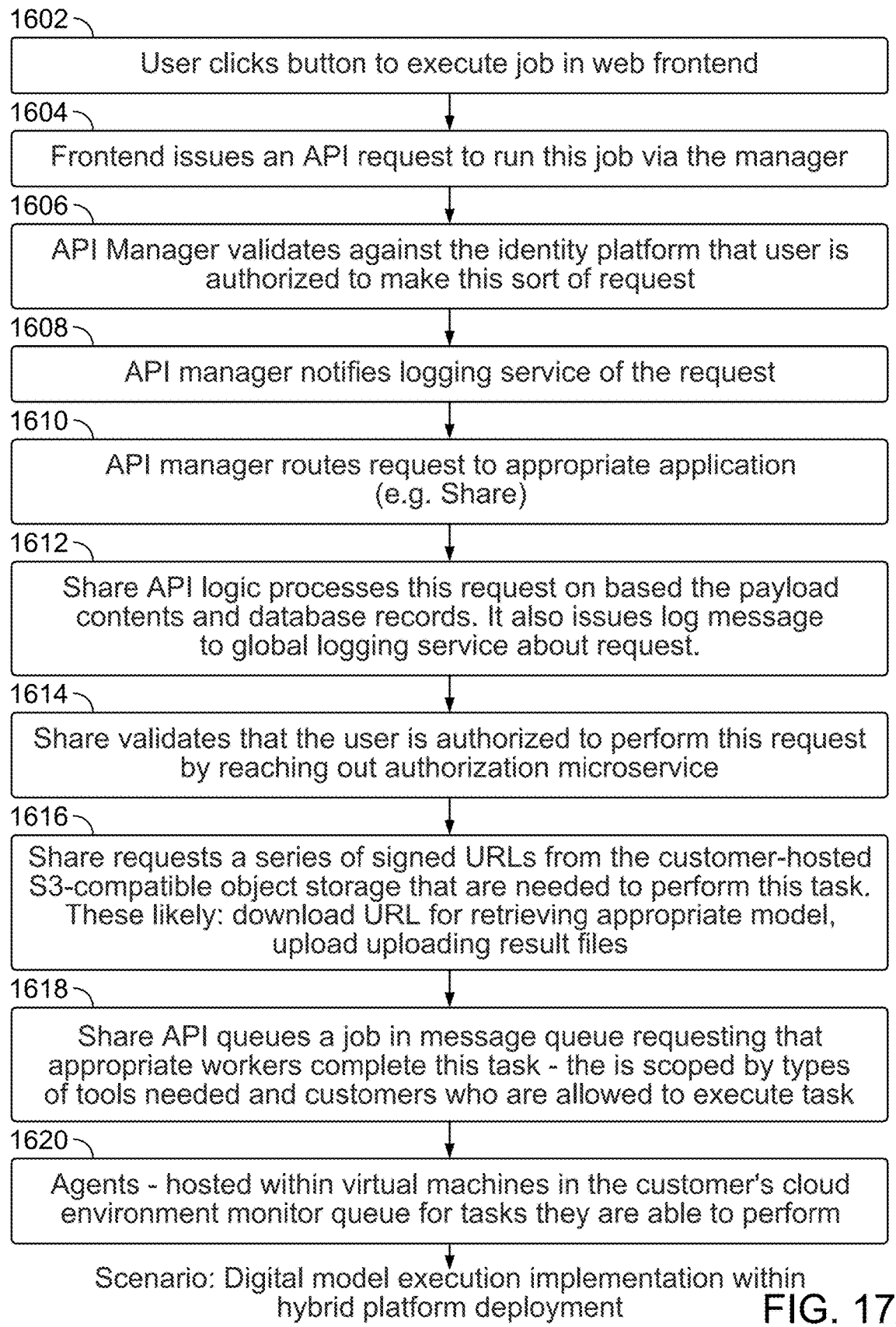
FIGS. 17A and 17B are diagrams which further details the individual steps labeled in FIG. 16 for the process of a job execution in the notional infrastructure detailed in FIGS. 13A and 13B.
Figure 17B:
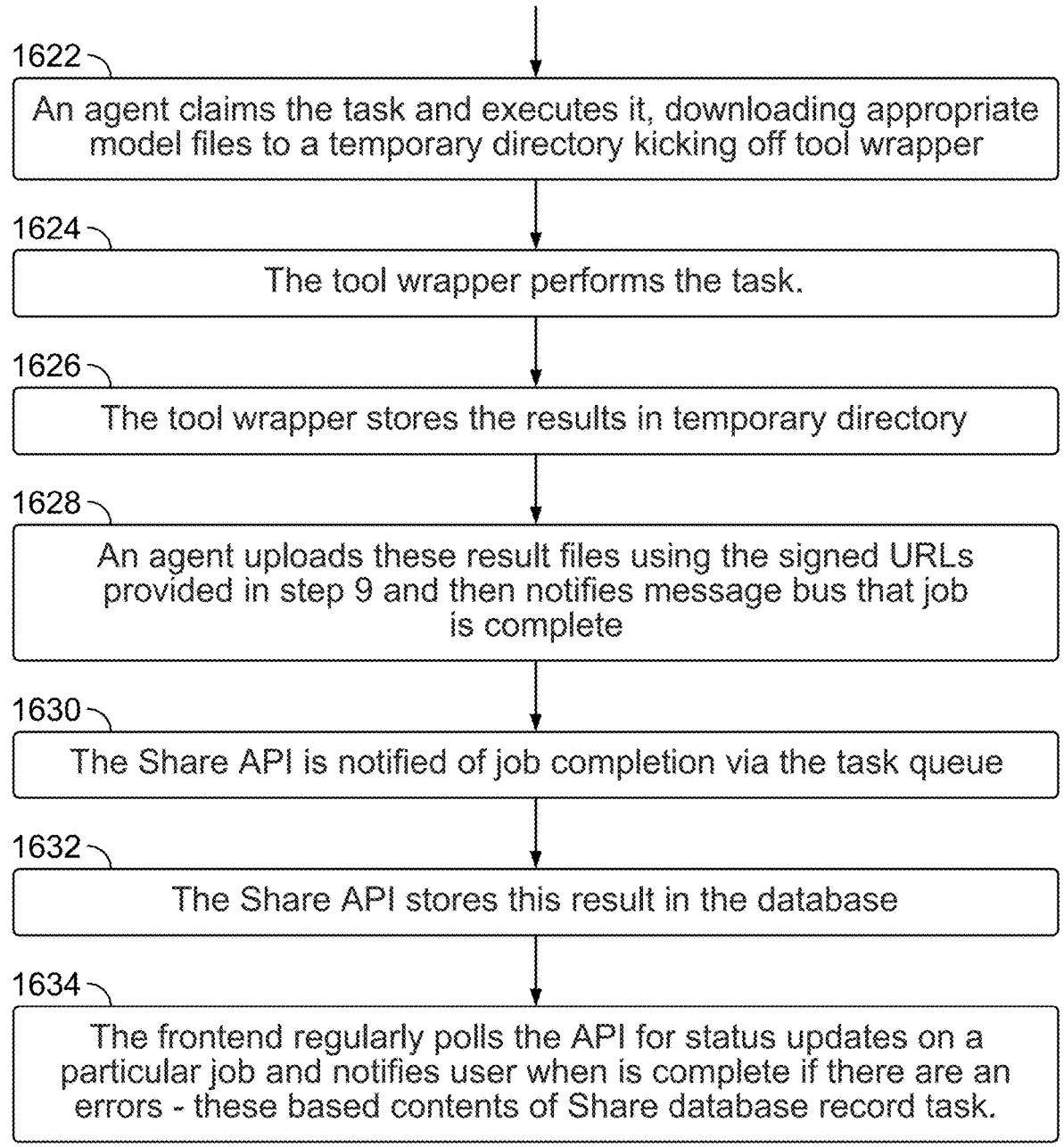

FIGS. 13A and 13B depict the architecture for the digital engineering platform in a hybrid environment that combines multiple deployment environments, such as a cloud deployment and a physical datacenter. In some configurations, the services and cells depicted in FIG. 13A may be owned or operated by a different entity than those depicted in FIG. 13B. A key advantage of this architecture is its ability to facilitate secure orchestration for digital engineering between deployment environments owned by different entities. FIGS. 14A and 14B show specific steps called out for the data flow for a secure upload of a file (e.g. model type file, scripts, documents) within a digital engineering platform. FIG. 15 shows the process flowchart for these individual steps for secure file upload, as shown in FIGS. 14A and 14B. FIGS. 16A and 16B show specific steps called out for the data flow for securely performing a digital engineering task within a digital engineering platform. FIGS. 17A and 17B show a process flowchart for these individual steps for a digital engineering task, as shown in FIGS. 16A and 16B.

In FIG. 13A, the digital engineering platform and its individual components are shown, while in FIG. 13B, the components of the platform instanced behind the customer firewall. Individual cells are labeled in the diagram (e.g. the "API Manager" cell) and the flow of data between cells is denoted by arrows. In some examples, the job queue of the share control cell in FIG. 13A can communicate with the interconnected DE platform agent of the share execution cells in a virtual machine with OpenCAD in FIG. 13B over communication line 1301. In some examples, the job queue of the share control cell in FIG. 13A can communicate with the interconnected DE platform agent of the share execution cells in a virtual machine with SysML in FIG. 13B over communication line 1303. In some examples, the share authorization agent of the share control cell in FIG. 13A can request for signed URLs from compatible storage 1324 in the customer cloud environment in FIG. 13B over communication line 1305. For example, in 1330, one or more signed URLs directs an upload request from the user's web browser directly to the object storage container 1324. FIGS. 14A and 14B depict the process by which a file can be uploaded into the hybrid architecture platform in a secure and privacy-preserving manner. The process is overlaid on the hybrid platform schematic of FIGS. 13A and 13B. At 1402, the user authenticates themselves with a customer identity and access management platform (CIAM) and receives authorization credentials. In some embodiments, a client secret or cryptographic token uniquely identifying the user can be used to validate future requests made against the application.

In 1404, the user loads the frontend web application by making a request to the Frontend Hosting Cell through their web-browser. The Frontend Hosting Cell can load an appropriate frontend application—such as a single-page web application (SPA)—into the customer's web browser based on data extracted from the Frontend Hosting Cell configuration database in 1406.

In 1408, the frontend web application can send a web request to the API Manager's API Gateway service for an upload URL for uploading a file. This request is made using the cryptographic token generated in 1402. The cryptographic token is validated in 1410 by the API gateway to ensure the user is appropriately authorized to issue a request to upload files by validating the cryptographic integrity and contents of the token.

The API manager logs the context of this request from the user in 1412, which is stored in a central logging service at 1414. The request is subsequently forwarded to the appropriate backend cell, and in this case, the Share Control Cell in 1416.

The backend cell can parse the request data in 1418, leveraging the contents of the cell database to resolve stateful interactions (such as, for example, to detect conflicts with existing file names or validate fine-grained user permissions). Any errors or analytics can be logged during this process to a cell-specific logging agent at 1420 and these logs can be forwarded to the centralized logging service at 1422. Finally, any fine-grained authorization decisions for the specific user actions can be made as a result of a combination of database state and cryptographic token claims through an authorization service. Here, the authorization service can operate as either a library or microservice within the Share Control Cell. This authorization decision occurs at 1422.

Assuming the authorization service approves the upload request, the Share Control Cell subsequently makes a request of the customer's object storage interface for a restricted-use object upload URL in 1424 over communication line 1405. For example, the Share API can generate a signed upload URL by performing one or more computations on a pre-shared secret, which ensures the Shared API does not need to talk with the object storage. This upload URL is typically a "signed URL" primitive which embodies a set of permissions approved by the object storage for interactions (such as, the permission to PUT a new file with a specific object identifier).

The API manager returns the resultant secure upload URL to the frontend application through the API Gateway at 1426. This cryptographically secure URL is then used by the frontend in 1428 to make an upload request from the user's web browser directly to the object storage container in 1430. In this way, a secure file upload may be accomplished from the customer's device (such as their laptop computer) directly to their enterprise storage environment without the file itself ever passing through the hybrid product's cloud components. This allows the hybrid architecture to orchestrate and interact with the file without ever directly accessing it or its contents in the cloud environment.

At each of the interfaces between cells, security controls may be put into place. Notably, a WAF can be used as a cell-level gateway to validate that requests are compliant with expected parameters and appropriately signed with the correct cryptographic token (as issued in 1402). This allows cells to communicate with confidence in the authenticity and authorization of a given request—even for requests that end up relayed between multiple cells during processing.

In some examples, the job queue of the share control cell in FIG. 14A can communicate with the interconnected DE platform agent of the share execution cells in a virtual machine with OpenCAD in FIG. 14B over communication line 1401. In some examples, the job queue of the share control cell in FIG. 14A can communicate with the interconnected DE platform agent of the share execution cells in a virtual machine with SysML in FIG. 14B over communication line 1403. In some examples, the share authorization agent 1422 of the share control cell in FIG. 14A can request for signed URLs from compatible storage 1424 in the customer cloud environment in FIG. 14B over communication line 1405.

For more complicated tasks than simply uploading models, the process is fairly similar and illustrated in FIG. 15. FIG. 15 represents the workflow for a complex process, beginning with an authorized user who has uploaded a file and is requesting the execution of a specific digital engineering task. The process mirrors that of FIG. 14 in terms of request reception, cryptographic authorization, logging, and routing to the appropriate application cell, with the share cell handling the message. If approved, the cell procures a series of authorized cryptographic URLs for object download and upload, which are appended to a job queue. Subsequently, an agent software within the customer's environment identifies new jobs, claims them, downloads raw model artifacts using the provided URLs, and executes the tasks with a customer-owned digital engineering tool. The results are uploaded to the customer's object-compatible storage using cryptographically scoped URLs. Completion notification is sent to the Share Control Cell, and metadata from the job-completion description is stored in the application database. Finally, the frontend web application polls the API gateway for job status updates, obtaining relevant metadata and references to impacted files and database records.

FIGS. 16A and 16B depict the process steps by which a digital engineering task can be performed by the hybrid architecture platform in a secure and privacy-preserving manner. The process steps are overlaid on the hybrid platform schematic of FIGS. 14A and 14B. The user subsequently interacts with the frontend web application in 1602 to request the execution of a specific digital engineering task (e.g. to estimate the weight of a 3D model in kilograms).

This request follows a similar journey through the API gateway as in FIGS. 14A and 14B. Namely, 1402—reusing much of the same implementation and security logic as it is received (1404), authorized cryptographically (1406), logged (1408), and routed to the correct application cell (1410), which is similar to 1602, 1604, 1606, 1608, and 1610.

Upon arriving at the Share cell in 1612, the handling of the message is once again orchestrated between the local database, logging agent, and authorizer.

If the cell determines the request is appropriately authorized in 1614, a query is made of the customer's object storage for a series of authorized cryptographic URLs with scoped permissions. In some examples, some of these URLs are authorized for the download of files from the object storage by digital engineering tools. Others of these URLs are authorized for the upload of processing results by digital engineering tools. The cell combines the URLs with other necessary metadata (such as function parameters) into a message which is appended to a job queue in 1618.

Within the customer's environment, an agent software subscribes to the job queue and identifies new jobs which the agent software has the capacity to execute-claiming them in 1620 and communicating them over communication line 1601. The first step in executing jobs is leveraging the cryptographically-scoped URLs for object download directly from the customer's object storage to cache a local temporary copy of the raw model artifacts in 1622.

These local artifacts, stored in the cache designated in 1622, are then supplied to an appropriate customer-owned copy of the digital engineering tool in 1624 over communication line 1605. The tool parses the file contents and performs any tasks outlined in the metadata attached in 1618 in the job description from the job queue. The results are stored into temporary storage in 1626 within the customer's execution environment.

These stored artifacts are then uploaded to the customer's object-compatible storage during 1628. The uploads are sent on the basis of the cryptographically scoped URLs that were previously issued in 1618. Once upload is completed, notification is issued back along the job queue to the Share Control Cell as part of 1630 and any metadata from the job-completion description is stored in the application database as part of 1632.

Finally, the frontend web application polls the API gateway in 1634 for job status updates. When the job completes and results are available, the API gateway will respond with relevant metadata and references to the impacted files and database records.

In this way, the hybrid architecture enables the execution of complex digital engineering jobs against customer-owned digital models in such a way as to ensure the customer models never leave their own information systems. While the cloud components enable API-first and internet-accessible control over the jobs executed on these digital models, they have no direct access to the contents of the models-preserving customer privacy throughout the execution chain.

In some examples, the job queue of the share control cell in FIG. 16A can communicate with the interconnected DE platform agent of the share execution cells in a virtual machine with OpenCAD in FIG. 16B over communication line 1601. In some examples, the job queue of the share control cell in FIG. 16A can communicate with the interconnected DE platform agent of the share execution cells in a virtual machine with SysML in FIG. 16B over communication line 1603. In some examples, the share authorization agent of the share control cell in FIG. 16A can request for signed URLs from compatible storage 1624 in the customer cloud environment in FIG. 16B over communication line 1605.

FIGS. 17A and 17B present a diagram which further details the individual steps labeled in FIGS. 16A and 16B for the process of a job execution in the notional infrastructure detailed in FIGS. 13A and 13B. In particular, FIGS. 17A and 17B illustrate the process of a user initiating a job execution in the web frontend, the execution of the job, and reporting of the job status back to the web frontend.

Figure 18:
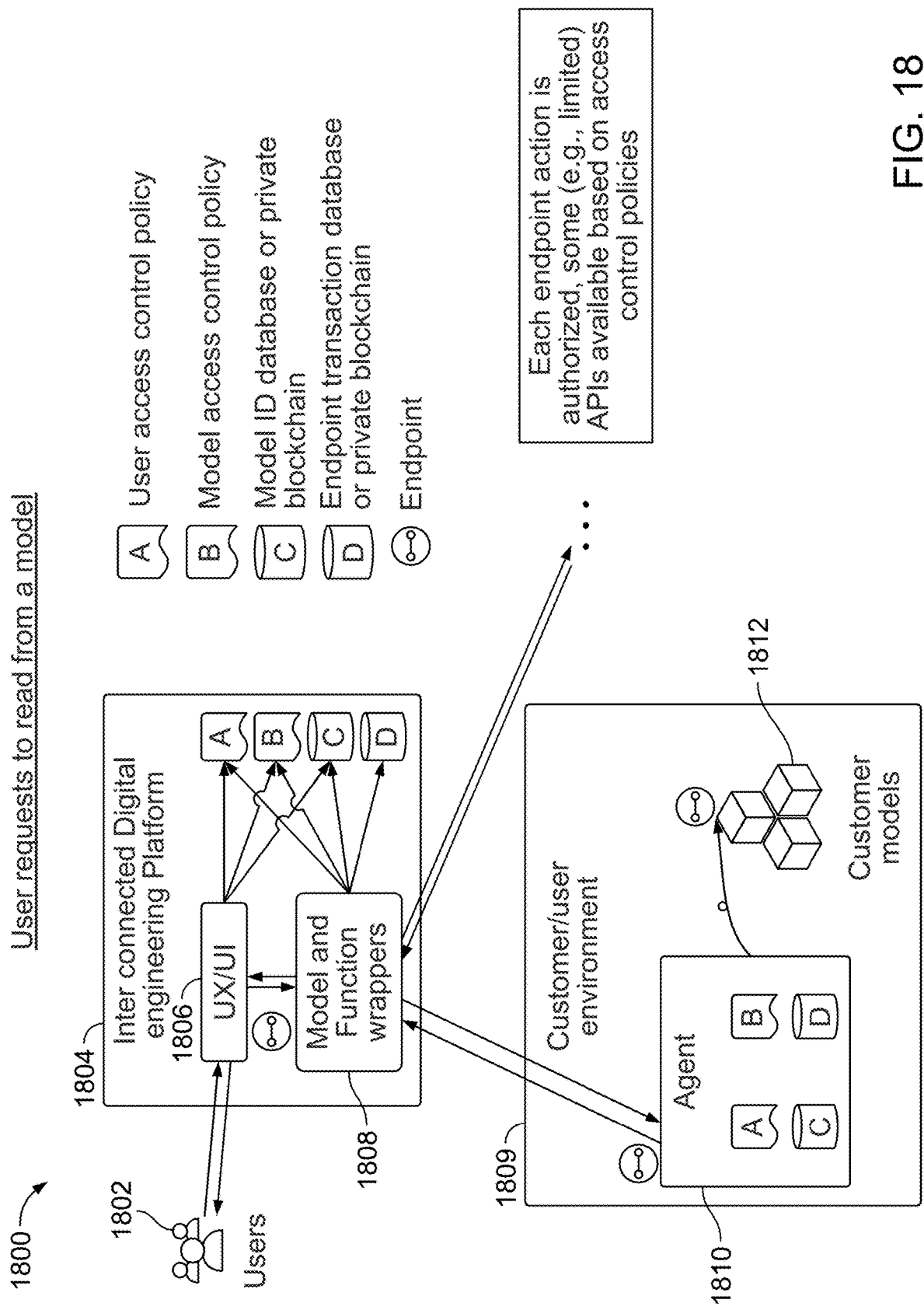
FIGS. 18, 19, 20 and 21 show embodiments of security implementation where the user request is either a read query or a write query.
Figure 19:
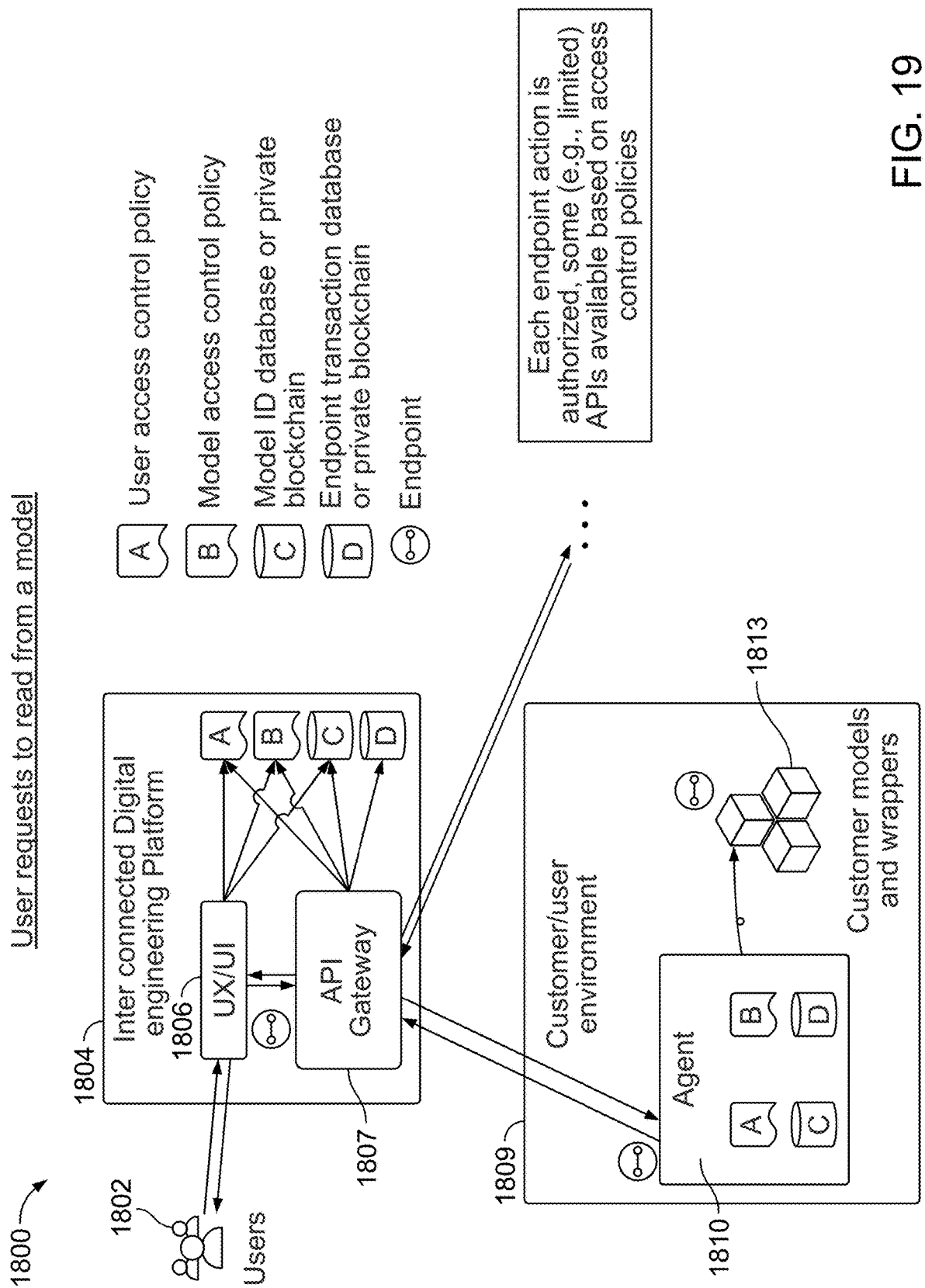
Figure 20:
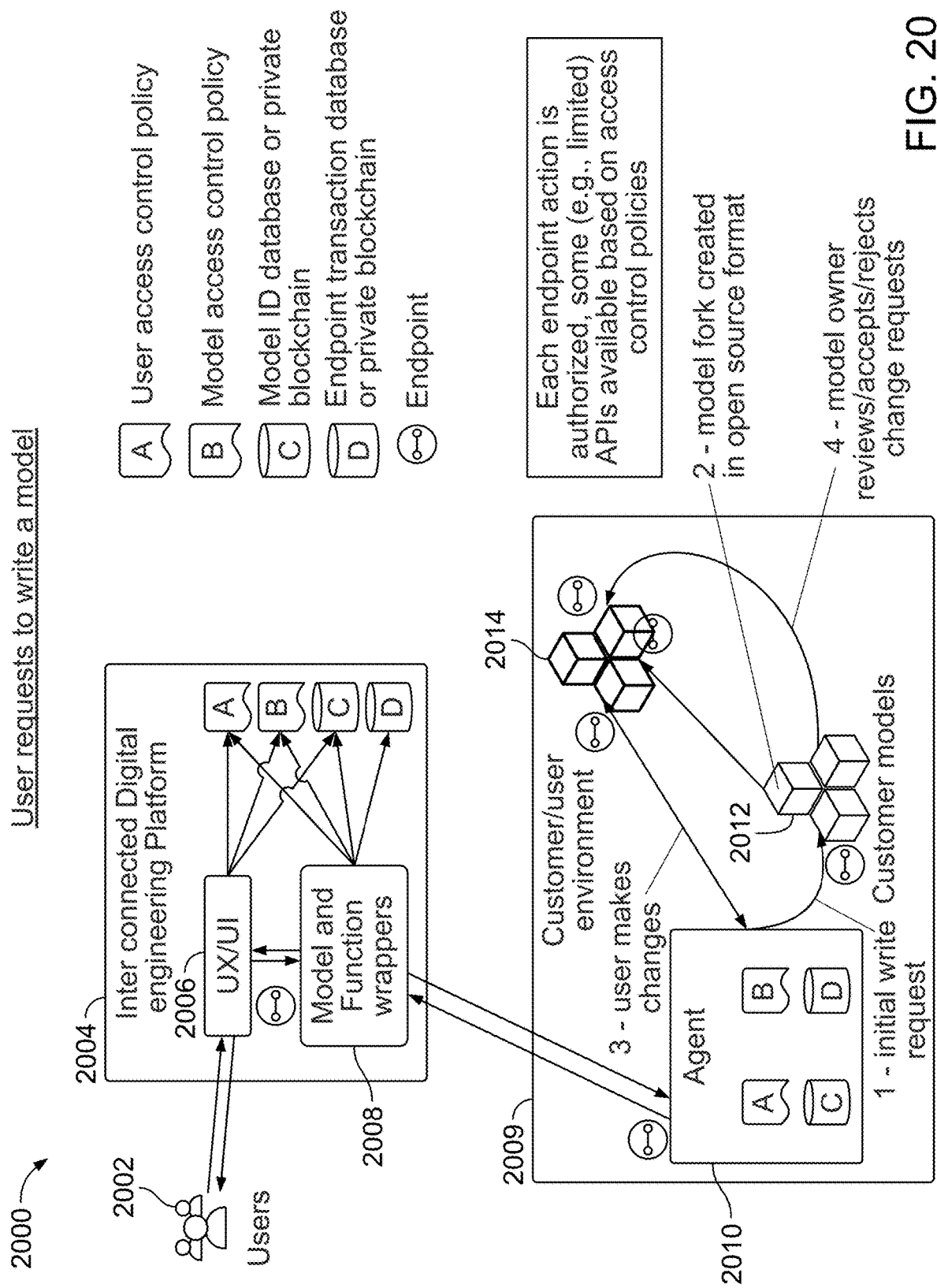
Figure 21:
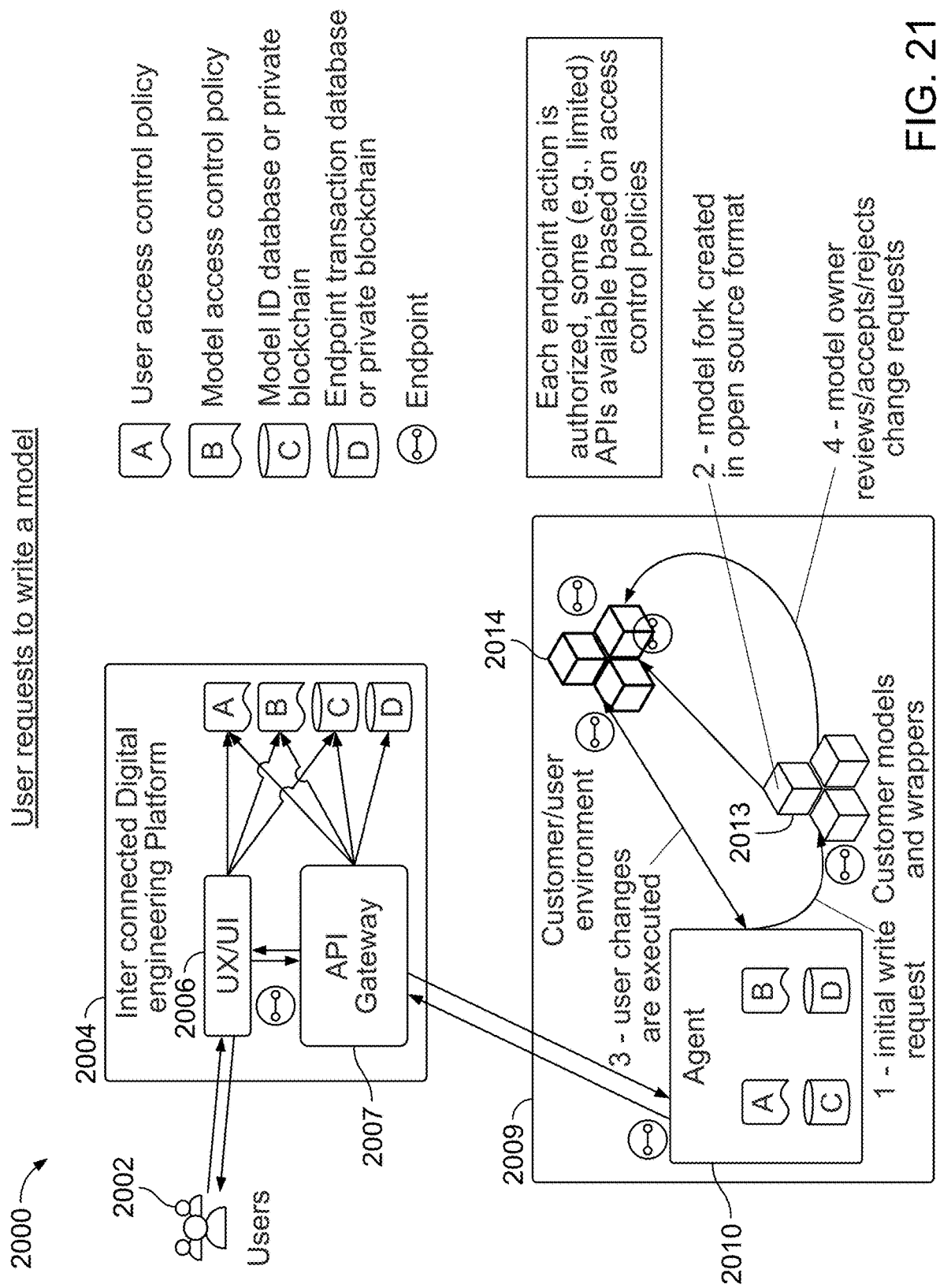

FIG. 18 and FIG. 19 illustrates the digital engineering and certification ecosystem 1800 where a read operation is performed. FIG. 20 and FIG. 21 illustrates the digital engineering and certification ecosystem 2000 where a write operation is performed. Generally, the difference between the read and write query implementations can be viewed in their ability to alter the state of the model. For example, read queries do not alter the model. Write queries, on the other hand, can alter the model. To ensure the security of the model, the implementation for write queries can involve creating a copy of the model and allowing for open access, while read queries are parsed through wrappers and authorized at the endpoint. The output data from both queries can be sent in full, redacted, using zero-knowledge approaches, or with digital watermarks. These security implementation methods aim to balance the needs for access to the model with the need to protect the model's state and data. FIG. 18 and FIG. 19 can include similar components to those illustrated in other figures described in this specification.

In the digital engineering and certification ecosystem 1800 where the read operation is performed, the read operation can link to models within the customer environment. In some implementations, a user 1802 can access the interconnected digital engineering platform 1804 through their end device. Specifically, a user 1802 can access the platform 1804 via their end device connecting the platform's user experience. Once connected, the user 1802 can transmit the request to access a model, multiple models, or a particular slice of the model. As mentioned, the interconnected digital engineering platform 1804 can record the access request in the endpoint transaction database or a private blockchain via the model and function wrappers 1808 or an API.

FIG. 18 describing the interconnected digital engineering ecosystem showcases the following components. In some implementations, the model and function wrappers 1808 include one or more cells (similar to the cell 902 in FIG. 9) and an API manager (similar to the API manager 904 shown in FIG. 9). Similar to FIG. 9, each cell 902 is represented by each function block situated behind the API manager 904, which serves as a container for the microservices and associated APIs. In some implementations, the model and function wrappers 1808 includes an API gateway (similar to the micro gateway 906 shown in FIG. 9). The API manager is the central component in FIG. 18 that connects the user

1802 to the platform 1804 via their end device. The API manager manages access to the models and functions, ensuring proper authentication and authorization.

In some implementations, the model and function wrappers 1808 can include the WAF (similar to the WAF 908 shown in FIG. 9), providing an additional layer of security by inspecting and filtering HTTP traffic. The interconnected digital engineering platform 1804 includes the API manager, which serves as the central point of control for managing access to the digital models and functions within the ecosystem. In some implementations, as shown in FIG. 19, the API gateway 1807 is within the interconnected digital engineering platform 1804 acting as an interface while the model and function wrappers are within the customer environment 1809. In these implementations, the customer environment 1809 includes one or more cells (similar to the cell 902 in FIG. 9) and an API manager (similar to the API manager 904 shown in FIG. 9). Similar to FIG. 9, each cell 902 is represented by each function block situated behind the API manager 904, which serves as a container for the microservices and associated APIs.

In some implementations, the WAF serves to scrutinize traffic for any potential threats, while the gateway isolates individual cells, only granting access to authorized users with the appropriate identity tokens. Once traffic has successfully traversed these security measures, then the traffic can be provided to and interact with the functions depicted in FIG. 9. This architecture not only streamlines the processing of requests but also maintains stringent security protocols, thereby creating an optimal environment for both resource sharing and intellectual property protection When a user requests to read from a model in FIG. 9, the process follows these steps: The user 1802 connects to the interconnected digital engineering platform 1804 via their end device and submits a request to access a model, multiple models, or a specific slice of the model. The request is sent to the API manager, which enforces authentication and authorization mechanisms, through the Customer Identity Access Management System, to ensure that only authorized users can access the requested data and routes the data to the cell where it is intercepted by a WAF. The WAF inspects and filters the incoming traffic for potential threats and malicious activity. If the request is deemed safe, the WAF allows the traffic to the cell containing the microservice and associated APIs responsible for handling the read operation.

The microservice processes the request, retrieves the requested data from the digital model, and returns the output to the user 1802 through the API manager and interconnected digital engineering platform 1804. Throughout this process, security measures such as endpoint transaction database logging or private blockchain recording can be employed to maintain a record of access requests and ensure the integrity and security of the digital models and data.

Moreover, the interconnected digital engineering platform 1804 can fetch the model information (e.g., a model ID and other data) from the model ID database or private blockchain via the API. Then, the model and function wrappers 1808 (as in FIG. 18) or the API Gateway 1807 (as in FIG. 19) can forward the access request to the agent 1810 in the model owner's environment or customer owner's environment 1809, to access one or more stored models 1812 in the customer owner's environment 1809. The customer owner's environment 1809 may be positioned behind one or more firewalls.

The firewall can either accept or deny the access request provided by the model and function wrappers 1808. If the firewall accepts the access request, the request is forward to the agent 1810 of the customer owner's environment 1809. The agent 1810 can verify the access request permissions with the user access policy server and the model access control policy, and retrieve data from the requested model 1812. In response, the agent 1810 can return the requested model or data indicative of the requested model to the interconnected digital engineering platform 1804 via the model and function wrappers 1808. If applicable, the firewall may either accept or deny the agent's access to provide the requested model. If accepted, the firewall can provide the requested model or data indicative of the requested model to the model and function wrappers 1808. In response, the model and function wrappers 1808 can display a model wrapper to the user 1802 via their end device.

As illustrated in FIG. 20, in the digital engineering and certification ecosystem 2000 where the write operation is performed, the write operation is performed by creating copies or forking copies without changing the source material of the model. The process performed for the write operation in the digital engineering and certification ecosystem 2000 is similar to the process performed for the read operation, but with various differences. In some implementations, a write operation can be performed using a permissions model. In some implementations, a user 2002 can access the interconnected digital engineering platform 2004 through their end device. Specifically, a user 2002 can access the platform 2004 via their end device connecting the platform's user experience (e.g., the UX/UI component 2006). Once connected, the user 2002 can transmit the request to access a model, multiple models, or a particular slice of the model. As mentioned, the interconnected digital engineering platform 2004 can record the access request in the endpoint transaction database or a private blockchain via the model and function wrappers 2008 or an API.

As in FIG. 20, model and function wrappers 2008 can include implementations with similar components and similar functionality as in previous figures (such as FIG. 9). In other implementations, as in FIG. 21, the API Gateway 2007 is housed in the interconnected digital engineering platform 2004, while the rest of the components and functionality as in previous figures (such as FIG. 9) are housed within the customer environment 2009.

Moreover, the interconnected digital engineering platform 2004 can fetch the model information (e.g., a model ID and other data) from the model ID database or private blockchain via the API. Then, the model and function wrappers 2008 can forward the access request to the agent 2010 in the model owner's environment or customer owner's environment 2009. The customer owner's environment 2009 may be positioned behind one or more firewalls.

The firewall can either accept or deny the access request provided by the model and function wrappers 2008. If the firewall accepts the access request, the request is forwarded to the agent 2010 of the customer owner's environment 2009. The agent 2010 can verify the access request permissions with the user access policy server and the model access control policy. In response, the agent 2010 can create a fork of the request model and apply changes (e.g., modifications) to the forked model 2014 according to the request. In some examples, creating a fork of the requested model can include creating one or more copies of the model and creating copies of the model of varying formats. The forked model 2014 can be a copy of the model 2012 stored in the customer owner's environment 2009. At this point, the model owner can review changes made to the forked model 2014 and determine whether to accept or reject the changes made to the forked model 2014. If the model owner accepts the changes, the stored model 2012 can be updated. If the model owner rejects the changes, no changes are performed on the stored model 2012, which ultimately preserves the integrity of the stored model 2012.

In response, the agent 2010 can return the model updates to the interconnected digital engineering platform 2004 via the model and function wrappers 2008. If applicable, the firewall may either accept or deny the agent's access to provide the model updates. If accepted, the firewall can provide the model updates or data indicative of the model updates to the model and function wrappers 2008. In response, the model and function wrappers, 2008 can display an updated model wrapper to the user 2002 via their end device.

In some implementations, the storage of the models 2012 can further advance the data security policy. Specifically, the model storage 2012 can include a public database or a private database linked to the interconnected digital engineering platform. The data security policy can advance various policies. These policies can include model identity, model continuity, and model accord. Model identity can include the identity of the model, such as a model identifier. The model identifier can be stored within a secure database, such as using cryptographic hashing or tokenized on a blockchain network. The blockchain network can store a model identifier or a pointer to an address that stores addresses to various models. The model continuity can relate to tracking and analyzing endpoint transactions or standardized endpoint transaction metadata for continuity. The tracking and analyzing of endpoint transactions can be stored with cryptographic hashing or by tokenizing the transaction record on a private blockchain. Additionally, new transactions may be confirmed and added to the private blockchain if the prior track record of V&V is not broken. Lastly, the model accord can include analyzing models with multiple DE tools and utilizing the ZK-snarks accord.

Figure 22:
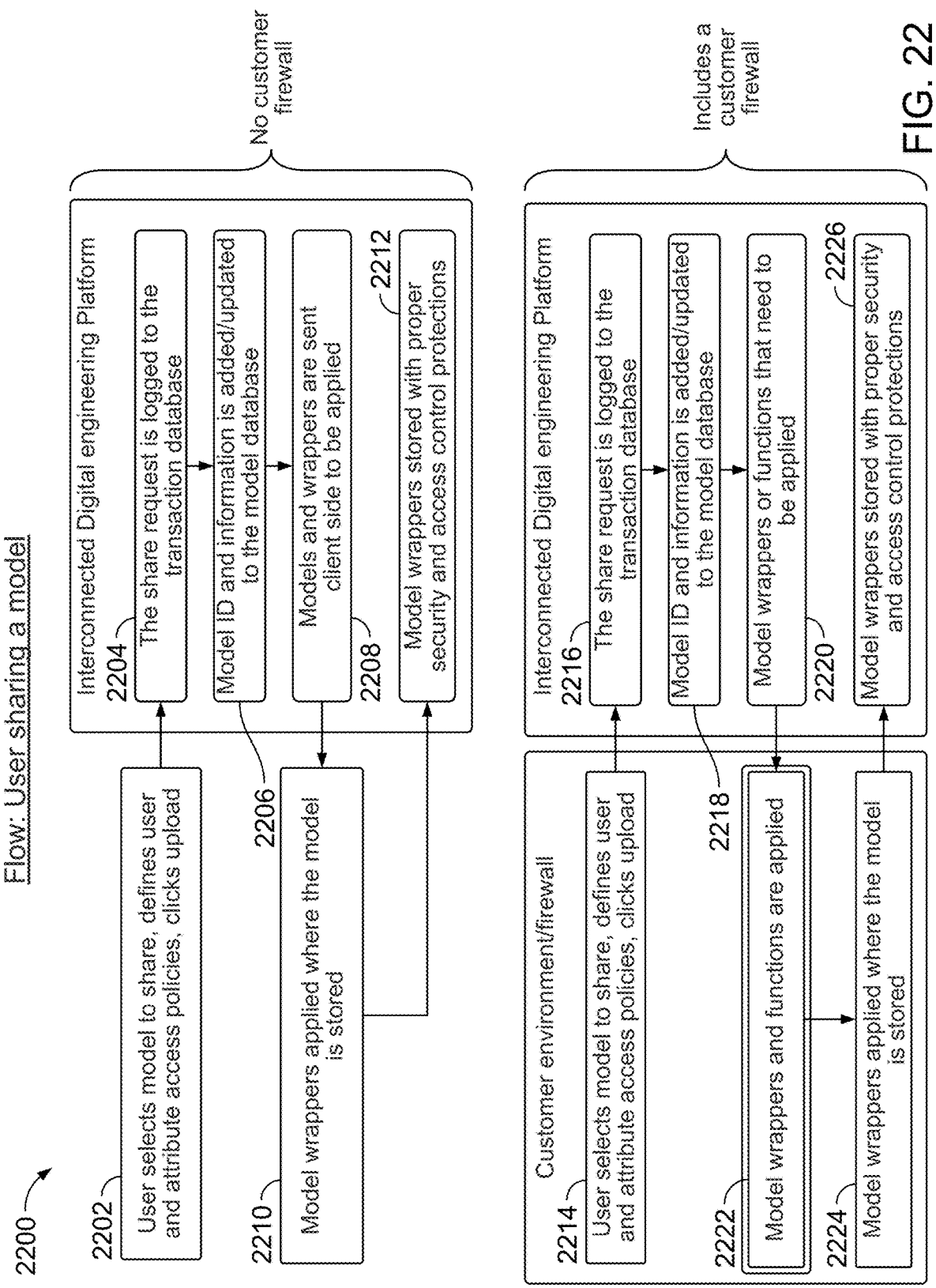
FIGS. 22, 23, 24, and 25 are flow charts showing the security implementation steps for sharing a digital model, or to share a redacted part of a digital model.
Figure 23:
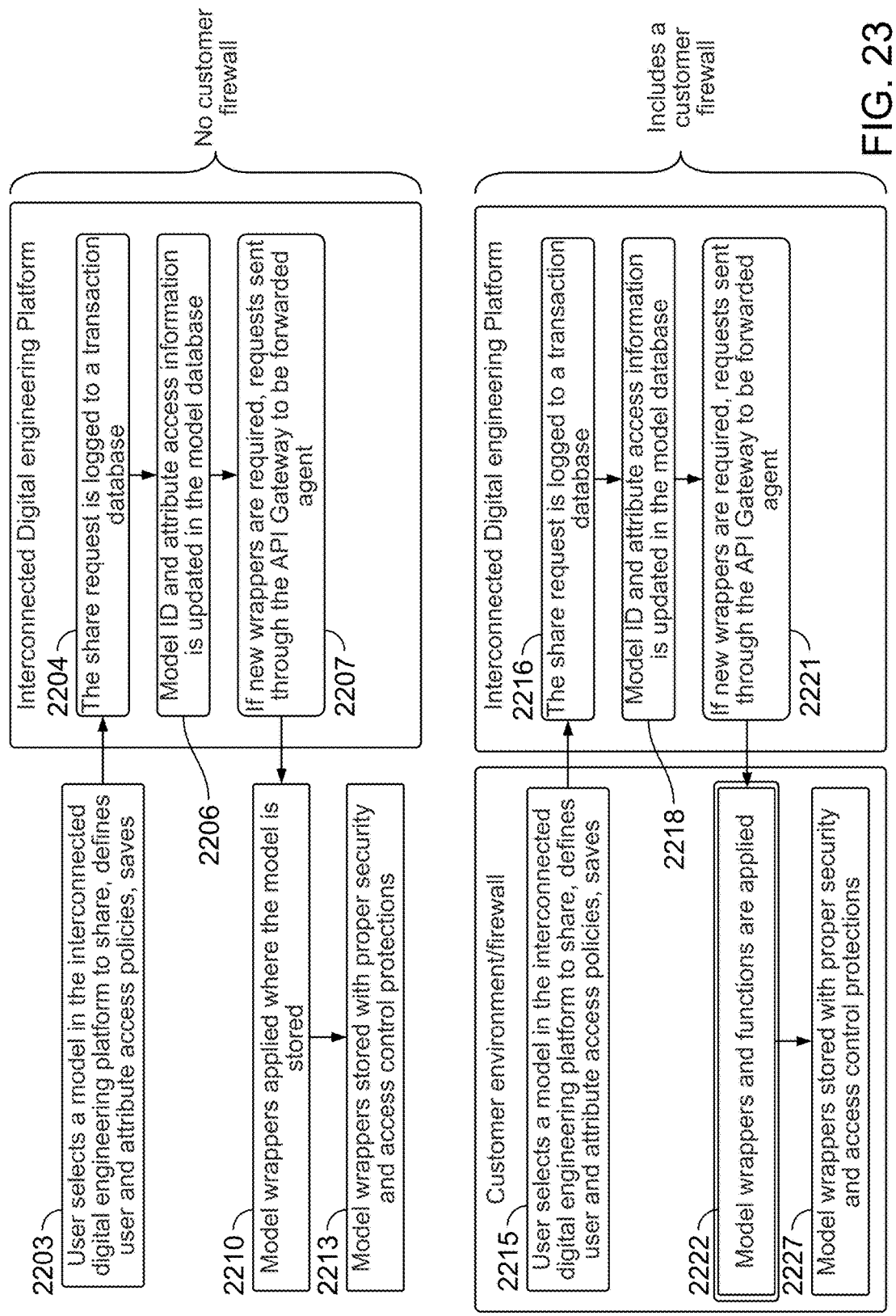
Figure 24:
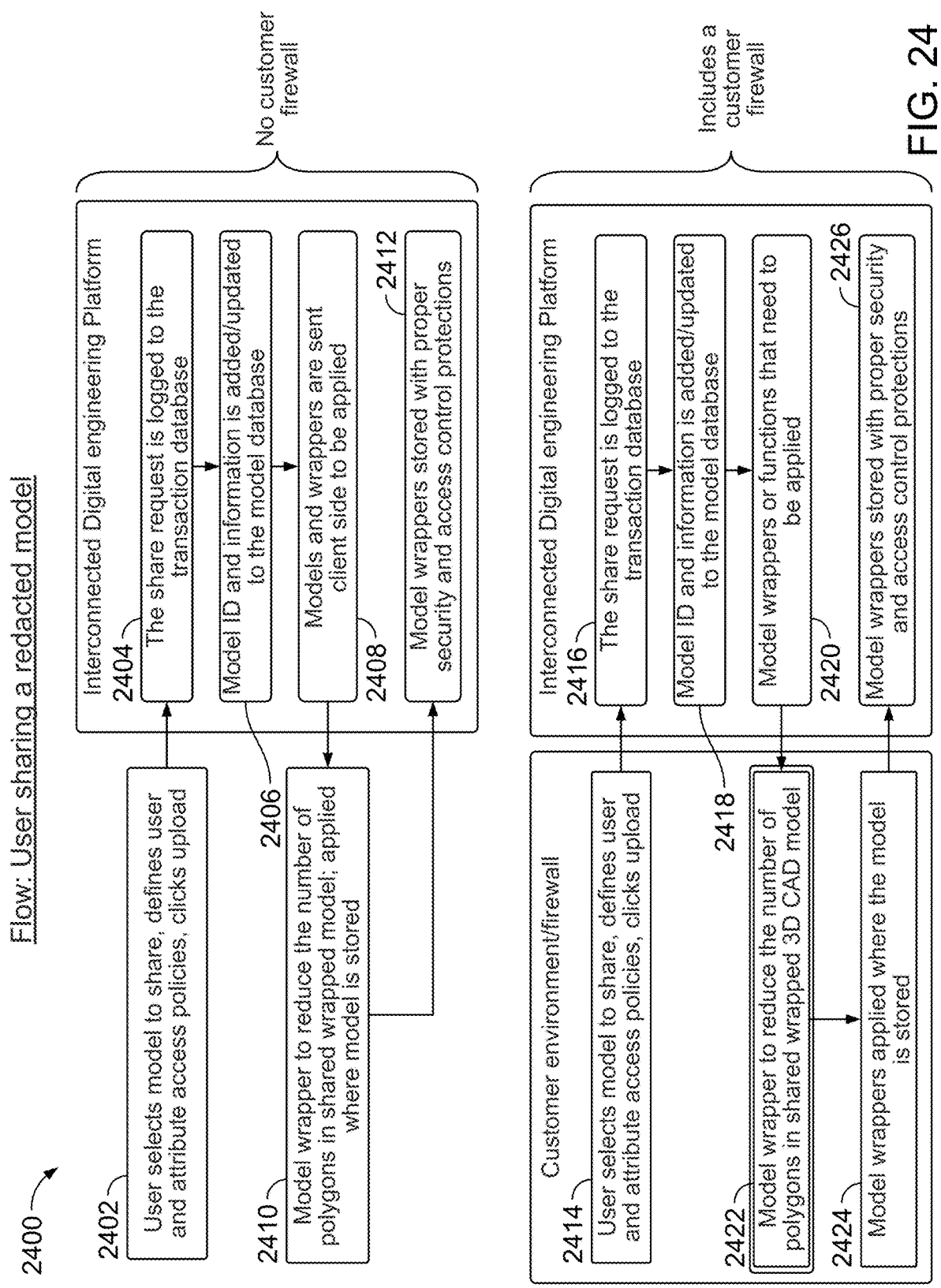
Figure 25:
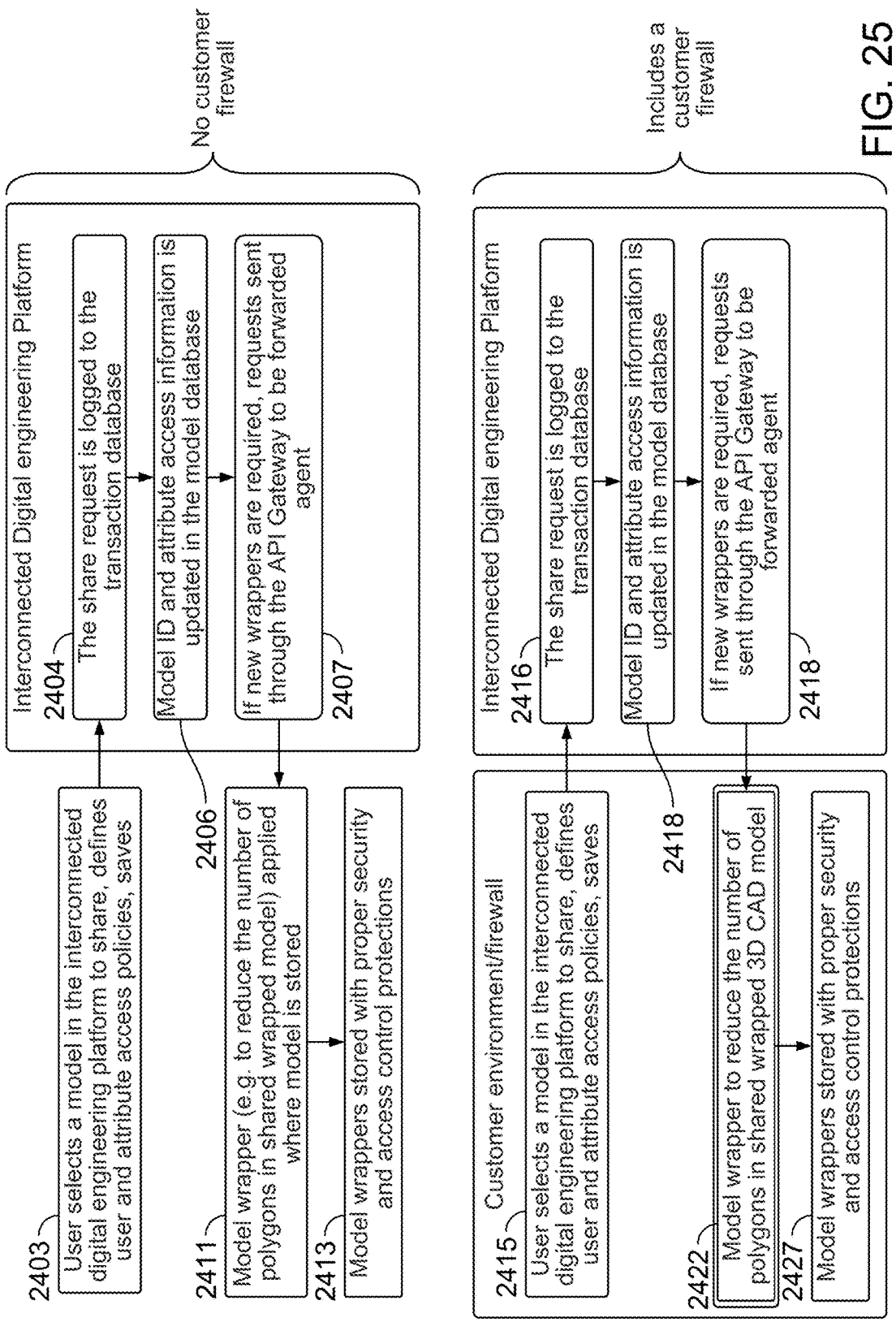

The differences between the security implementations for sharing a digital model and sharing a redacted part of a digital model, as shown in FIGS. 22, 23, 24 and 25, are in the amount of data being shared. In the first implementation, as shown in FIG. 22, the entire digital model is shared. In the second implementation, as shown in FIG. 23, the digital model data is shared only within the customer environment and the model wrappers are stored (2213 and 2227) with proper security outside the interconnected digital engineering platform. In the third implementation, as shown FIG. 24, only a redacted portion of the model is shared (i.e., a subset of the model attributes). In the fourth implementation, as shown in FIG. 25, only a redacted portion of the model is shared (i.e., a subset of the model attributes) within the customer environment and the model wrappers are stored (2427) with proper security outside the interconnected digital engineering platform. Both implementations involve authentication of the user and the endpoint, parsing the request through wrappers, and authorizing the request at the endpoint. The output data can further be digitally watermarked for traceability. The choice between sharing the entire model or only a redacted portion can depend on the specific security and privacy needs of the data being used by the model, as well as the user's level of access and their intended authorized use for the data requested from the model.

FIG. 22 and FIG. 23 illustrates different implementations for sharing a model in the digital engineering and certification ecosystem 2200. The first implementation illustrates model sharing without a customer firewall. The second implementation illustrates model sharing with the customer firewall. In the first implementation, initially, the user can select a model to share, define user and attribute access policies related to the model to share, and upload the model to the interconnected digital engineering platform (2202). The interconnected digital engineering platform can log the received share request to the transaction database (2204). In response, the interconnected digital engineering platform can add and/or update the model ID and information associated with the model to the database (2206). Afterwards, the interconnected digital engineering platform can send the models and wrappers to the client device to be applied (2208). The client device can apply the model wrappers where the model is stored, at the discretion of the user (2210). In some examples, cloud-based security techniques can be unlocked by enabling model wrapping or model splicing at the edge device. When models or model-like files are maintained at the edge device, such as a client device, these models or model-like files can be viewed and/or modified through the model splicing in a secure manner on the edge device. In response, the interconnected digital engineering platform can store the model wrappers with the proper security and access control protections (2212).

Model and function wrappers (shown in steps 2208, 2210, 2212, 2220, 2222, 2224 and 2226) can include implementations with similar components and similar functionality as in previous figures (such as FIG. 9).

In the second implementation, as shown in FIG. 23, the digital model data is shared only within the customer environment and the model wrappers are stored (2213 and 2227) with proper security outside the interconnected digital engineering platform. The API Gateway and model and function wrappers (shown in steps 2207, 2210, 2213, 2221, 2222 and 2227) can include implementations with similar components and similar functionality as in previous figures (such as FIG. 9).

In the third implementation (FIG. 24), the user can select a model to share, define user and attribute access policies related to the model to share, and upload the model to the interconnected digital engineering platform (2414). The interconnected digital engineering platform can log the received share request to the transaction database (2416). In response, the interconnected digital engineering platform can add and/or update the model ID and information associated with the model to the database (2418). Afterwards, the interconnected digital engineering platform can send the models and wrappers to a digital engineering agent behind the firewall of the customer environment to be applied (2420). The digital engineering agent can apply the model wrappers and functions (2422). Outside the digital engineering agent, the customer environment can apply the model wrappers and functions where the model is stored, such as a particular IDE (2424). In response, the interconnected digital engineering platform can receive the model wrappers through the firewall and store the model wrappers with the proper security and access control protections (2426).

FIG. 24 illustrates different implementations for sharing a redacted model in the digital engineering and certification ecosystem 2400. The first implementation illustrates redacted model sharing without a customer firewall. The second implementation illustrates redacted model sharing with the customer firewall. The first implementation of the digital engineering and certification ecosystem 2400 (2402 through 2412) is similar to the first implementation of the digital engineering and certification ecosystem 2200 (2202 through 2212). Likewise, the second implementation of the digital engineering and certification ecosystem 2400 (2414-

2426) is similar to the second implementation of the digital engineering and certification ecosystem 2200 (2214-2226).

However, the first implementation of the ecosystem 2400 differs from the first implementation of the ecosystem 2200 at the client side. Specifically, the client can utilize the model wrapper to reduce the number of polygons in the shared wrapper model and apply the reduced or redacted shared model where the original model is stored (2410). Then, the interconnected digital engineering platform can receive the model wrappers and store the model wrappers with the proper security and access control protections (2412).

Model and function wrappers (shown in steps 2408, 2410, 2412, 2420, 2422, 2424 and 2426) can include implementations with similar components and similar functionality as in previous figures (such as FIG. 9)

In the fourth implementation, as shown in FIG. 25, only a redacted portion of the model is shared (i.e., a subset of the model attributes) within the customer environment and the model wrappers are stored (2413 and 2427) with proper security outside the interconnected digital engineering platform. The API Gateway and model and function wrappers (shown in steps 2407, 2411, 2413, 2421, 2422 and 2427) can include implementations with similar components and similar functionality as in previous figures (such as FIG. 9).

Similarly, the second implementation of the ecosystem 2400 differs from the second implementation of the ecosystem 2200 at the customer environment behind the firewall. Specifically, the digital engineering agent can apply the model wrappers and functions to reduce the number of polygons in the shared wrapped model, creating a reduced shared model (2422). Outside the digital engineering agent, the customer environment can apply the model wrappers and functions where the model is stored, such as a particular IDE (2427).

In some examples, reducing the number of polygons can include reducing a polygon count on a polygonal mesh representation of a CAD model. Reducing the polygon count on the polygonal mesh representation of the CAD model can blur or obfuscate the CAD model or having a sparse mesh model or a dense mesh model. In some implementations, the digital agent and/or interconnected digital engineering platform can perform various methods of redaction. For example, one method of redaction can include reducing the polygons in mesh representations that have a certain attribute type, such as geometry or material properties, or allowing access to specific model attributes. These redaction controls can be nested and configured by a model owner. For example, the redaction controls can be wrapped to only include properties, and the owner can specify that the shine property be not revealed.

Figure 26:
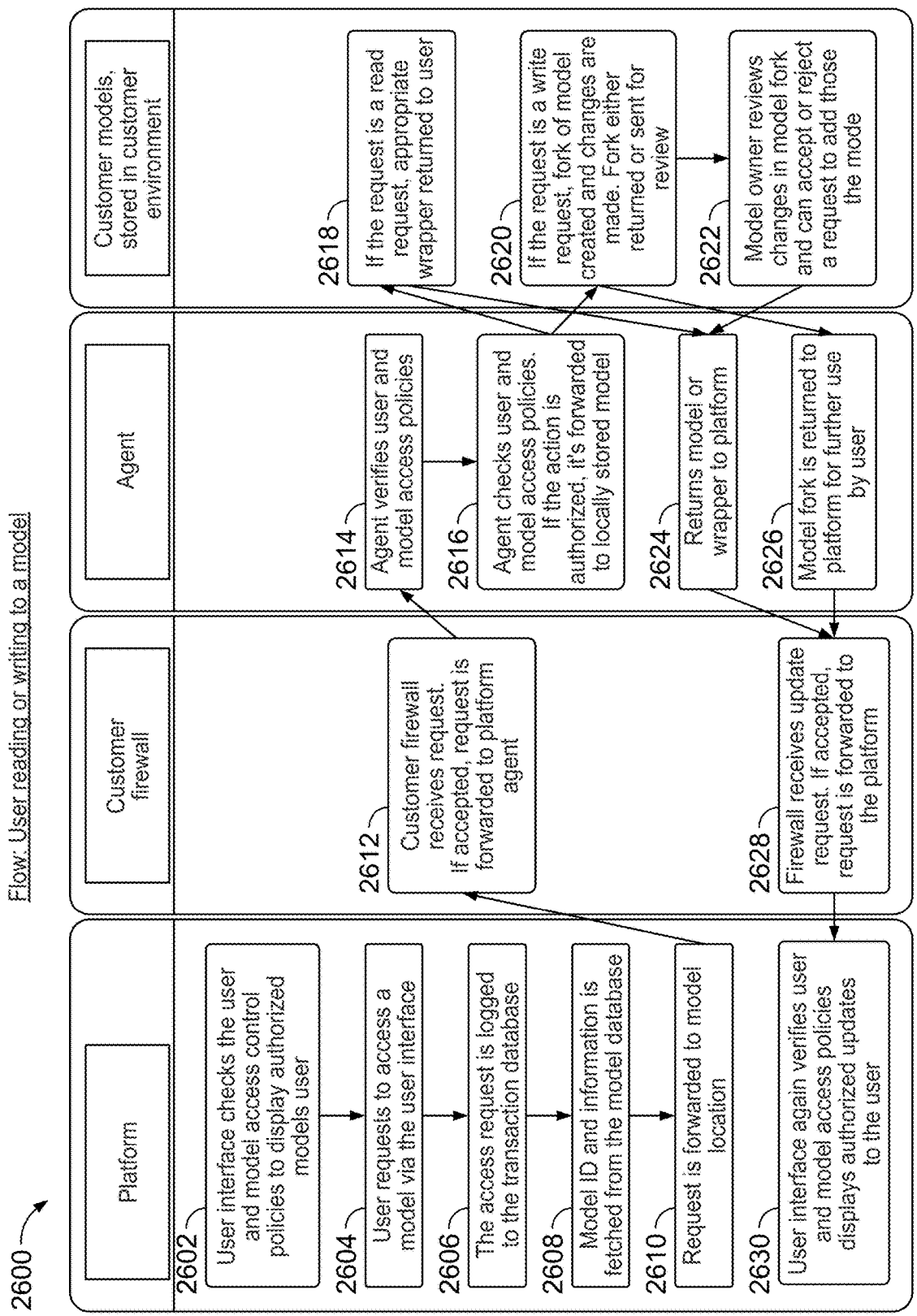
FIGS. 26, 27, 28, and 29 are flow charts showing a sequence of steps that occur when a user interacts with a digital model, where specific actions occur in the digital engineering ecosystem, the customer-computing environment, or a model storage environment.
Figure 27:
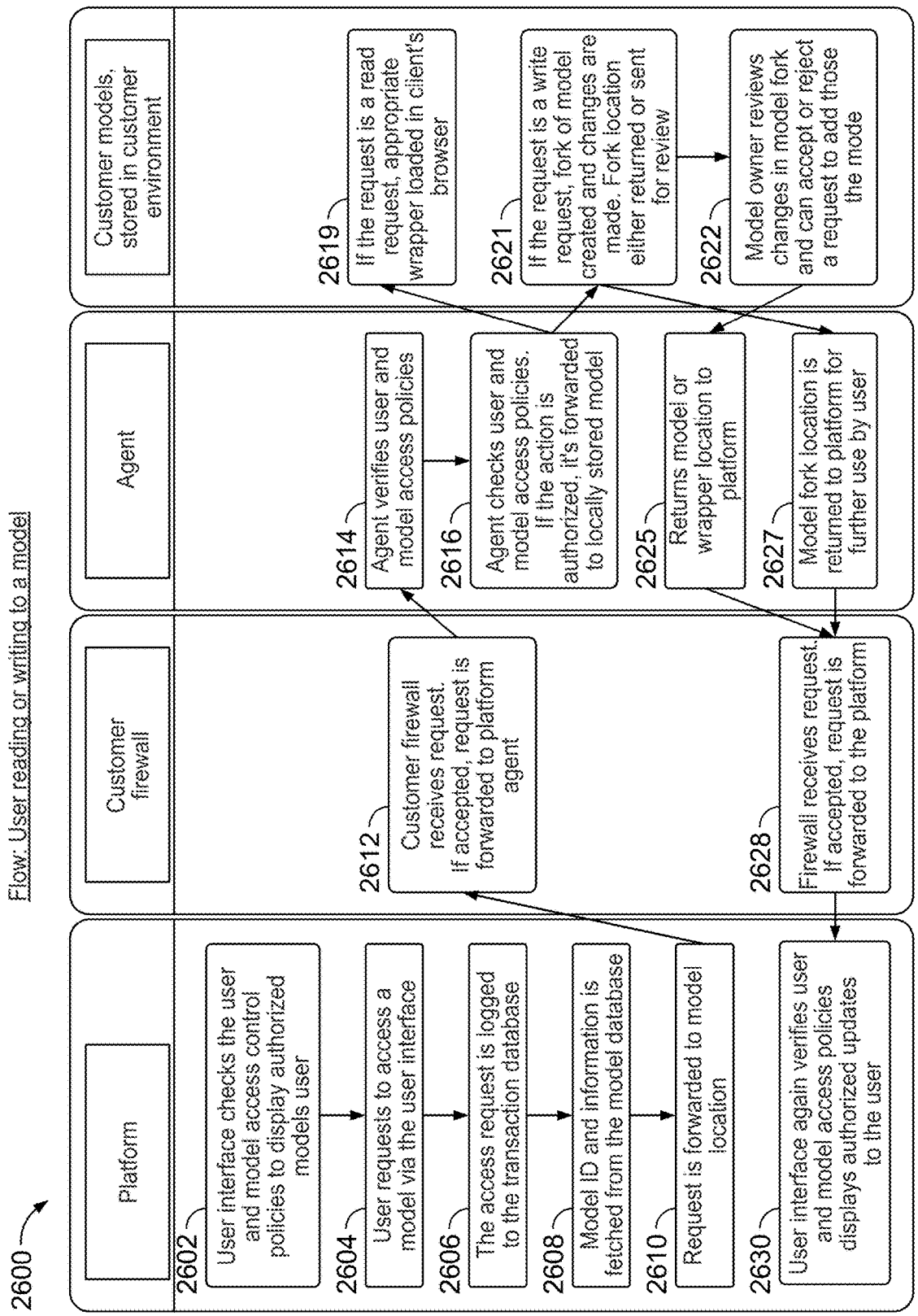

The differences between each pair of the two implementations shown in FIGS. 26 and 28, and FIGS. 27 and 29, are in the visual representation of the digital engineering ecosystem's components and the user's computing environment. FIGS. 26 and 27 differ in the model wrapper location, where FIG. 26 can have the model wrapper hosted in the platform, whereas in FIG. 27, the model wrapper is hosted within the customer firewall. Both pairs of flow charts (FIGS. 26 and 28, FIGS. 27 and 29) show the sequence of processes involved when a user interacts with a digital model, but the visual representation of these components and environments differ in each implementation. This difference in representation provides additional clarity on the relationship between the components and the user's computing environment in the overall zero trust security of models. These flow charts can be viewed in conjunction with FIG. 8 for a full understanding of the various elements involved in the security implementation.

Figure 28:
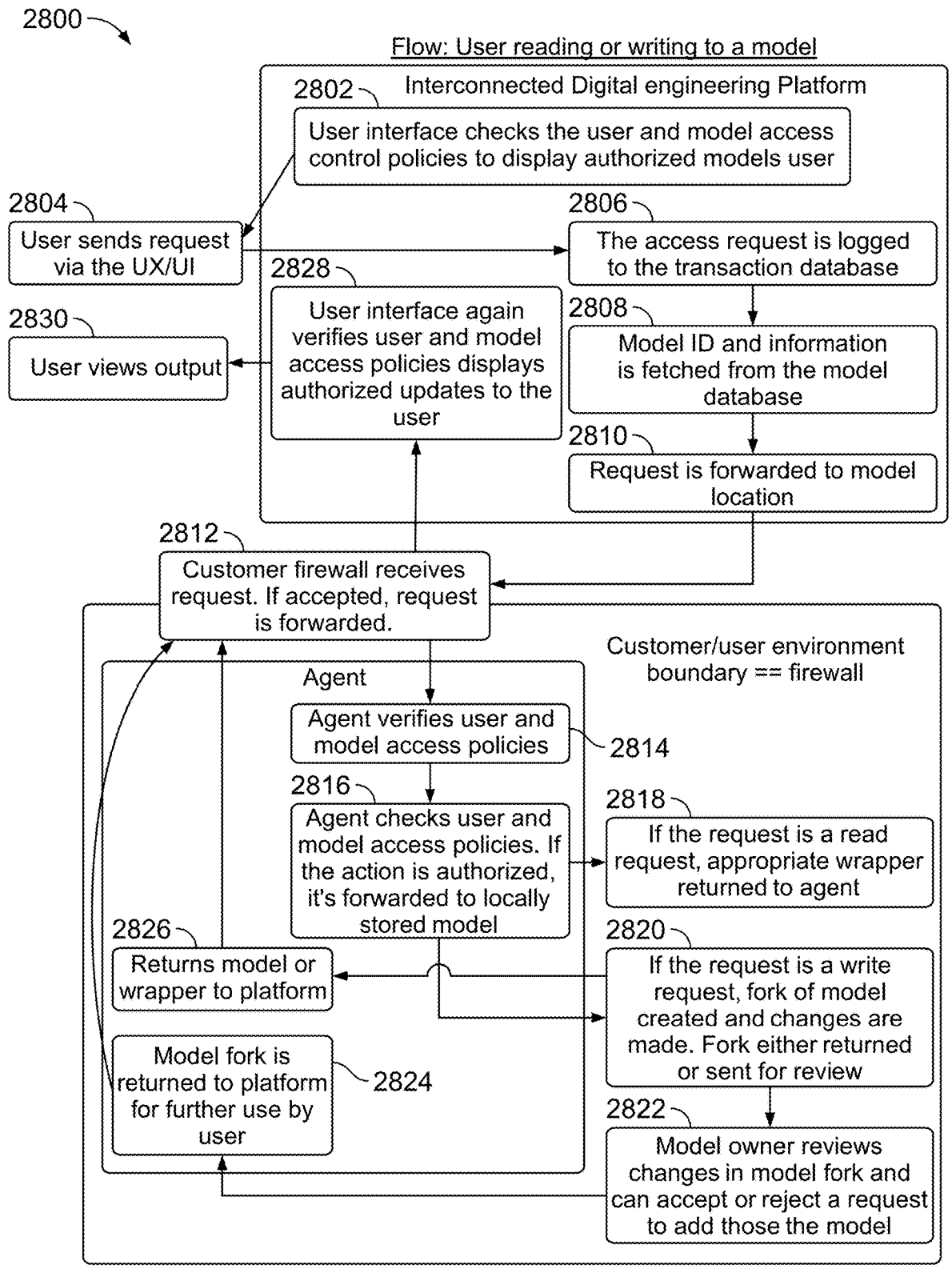
Figure 29:
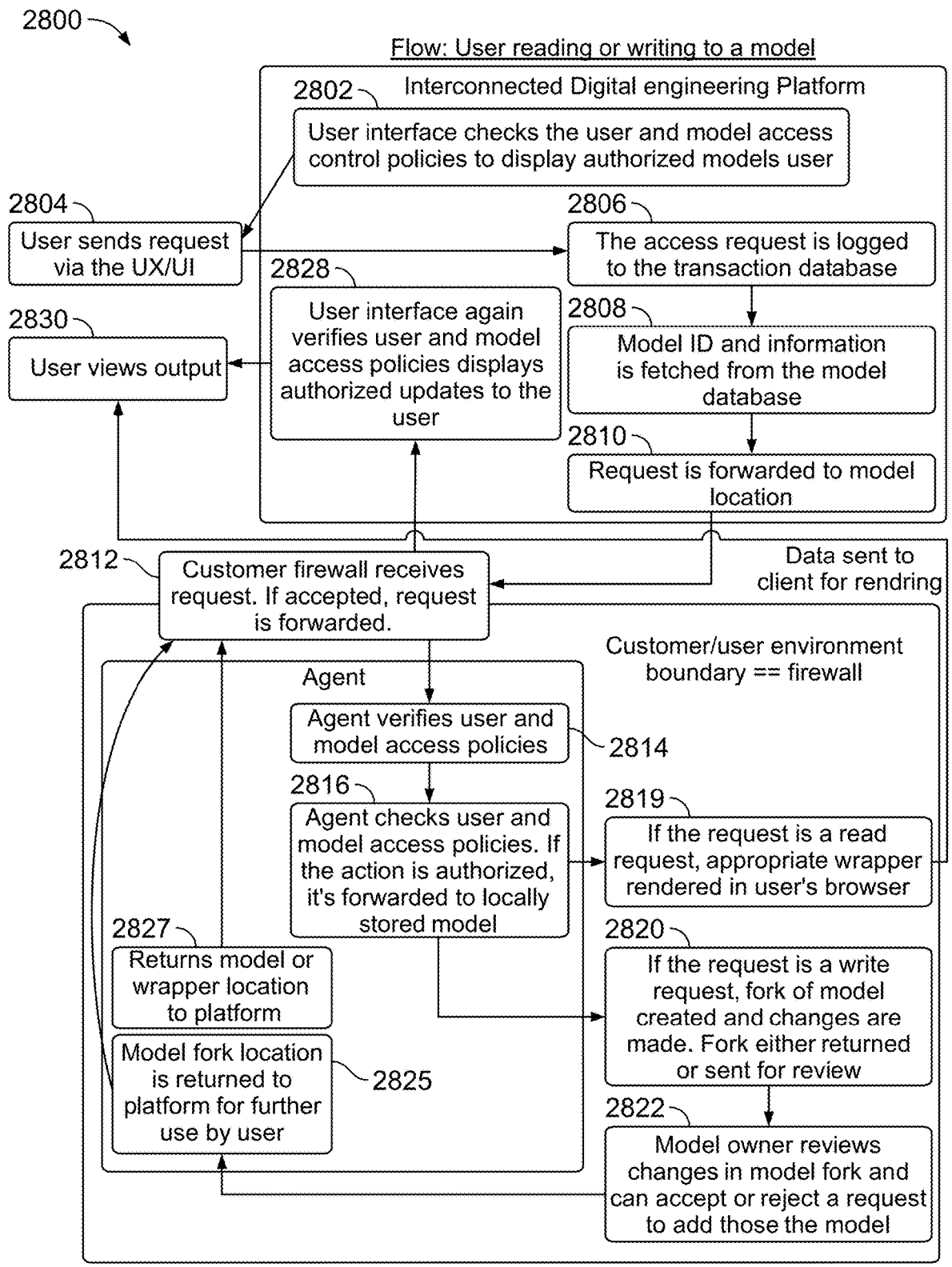

The processes illustrated in FIGS. 26 and 28, and in FIGS. 27 and 29, can be performed by a digital computing system such as the digital computing system 108, an interconnected digital engineering platform, a customer firewall, a digital engineering agent, one or more customer models stored in a customer environment, and other components described throughout the specification. FIG. 26 and FIG. 27 illustrates processes 2600 related to a user reading and writing to a model. FIG. 28 and FIG. 29 illustrates another implementation of processes 2800 related to a user reading and writing to a model.

In process 2600, the interconnected digital engineering platform can provide a user interface to an end device of a user. The user interface can check the user and model access control policies to display authorized models to the user (2602). The user interface can receive interactions from the user and provide data indicative of the interactions to the interconnected digital engineering platform (2604). For example, the user interface can receive user requests to access one or more models. In response, the user interface can provide the user requests to the interconnected digital engineering platform. The interconnected digital engineering platform can log the user request or access request to a transaction database (2606).

In some implementations, the interconnected digital engineering platform can fetch a model identifier and model information from a model database (2608). Specifically, the interconnected digital engineering platform can extract data indicating the type of model being requested and can fetch the model identifier and model information using the extracted data indicating the type of model being requested from the model database as an index, for example. In response to retrieving the model identifier and the model information from the model database, the interconnected digital engineering platform can forward the user request with the model identifier and the model information to the location of the model (2610).

Model and function wrappers (shown in steps 2618 and 2624 in FIG. 26 and shown in steps 2619 and 2625 in FIG. 27) can include implementations with similar components and similar functionality as in previous figures (such as FIG. 9). In FIG. 27, steps 2621, 2625 and 2627 illustrate how the model wrapper is hosted exclusively within the customer firewall and only location information is shared with the agent.

As illustrated in FIG. 26, the interconnected digital engineering platform can forward or transmit the user request with the model identifier and the model information to the location of the model, which may be behind a company or customer firewall, an API gateway, a messaging service, a network blocking function, or another type of network system that reviews accepting or declining network traffic. The company or customer firewall can receive the forwarded request from the interconnected digital engineering platform (2612). The firewall can decide whether to accept the forwarded request and forward the request to a digital engineering agent behind the firewall or reject the forward request. When the firewall accepts the forwarded request, the agent receives the forwarded request and verifies the request against user and model access policies (2614). For example, the agent can verify the permissions of the user request against the user access control policy and against the model access control policy. If the agent verifies that the user request is authorized, then the agent can forward the received quest to the locally stored model (2616). If the agent determines the user request is not authorized against one or more of the user access control policies or model access control policies, then the agent can discard or reject the user request.

In some implementations, the agent can determine a type of the user request if the user request verifies against the user access control policy and the model access control policy. For example, the agent can determine that the user request is a read request or a write request. If the agent determines the user request is a read request, then the agent can access an appropriate wrapper or API for the requested model (2618). Alternatively, if the agent determines the user request is a write request, the agent can fork or create a copy of the requested model (2620). The agent can apply the requested written changes to the forked or copy of the requested model, so the stored model preserves its data. In response to the written changes being applied to the forked copy, the agent can return the forked copy to the model owner (2622). The model owner can review the changes in the forked copy and decide whether to accept or reject the changes. If the model owner decides to accept the changes, then the changes of the forked copy can be applied to the stored model. If the model owner decides to reject the changes, then the agent can discard the forked copy.

In some implementations, the agent can perform the aforementioned actions on each of the stored customer models. In some cases, the agent can perform the read or write actions on each of the stored customer models in the customer environment. In some cases, the agent can perform the read or write actions on each of the stored customer models outside of the customer environment.

In response to performing the read action, write action, or both, the agent can return the model to the customer firewall. Specifically, after the agent performs a read operation, the agent can return the model or wrapper of the model to the interconnected digital engineering platform through the customer firewall (2624). Similarly, after the agent performs a write operation, the agent can return the forked model or copy of the model with the written edits applied to the interconnected digital engineering platform through the customer firewall (2626). If both operations are requested for in the user request, then the agent can provide both the model or wrapper and the forked model to the interconnected digital engineering platform through the customer firewall.

In some implementations, the customer firewall can receive the data from the agent (2628). Specifically, the customer firewall can receive the response to the user request from the agent. The response to the user request can include, for example, the model or wrapper of the model, the copy of the forked model, or both. The customer firewall can determine whether to accept or reject the response to the user request. If the customer firewall rejects the request, then the customer firewall can disregard the response. If the customer firewall accepts the request, then the customer firewall can provide the response to the user request to the interconnected digital engineering platform.

In some implementations, the interconnected digital engineering platform can receive the response to the user request from the customer firewall (2630). The interconnected digital engineering platform can provide the response to the user request to a user interface to an end device or end point of a user that transmitted the user request. Prior to displaying the response to the user request to a user interface of the end device, the interconnected digital engineering platform can verify the user is the authenticated user for viewing these results. The verification can be performed by comparing the credentials of the user to the user access policies and the model access policies. In response to verification against the policies being successfully authenticated, the interconnected digital engineering platform can display the response to the user request to the user interface of the end device of the authenticated user. This process can repeat for each user request transmitted by the user to the interconnected digital engineering platform.

In some implementations, the interconnected digital engineering platform can be positioned within or behind a customer firewall. In this implementation, the processes performed by the interconnected digital engineering platform with respect to FIG. 26 can be performed within the customer firewall. Other examples and placement of the interconnected digital engineering platform are also possible. In a related implementation shown in FIG. 27, steps 2621, 2625 and 2627 illustrate how the model wrapper is hosted exclusively within the customer firewall and only location information is shared with the agent.

FIG. 28 illustrates another implementation of processes 2800 related to a user reading and writing to a model. In process 2800, the interconnected digital engineering platform can verify the authenticity of the user against the user and model access control policies to ensure the user is authenticated to review authorized model information (2802). In response to successful authentication, the user can send a user request from their respective end device to the UX/UI component at the interconnected digital engineering platform (2804). The interconnected digital engineering platform can receive the user request and log the access request in a transaction database (2806). Then, the interconnected digital engineering platform can extract model identifying information from the user request, and use the extracted model identifying information to identify model ID and model information from a model database (2808). The model database may be connected locally to the interconnected digital engineering platform or connected over the internet to the interconnected digital engineering platform.

In response to accessing the model ID and model information from the model database, the interconnected digital engineering platform can forward the user request to the location of the requested model (2810). The interconnected digital engineering platform can use the model ID and model information as a destination address for identifying the location of the requested model. In some cases, the model ID and model information can be forwarded with the user request to the model location.

Model and function wrappers (shown in steps 2818 and 2826) can include implementations with similar components and similar functionality as in previous figures (such as FIG. 9). In FIG. 29, steps 2814, 2816, 2825, and 2827 illustrate how the model wrapper is hosted exclusively within the customer firewall and only location information is shared with the agent.

In some implementations, the model location may be located behind a customer firewall in a customer environment. The customer firewall can receive the user request and determine whether to accept or reject the user request (2812). If the customer firewall accepts the user request, the customer firewall can forward the user request to the digital engineering agent behind the firewall. The digital engineering agent can receive the forwarded user request and verify the access of the user request against user access policies and model access policies (2814). If the digital engineering agent determines the user access request is verified against the user access policies and the model access policies, then the digital engineering agent can forward the user request to the requested model (2816).

In some implementations, the digital engineering agent can determine the type of action to be performed from the user request. If the digital engineering agent determines the type of action is a write request, then the digital engineering agent can create a copy or fork of the requested model and apply the write request changes to the forked model (2820). The forked copy with the written changes can then either overwrite the stored model or send it for review to the model owner. The model owner can either accept the written changes, which are then applied to the stored model, or reject the written changes, in which the digital engineering agent can discard the forked copy (2822). The digital engineering agent can then return the forked model to the interconnected digital engineering platform (2824).

If the digital engineering agent determines the type of action is a read request, then the digital engineering agent can access an API or model wrapper for the requested model (2818). The digital engineering agent can return the API or the model wrapper to the model owner for their review to access data from the model (2826). Moreover, the digital engineering agent can return either the model or the API to the interconnected digital engineering platform.

In another implementation, shown in FIG. 29, steps 2814, 2816, 2825 and 2827 illustrate how the model wrapper is hosted exclusively within the customer firewall and only location information is shared with the agent.

The customer firewall can receive either the forked copy of the model or the model wrapper (i.e., the response to the user request) and determine whether to pass the response to the user request through to the interconnected digital engineering platform (2812). If the customer firewall determines to pass the response to the user request through to the interconnected digital engineering platform, the interconnected digital engineering platform can receive the response and verify the user has access to the model data again (2828). This additional security step ensures the interconnected digital engineering platform verifies the authenticity of the user reviewing the response to the user request, who may be different from the user who transmitted the user request.

In response to successfully authenticating the user to view the response to the request, the interconnected digital engineering platform can display the response to the user request (2830). The response to the user request may be displayed in various manners. For example, the response can be displayed via a user interface at an end device, via a user interface at a display connected to the interconnected digital engineering platform, or provided as a message to the end device via email, text, or audio message, for example.

In some implementations, the interconnected digital engineering platform can apply digital watermarks to one or more digital models in the secure digital engineering ecosystem. The digital watermarks can include using, for example, endpoint data, cryptography, blockchain tokenization, human and machine-readable watermarks, hiding the watermark within the model, creating a unique digital signature, incorporating DRM technologies, etc. Other methods for digital watermarking can include, for example, steganography which can add watermarks by hiding information within the model. The interconnected digital engineering platform can employ adding digital watermarks to digital models to provide extra protection and traceability for digital models. In some examples, the digital engineering agent can digitally watermark each of the stored digital models. Moreover, the model owner can provide instructions that indicate to the digital engineering agent and/or the interconnected digital engineering platform which of the stored models to apply with digital watermarking.

In some examples, the digital watermark can include a platform specific pattern for edits to a model. In others, the digital watermark can include an addition to the model's file header which includes the signed cryptographic hash of the latest recorded transaction against the stored model, which does not change how the model can be used by other systems but provides a digital indication that the model has been transacted upon within the interconnected digital engineering platform. The digital watermarking process can be described with reference to any of the systems described throughout the specification. The digital watermarking process can be useful in situations where the digital engineering model or data from the digital engineering model leaks outside the digital engineering and certification ecosystem. For example, the digital watermark of the leaked model or data can be viewed to identify where the leakage originated and/or the last transaction that occurred with the leaked model and/or data. As such, the digital watermarking can provide a safeguard for traceability purposes.

Figure 30:
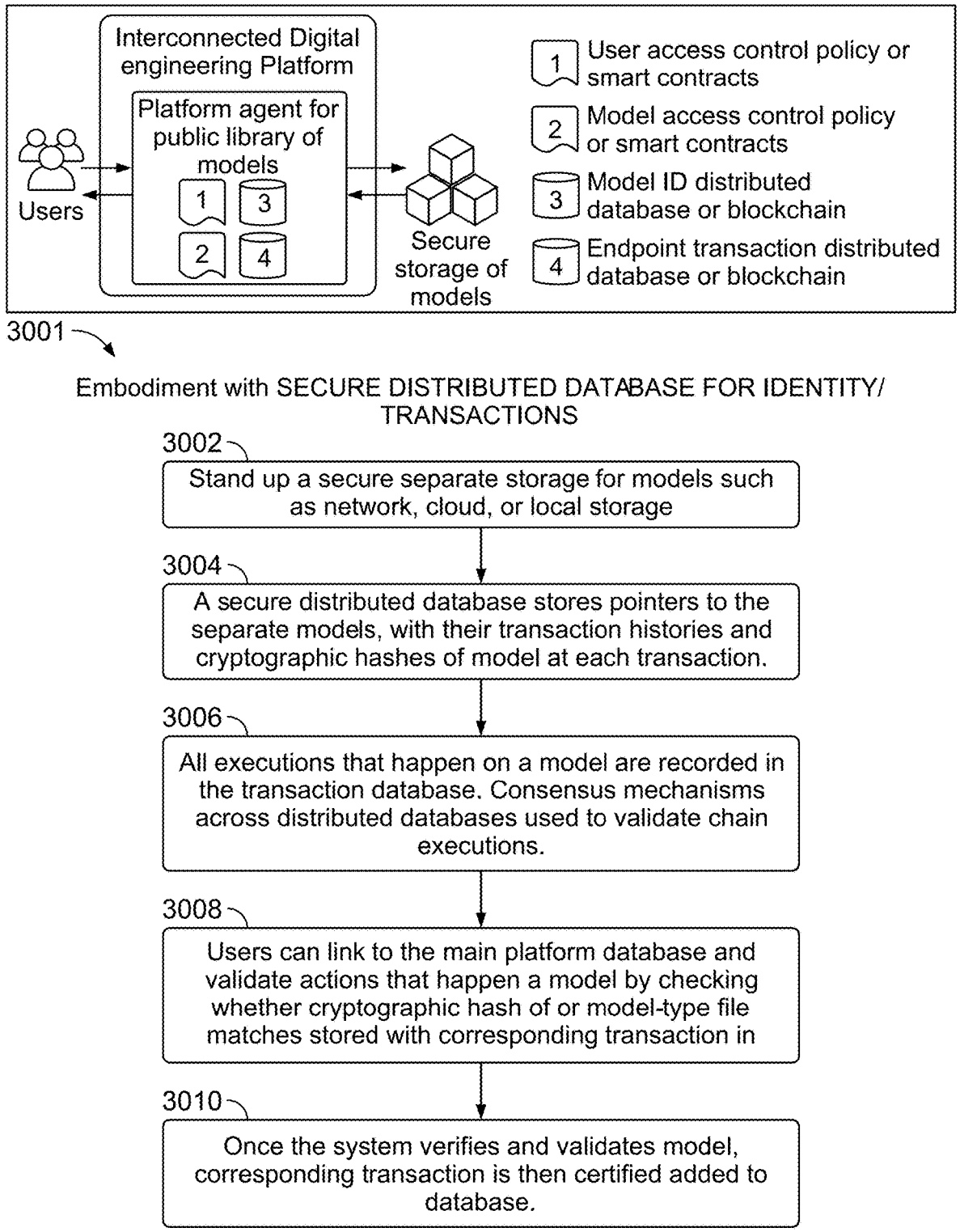
FIG. 30 is a diagram showing a flowchart for accessing models in a zero trust manner, where models are hosted in secure storage, not linked to any specific customer or user.

FIG. 30 illustrates various flowcharts 3001 and 3002 for digital engineering and certification actions using models in a zero trust manner. The models can be hosted in secure storage, isolated from any specific customer or user. The zero trust security implementation involves authentication, authorization, data security, and secure communication between the customer's computing environment and the model storage. To achieve zero trust, the policies for authentication can include a secure, tamper-proof record of the model ID and location, model authorizations based on an authentic and tamper-proof record of transactions, and model output validations using consensus mechanisms to validate the models in the absence of a ground truth. FIG. 30 illustrates two different processes for securing the digital models in a zero trust manner, flowchart 3001 and flowchart 3002. In the processes related to flowchart 3001, securing the digital models in the zero trust manner can be performed using secure databases that are centralized or distributed. In the processes related to flowchart 3002, securing the digital models in the zero trust manner can be performed using techniques related to blockchain technologies. The processes 3001 and 3002 can be performed by the interconnected digital engineering platform, for example.

In the process 3001, a secure separate storage for models is created (3002). The separate storage can be network storage, cloud storage, or local storage, to name a few examples. Moreover, a distributed database linked to the interconnected digital engineering platform can be created to store a series of pointers or memory addresses related to the models stored in the separate storage (3004). In some implementations, a designer of the system can create a secure database. The secure database can be connected to the interconnected digital platform.

In some implementations, the secure database can store data related to each model and actions performed on the model. Specifically, the secure database can store a pointer to each model, transaction history associated with each model, and one or more cryptographic hashes of address history associated with each model. The secure database can be accessed to identify a location for each model.

The interconnected digital engineering platform can track endpoint executions associated with a model (3006). Specifically, each transaction received by the interconnected digital engineering platform can be recorded in the transaction database. In this manner, each transaction can be reviewed at any point in time, such as by a model owner to view all transactions applied to a respective model. A consensus mechanism across the distributed databases can be used to validate the chain executions, such as on a blockchain. The consensus mechanisms may include PoS or PoR approaches, and ensure that all nodes in a network of open-access storage digital engineering models have the same view of the specific model's transactions, even in the presence of faulty or malicious nodes. The digital engineering tools in different nodes may perform similar verification or evaluation operations on the specific model and consensus across a range of nodes with different DE tools' evaluations is instead used to validate the chain executions.

In some implementations, users can link to or connect to the interconnected digital engineering platform via their end device (3008). The user can communicate with the interconnected digital engineering platform. In some cases, the user can communicate with the interconnected digital engineering platform to determine and validate actions that occurred against a respective model. Specifically, the user can communicate with the interconnected digital engineering platform by checking whether a file hash produced matches a result of similar transactions recorded on the database. For example, the cryptographic hash of the digital model or model-type file should match the hash stored in the endpoint transaction database, such as via a string compare, math compare, or other function, which is the cryptographic hash of the output of the corresponding transaction. If the hashes match the transactions performed on the respective model, then the user can ensure that the actions on the respective model are validated. Once the system verifies and validates a model, the corresponding transaction on that model is automatically certified and added to a transaction database (3010). This process ensures any transactions performed against a respective model are secured and authenticated.

In the process 3002, a secure off-chain storage for models is created (3012). The off-chain storage can be network storage, cloud storage, or local storage, to name a few examples. Moreover, a blockchain is created and linked to the interconnected digital engineering platform. The blockchain can be created to store a series of pointers or memory addresses related to the models stored in the off-chain storage. In some implementations, a designer of the system can create the blockchain.

A blockchain can include a list of records, which are called blocks, and which are linked. Each block contains a pointer as a link to a previous block. Multiple parties can record transactions in the blockchain or verify previous transactions of others. The blockchain is sometimes referred to as a ledger. For example, cryptocurrency transactions and other transactions for a period may be stored in a block that is then added to the tail of a previously created blockchain, thereby extending the blockchain. The blockchain can be held privately (e.g., in a centralized manner) or held publicly in a less than centralized manner.

In some implementations, the interconnected digital engineering platform can mint a non-fungible token, an NFT, representing a pointer to a digital model in a database. The model identity includes the model ID, its associated metadata and the address location for the model on a secure storage. These details about model identity are cryptographically hashed and added as entries to a block on a blockchain. Adding such a block is also called minting a token for the model identity. The token is non-fungible because the model identity will need to be unchanged.

In some implementations, the interconnected digital engineering platform can mint an NFT representing a pointer to the model in a database after a transaction execution (3014). When edits or modifications are made to a model, the endpoint metadata of the transactions are stored in the endpoint transaction database or minted as separate tokens that are linked to the source model's non-fungible identity token on the blockchain. For each model minted on its identity blockchain, there are associated transaction blockchains that confirm valid edit operations on the model and verifications or validations completed by the model. In order to add a new edit operation to the transaction blockchain, the system will verify against prior history of V&V. The digital engineering tools in different nodes may perform similar verification or evaluation operations on the specific model and consensus across a range of nodes with different DE tools' evaluations is instead used to validate the model's transactions.

For example, the interconnected digital platform mints an NFT by converting the model transaction into a crypto-transaction or a digital asset recorded on a blockchain. The crypto-transaction or the digital asset can be stored in a distributed ledger or decentralized database that cannot be edited, modified, or deleted, but only viewed. In this manner, any transaction executions performed on the model can be recorded in a block on the blockchain (3016). The interconnected digital engineering platform can utilize consensus mechanisms to validate transactions on the distributed database or block chain. The consensus mechanisms may include PoS or PoR approaches, and ensure that all nodes in a network of open-access storage digital engineering models have the same view of the specific model's transactions, even in the presence of faulty or malicious nodes. The digital engineering tools in different nodes may perform similar verification or evaluation operations on the specific model and consensus across a range of nodes with different DE tools' evaluations is instead used to validate the model's transactions.

In some implementations, customers can link to or connect to the interconnected digital engineering platform (3018). Specifically, the customers can link to the interconnected digital engineering platform to view recorded transactions on the blockchain. The customers can validate transactions for a model on the blockchain. The customer can validate the transactions by checking whether file hashes produced for the transactions match the result of similar transactions recorded on the blockchain. For example, the cryptographic hash of the digital model or model-type file should match the hash stored in the endpoint transaction database, which is the cryptographic hash of the output of the corresponding transaction. In some implementations, customers can monitor recorded transactions using their forked copy. Once the interconnected digital engineering platform verifies and validates a model, the interconnected digital engineering platform can automatically certify the transaction and mint a new NFT representing the model after the validated transaction occurred (3020). The NFT can be immutable and present a record of transactions to the models or models, which represent contributions a user has made to the model. It can also contain ancillary information about the model, such as performance or other related metrics.

In some implementations, any change or update to a model creates a copy of the NFT so the two versions can exist on their own in the interconnected digital engineering platform. In technical blockchain parlance, this is called sharding the NFT. More specifically, sharding the NFT means to split the NFT into multiple shared NFTs or multiple fractional NFTs (3022). In some implementations, the new shard may have different associated metrics due to the additional validated transactions. For example, if the updates to the model improve performance in some dimension, then metrics associated with the new model NFT shard can increase. If the new sharded NFT is unrelated, then this may not be related to the metrics. At this point, the gains are reassessed and validated.

The implementation of zero trust security can extend to access and collaboration with multiple models in a computing environment, as shown in FIG. 31, such as a digital engineering and certification ecosystem. Users 3102 can access the interconnected digital engineering platform 3104 through the UX/UI component 3106. The model and function wrappers 3108 can forward the request of the users 3102 to the customer's networking environment 3109, which may be behind a firewall. The agent 3110 can receive the request within the customer's networking environment 3109. In some implementations, the system 3100 can ensure secure execution of complex workflows where outputs from one function on a secured model 3112-1 can be used as inputs to another function on another secured model 3112-2, and so on. This process can occur within the customer environment 3109 and/or behind a customer firewall. In some cases, this process can occur across multiple customer environments. This process of cascading multiple models can facilitate collaboration between multiple stakeholders on complex projects with multiple models, and removes the dependency of a user interrupting the workflow to facilitate each step one at a time. The zero trust mechanism is applied consistently and modularly at each step to each model involved in the set of functions in the environment.

Model and function wrappers (shown in step 3108) can include implementations with similar components and similar functionality as in previous figures (such as FIG. 9). In some implementations, as in FIG. 32, the API Gateway 3107 is housed in the interconnected digital engineering platform 3104, while the rest of the components and functionality as in previous figures (such as FIG. 9) are housed within the customer environment 3109.

Figure 35:
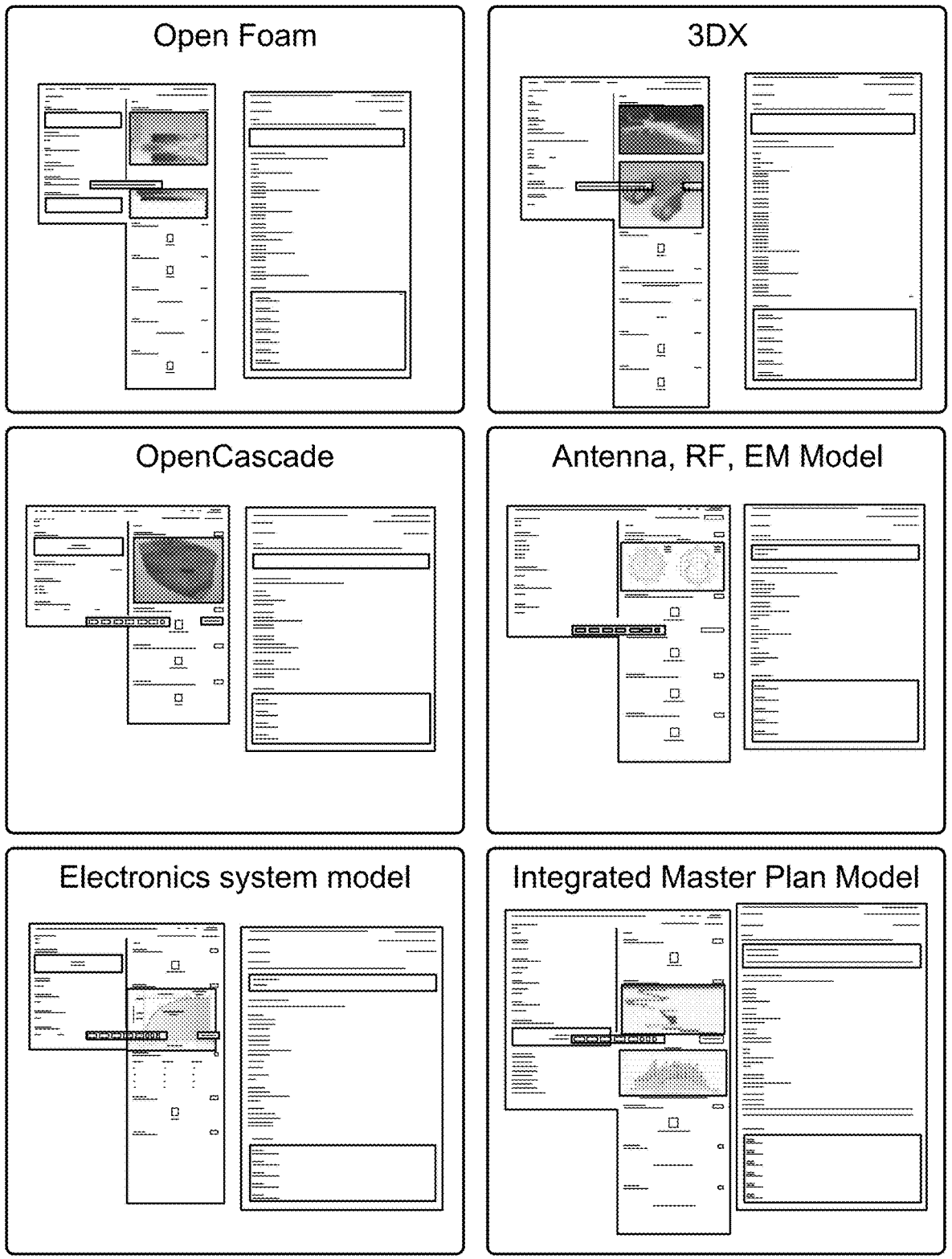
FIG. 35 shows examples of digital engineering models and model type files connected securely in the interconnected digital engineering platform.
Figure 35:
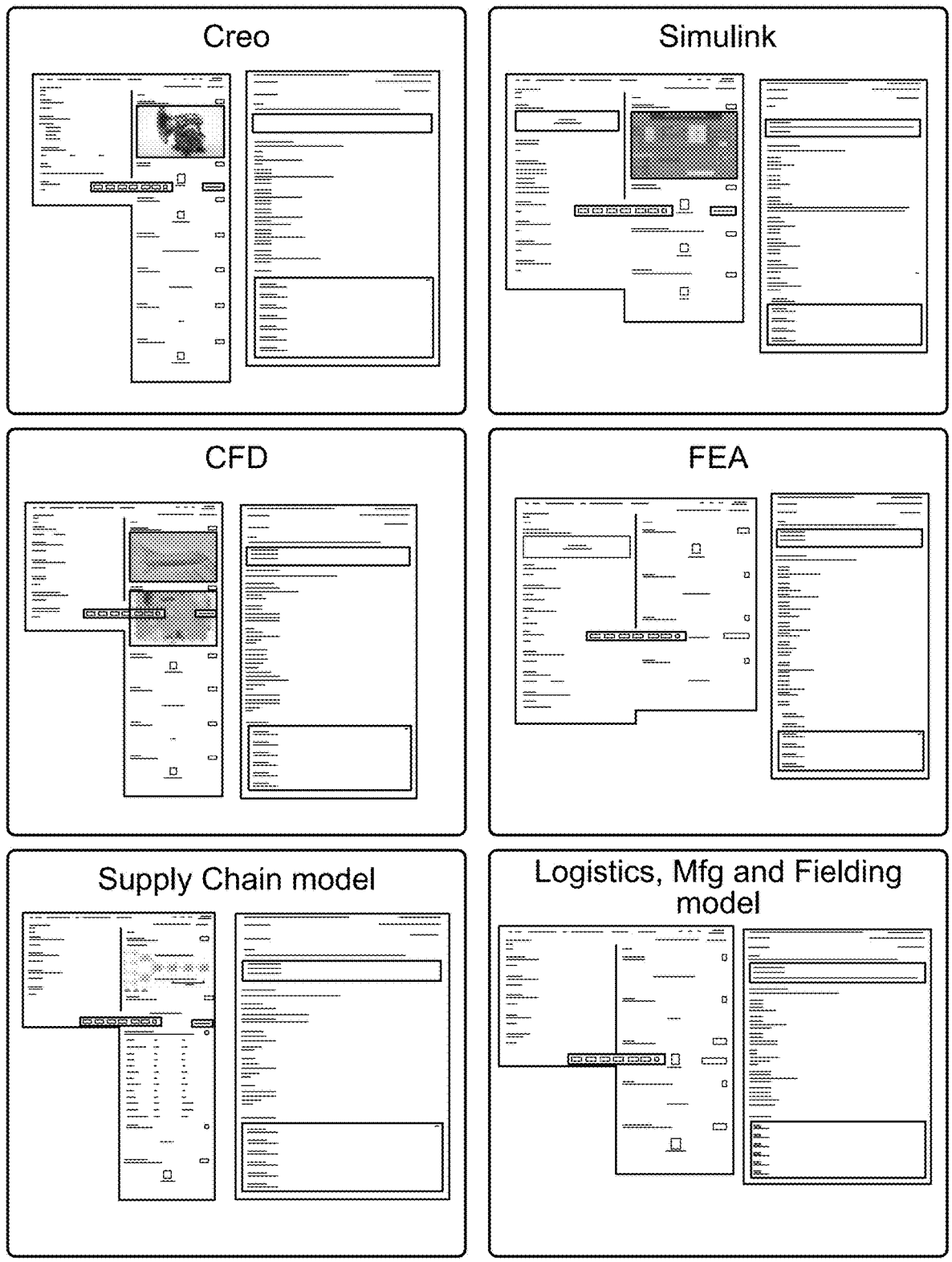

FIG. 34 shows a table of example model types and file extensions for steps of a data flow generated by a digital thread, that are handled by a secure interconnected digital engineering platform. Similarly, FIG. 35 shows examples of digital engineering models and model type files connected securely in the interconnected digital engineering platform. These example model types and file extensions may be stored and utilized in each of the aforementioned figures in a secure manner.

In some implementations, the digital engineering and certification ecosystem can detect that an unauthorized user, e.g., an unauthorized computing system, is attempting to access its computing system and responding to the attempt to prevent the unauthorized user from gaining access to the digital engineering and certification ecosystem. The digital engineering and certification ecosystem is configured to deploy countermeasures when the ecosystem detects communication with an unauthorized computing system. Typically, the ecosystem instead performs a simulation of operations of the ecosystem responsive to commands received from the unauthorized computing system. The ecosystem can send simulated parameters values to the unauthorized computing system. The ecosystem can monitor, characterize, and/or store (e.g., locally and/or in a cloud computing system) data representing behavior of the unauthorized computing system. In this way, data about the attempted cyberattack are stored and analyzed by the ecosystem or other authorized computing systems and the ecosystem operations are uninterrupted. The process for deploying countermeasures, performing simulations, monitoring, characterizing, and storing data representative of the unauthorized computing system, among others, when the ecosystem detects communication with an unauthorized computing system, is similarly described in U.S. patent application Ser. No. 17/903,730, the disclosure of which is hereby incorporated by reference in its entirety, with additional features and variation as described herein.

In some implementations, the digital engineering platform's security features include the use of machine learning models to assist in adversarial threat detection. Zero trust security for digital engineering models or digital models can involve authorizing individual user queries to their relevant digital models based on least privilege, for example. The digital engineering platform can store usage data, network traffic data, and access logs, and utilize this stored information to assist in the adversarial threat detection.

In some implementations, the interconnected digital engineering and certification platform can utilize machine learning (ML) based threat detection models to address security vulnerabilities. These ML based threat detection models can use a binary classification methodology to handle network traffic metadata, effectively categorizing network traffic into normal and potential threat instances. In some implementations, the ML based threat detection model can utilize other diverse classification models. These other models can include anomaly detection models, for example.

The input to the ML based threat detection models can include network traffic data captured directly from a service mesh integral to the digital engineering platform. The network traffic data can include, for example, volume, metadata, data rates, and timing related to communications between the digital engineering tool agents and the digital engineering platform, as well as transactions involving frontend users. The data can be input, for example, as network traffic values and other data types. However, any data that emanates from intermediaries bypassing the digital engineering platform or attributes to customer data storage can be excluded from the model's purview. Committed to safeguarding privacy and maintaining impeccable security standards, the model ensures that sensitive metadata is either encrypted beyond decipherability or entirely omitted.

In some implementations, the output from the ML based threat detection models can include binary classifications. These models can produce binary classifications that demarcate either normal or threat level classification. In some implementations, the output from the ML based threat detection models can include values that range in severity from normal level classification to threat level classifications. The digital engineering platform can compare the output value to a threshold value. If the output value satisfies the threshold value, then the digital engineering platform can deem that a threat is detected.

Moreover, the ML based threat detection models can further compartmentalize the threat class into specific types of threats. This added segmentation comes with the caveat of potentially reduced accuracy due to the complexity involved in detailed threat categorization. The specific types of threats can include, for example, low risk, elevated risk, or high risk. Each of these types of threats can also correlate to different actions that the digital engineering platform can take to address the identified threat.

To hone the model's predictive prowess, the digital engineering platform can generate training datasets to further train and enhance the ML based threat detection models' capabilities. The training datasets can be supplemented with synthetic attack data or other comprehensive databases, such as CIDDS-001 or UNSW-NB15. These data types enable the digital engineering platform to effectively broaden the spectrum of identifiable features and optimize the model's threat detection capabilities. Moreover, the training data can include metadata of tokensized sensitive customer data to improve the ML based threat detection model's detection capability. The digital engineering platform can train the ML based threat detection model and further improve the accuracy of these models based on user feedback.

In some implementations, the ML based threat detection model can operate by collecting and analyzing network traffic metadata from the digital engineering platform's cloud network. For example, the digital engineering platform can craft unique classifiers and detectors leveraging the aforementioned input characteristics. Simultaneously or substantially simultaneously, the ML based threat detection model can cater to advanced operation modes, conducting in-depth analyses of the latent space or utilizing the output as input for subsequent ML based threat detection models. This dexterity enhances the models' flexibility, usability, and security quotient. Moreover, the ML models on the platform can themselves be subject to rigorous testing consistent with industry standards.

Figure 33:
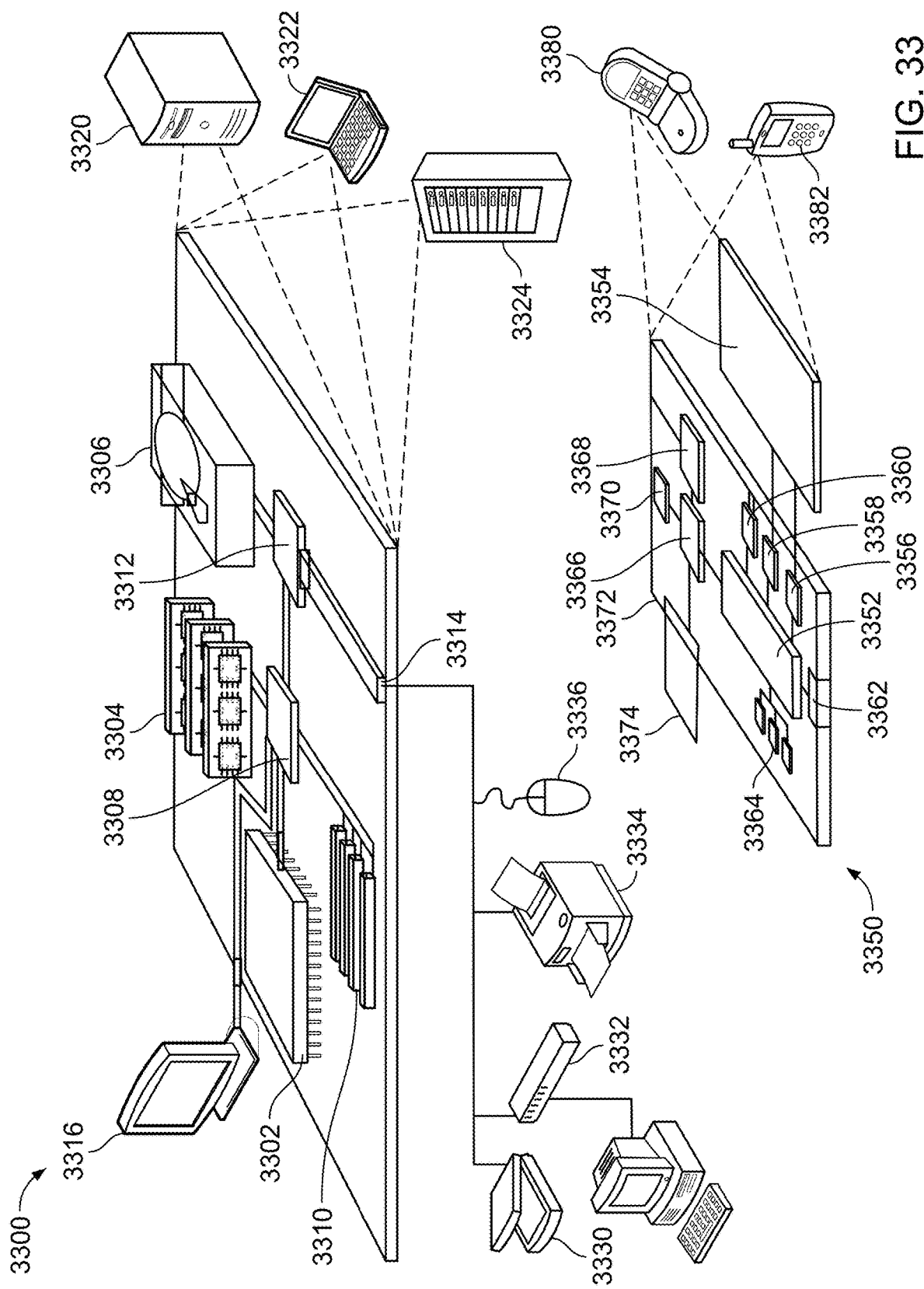
FIG. 33 is a diagram illustrating an example of a computing environment.

FIG. 33 shows an example of a computing device 3300 and a mobile computing device 3350 that are employed to execute implementations of the present disclosure. The computing device 3300 is intended to represent various forms of digital computers, such as laptops, desktops, workstations, personal digital assistants, servers, blade servers, mainframes, and other appropriate computers. The mobile computing device 3350 is intended to represent various forms of mobile devices, such as personal digital assistants, cellular telephones, smart-phones, AR devices, and other similar computing devices. The components shown here, their connections and relationships, and their functions, are meant to be examples only, and are not meant to be limiting. The computing device 3300 and/or the mobile computing device 3350 can form at least a portion of the user device 106A or API 106B and the computing system 108 described above. As described previously, in some implementations, the computing system 108 can be a distributed computing system that includes multiple computing devices such as the computing device 3300 and/or the mobile computing device 3350. In other implementations the computing system 108 can comprise a single computing device. In some implementations, the API 106B can be implemented on the computing device 3300 and/or the mobile computing device 3350 to relay a digital computer file to a non-human, artificial user 104B (e.g., an artificial intelligence and/or an algorithmic user), which may itself be implemented on the computing device 3300 and/or the mobile computing device 3350 (or on a separate instance of the computing device 3300 and/or the mobile computing device 3350).

The computing device 3300 includes a processor 3302, a memory 3304, a storage device 3306, a high-speed interface 3308, and a low-speed interface 3312. In some implementations, the high-speed interface 3308 connects to the memory 3304 and multiple high-speed expansion ports 3310. In some implementations, the low-speed interface 3312 connects to a low-speed expansion port 3314 and the storage device 3306. Each of the processor 3302, the memory 3304, the storage device 3306, the high-speed interface 3308, the high-speed expansion ports 3310, and the low-speed interface 3312, are interconnected using various buses, and may be mounted on a common motherboard or in other manners as appropriate. The processor 3302 can process instructions for execution within the computing device 3300, including instructions stored in the memory 3304 and/or on the storage device 3306 to display graphical information for a graphical user interface (GUI) on an external input/output device, such as a display 3316 coupled to the high-speed interface 3308. In other implementations, multiple processors and/or multiple buses may be used, as appropriate, along with multiple memories and types of memory. In addition, multiple computing devices may be connected, with each device providing portions of the necessary operations (e.g., as a server bank, a group of blade servers, or a multi-processor system).

The memory 3304 stores information within the computing device 3300. In some implementations, the memory 3304 is a volatile memory unit or units. In some implementations, the memory 3304 is a non-volatile memory unit or units. The memory 3304 may also be another form of a computer-readable medium, such as a magnetic or optical disk.

The storage device 3306 is capable of providing mass storage for the computing device 3300. In some implementations, the storage device 3306 may be or include a computer-readable medium, such as a floppy disk device, a hard disk device, an optical disk device, a tape device, a flash memory, or other similar solid-state memory device, or an array of devices including devices in a storage area network or other configurations. Instructions can be stored in an information carrier. The instructions, when executed by one or more processing devices, such as processor 3302, perform one or more methods, such as those described above. The instructions can also be stored by one or more storage devices, such as computer-readable or machine-readable mediums, such as the memory 3304, the storage device 3306, or memory on the processor 3302.

The high-speed interface 3308 manages bandwidth-intensive operations for the computing device 3300, while the low-speed interface 3312 manages lower bandwidth-intensive operations. Such allocation of functions is an example only. In some implementations, the high-speed interface 3308 is coupled to the memory 3304, the display 3316 (e.g., through a graphics processor or accelerator), and the high-speed expansion ports 3310, which may accept various expansion cards. In the implementation, the low-speed interface 3312 is coupled to the storage device 3306 and the low-speed expansion port 3314. The low-speed expansion port 3314, which may include various communication ports (e.g., Universal Serial Bus (USB), Bluetooth, Ethernet, wireless Ethernet) may be coupled to one or more input/output devices. Such input/output devices may include a scanner 3330, a printing device 3334, or a keyboard or mouse 3336. The input/output devices may also be coupled to the low-speed expansion port 3314 through a network adapter 3332. Such network input/output devices may include, for example, a switch or router.

The computing device 3300 may be implemented in a number of different forms, as shown in FIG. 33. For example, it may be implemented as a standard server 3320, or multiple times in a group of such servers. In addition, it may be implemented in a personal computer such as a laptop computer 3322. It may also be implemented as part of a rack server system 3324, high performance computing enclave, or quantum and/or non-silicon based computing system. Alternatively, components from the computing device 3300 may be combined with other components in a mobile device, such as a mobile computing device 3350. Each of such devices may contain one or more of the computing device 3300 and the mobile computing device 3350, and an entire system may be made up of multiple computing devices communicating with each other.

The mobile computing device 3350 includes a processor 3352; a memory 3364; an input/output device, such as a display 3354; a communication interface 3366; and a transceiver 3368; among other components. The mobile computing device 3350 may also be provided with a storage device, such as a micro-drive or other device, to provide additional storage. Each of the processor 3352, the memory 3364, the display 3354, the communication interface 3366, and the transceiver 3368, are interconnected using various buses, and several of the components may be mounted on a common motherboard or in other manners as appropriate. In some implementations, the mobile computing device 3350 may include a camera device(s).

The processor 3352 can execute instructions within the mobile computing device 3350, including instructions stored in the memory 3364. The processor 3352 may be implemented as a chipset of chips that include separate and multiple analog and digital processors. For example, the processor 3352 may be a Complex Instruction Set Computers (CISC) processor, a Reduced Instruction Set Computer (RISC) processor, or a Minimal Instruction Set Computer (MISC) processor. The processor 3352 may provide, for example, for coordination of the other components of the mobile computing device 3350, such as control of user interfaces (UIs), applications run by the mobile computing device 3350, and/or wireless communication by the mobile computing device 3350.

The processor 3352 may communicate with a user through a control interface 3358 and a display interface 3356 coupled to the display 3354. The display 3354 may be, for example, a Thin-Film-Transistor Liquid Crystal Display (TFT LCD) display, an Organic Light Emitting Diode (OLED) display, or other appropriate display technology. The display interface 3356 may include appropriate circuitry for driving the display 3354 to present graphical and other information to a user. The control interface 3358 may receive commands from a user and convert them for submission to the processor 3352. In addition, an external interface 3362 may provide communication with the processor 3352, so as to enable near area communication of the mobile computing device 3350 with other devices. The external interface 3362 may provide, for example, for wired communication in some implementations, or for wireless communication in other implementations, and multiple interfaces may also be used.

The memory 3364 stores information within the mobile computing device 3350. The memory 3364 can be implemented as one or more of a computer-readable medium or media, a volatile memory unit or units, or a non-volatile memory unit or units. An expansion memory 3374 may also be provided and connected to the mobile computing device 3350 through an expansion interface 3372, which may include, for example, a Single in Line Memory Module (SIMM) card interface. The expansion memory 3374 may provide extra storage space for the mobile computing device 3350, or may also store applications or other information for the mobile computing device 3350. Specifically, the expansion memory 3374 may include instructions to carry out or supplement the processes described above, and may also include secure information. Thus, for example, the expansion memory 3374 may be provided as a security module for the mobile computing device 3350, and may be programmed with instructions that permit secure use of the mobile computing device 3350. In addition, secure applications may be provided via the SIMM cards, along with additional information, such as placing identifying information on the SIMM card in a non-hackable manner.

The memory may include, for example, flash memory, and/or non-volatile random access memory (NVRAM), as discussed below. In some implementations, instructions are stored in an information carrier. The instructions, when executed by one or more processing devices, such as processor 3352, perform one or more methods, such as those described above. The instructions can also be stored by one or more storage devices, such as one or more computer-readable or machine-readable mediums, such as the memory 3364, the expansion memory 3374, or memory on the processor 3352. In some implementations, the instructions can be received in a propagated signal, such as over the transceiver 3368 or the external interface 3362.

The mobile computing device 3350 may communicate wirelessly through the communication interface 3366, which may include digital signal processing circuitry where necessary. The communication interface 3366 may provide for communications under various modes or protocols, such as Global System for Mobile (GSM) communications voice calls, Short Message Service (SMS), Enhanced Messaging Service (EMS), Multimedia Messaging Service (MMS) messaging, code division multiple access (CDMA), time division multiple access (TDMA), Personal Digital Cellular (PDC), Wideband Code Division Multiple Access (WCDMA), CDMA2000, or General Packet Radio Service (GPRS). Such communication may occur, for example, through the transceiver 3368 using a radio frequency. In addition, short-range communication, such as using Bluetooth or Wi-Fi, may occur. In addition, a Global Positioning System (GPS) receiver module 3370 may provide additional navigation- and location-related wireless data to the mobile computing device 3350, which may be used as appropriate by applications running on the mobile computing device 3350.

The mobile computing device 3350 may also communicate audibly using an audio codec 3360, which may receive spoken information from a user and convert it to usable digital information. The audio codec 3360 may likewise generate audible sound for a user, such as through a speaker (e.g., in a handset of the mobile computing device 3350). Such sound may include sound from voice telephone calls, may include recorded sound (e.g., voice messages, music files, etc.), and may also include sound generated by applications operating on the mobile computing device 3350.

The mobile computing device 3350 may be implemented in a number of different forms, as shown in FIG. 33. For example, it may be implemented as a phone device 3380, a personal digital assistant 3382, and/or a tablet device (not shown). The mobile computing device 3350 may also be implemented as a component of a smart-phone, AR device, or other similar mobile device.

Computing device 3300 and/or 3350 can also include USB flash drives. The USB flash drives may store operating systems and other applications. The USB flash drives can include input/output components, such as a wireless transmitter or USB connector that may be inserted into a USB port of another computing device.

Figure 36:
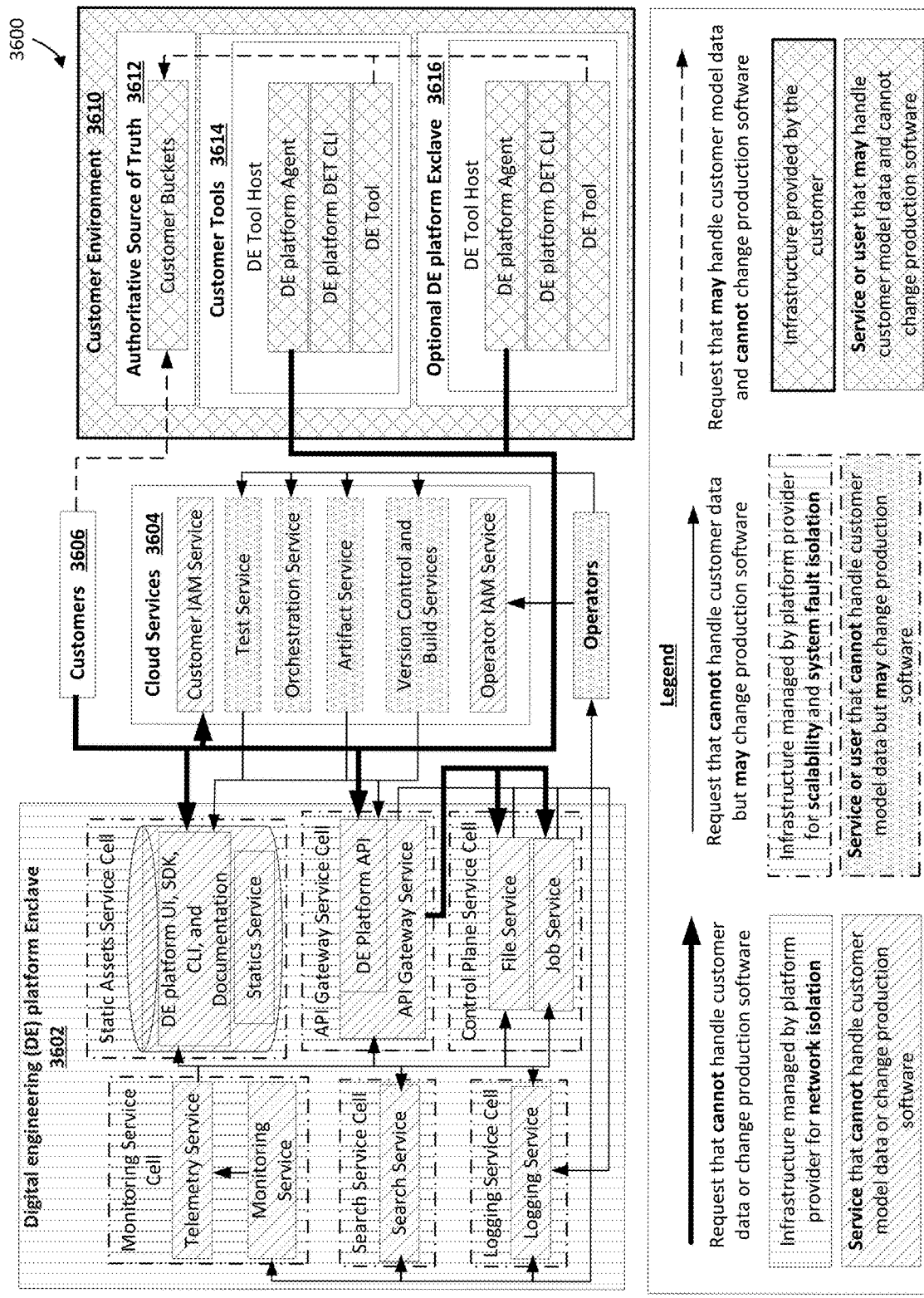
FIG. 36 is a diagram showing an example architecture for an interconnected digital engineering and certification ecosystem.

FIG. 36 is an example architecture for a digital engineering (DE) platform 3600 (such as the interconnected digital engineering and certification ecosystem 100) is shown. The example architecture for the digital engineering platform 3600 is designed in accordance with zero trust security principles and is further designed to support scalability as well as robust and resilient operations.

In one embodiment, the architecture of the digital engineering platform 3600 includes multiple components: a digital engineering (DE) platform enclave 3602, cloud services 3604, and a customer environment 3610. The customer environment 3610 optionally includes a DE platform exclave 3616.

The DE platform enclave 3602 can serve as a starting point for the services rendered by the platform 3600. The enclave 3602 can be visualized as the central command hub responsible for the management and functioning of the operations. For example, the enclave 3602 can be implemented using the computer system 108 of the interconnected digital engineering and certification ecosystem 100 described above. The DE platform enclave 3602 serves as the centralized command and control hub responsible for orchestrating and managing all platform operations. It is designed to integrate both zero-trust security models and hyperscale capabilities, resulting in a secure and scalable processing environment tailored to individual customer needs. Zero-trust security features include, but are not limited to, strict access control, algorithmic impartiality, and data isolation. The enclave 3602 also supports a machine learning engine (e.g., the machine learning engine 120) for real-time analytics, auto-scaling features for workload adaptability, and API-based interoperability with third-party services. Security and resource optimization are enhanced through multi-tenancy support, role-based access control, and data encryption both at rest and in transit. The digital engineering platform enclave 3602 can also include one or more of the features described below.

First, the digital engineering platform enclave 3602 can be designed in accordance with zero-trust security principles. In particular, the DE platform enclave 3602 employs zero-trust principles to ensure that no implicit trust is assumed between any elements, such as digital models, platform agents or individual users (e.g., users 104A, 104B) or their actions, within the system. The model is further strengthened through strict access control mechanisms, limiting even the administrative team (e.g., a team of individuals associated with the platform provider) to predetermined, restricted access to enclave resources. To augment this robust security stance, data encryption is applied both at rest and in transit, effectively mitigating risks of unauthorized access and data breaches.

The DE platform enclave 3602 can also be designed to maintain isolation and independence. A key aspect of the enclave's architecture is its focus on impartiality and isolation. The enclave 3602 disallows cryptographic dependencies from external enclaves and enforces strong isolation policies. The enclave's design also allows for both single-tenant and multi-tenant configurations, further strengthening data and process isolation between customers 3606 (e.g., users 104A, 104B). Additionally, the enclave 3602 is designed with decoupled resource sets, minimizing interdependencies and thereby promoting system efficiency and autonomy.

The DE platform enclave 3602 can further be designed for scalability and adaptability. The enclave 3602 is engineered to be both scalable and adaptable, aligning well with varying operational requirements. For example, the enclave 3602 can incorporate hyperscale-like properties in conjunction with zero-trust principles to enable scalable growth and handle high-performance workloads effectively.

The DE platform enclave 3602 can further be designed for workflow adaptability, accommodated through strict access control mechanisms. The DE platform enclave 3602 is designed to accommodate varying customer workflows and DE models through its strict access control mechanisms. This configurability allows for a modular approach to integrating different functionalities, ranging from data ingestion to algorithm execution, without compromising on the zero-trust security posture. The platform 3600's adaptability makes the platform 3600 highly versatile for a multitude of use-cases, while ensuring consistent performance and robust security.

The DE platform enclave 3602 can further be designed to enable analytics for robust platform operations. At the core of the enclave's operational efficiency is a machine learning engine (e.g., machine learning engine 120) capable of performing real-time analytics. This enhances decision-making and operational efficiency across the platform 3600. Auto-scaling mechanisms can also be included to enable dynamic resource allocation based on workload demand, further adding to the platform's responsiveness and efficiency.

In an example implementation, the DE platform enclave 3602 can include several components as shown in FIG. 36 and as described in further detail herein.

In the embodiment of the DE platform enclave 3602 shown in FIG. 36, the DE platform enclave 3602 includes a "Monitoring Service" and a "Telemetry Service" as part of a "Monitoring Service Cell." These components focus on maintaining, tracking and analyzing the performance of the platform 3600 to ensure optimal service delivery, including advanced machine learning capabilities for real-time analytics.

In the embodiment of the DE platform enclave 3602 shown in FIG. 36, the DE platform enclave 3602 also includes a "Static Assets Service Cell," which houses the user interface, SDKs, command line interface (CLI), and documentation for the platform 3600.

In the embodiment of the DE platform enclave 3602 shown in FIG. 36, the DE platform enclave 3602 further includes an "API Gateway Service Cell," which includes the DE platform API(s) (e.g., APIs 114, 116) and acts as a mediator for requests between the client applications (e.g., the digital engineering tools 102, the repository of common V&V products 110, etc.) and the platform services.

In the embodiment of the DE platform enclave 3602 shown in FIG. 36, the DE platform enclave 3602 further includes a "Search Service Cell." This component aids in the efficient retrieval of information from the DE platform 3600, adding to its overall functionality.

In the embodiment of the DE platform enclave 3602 shown in FIG. 36, the DE platform enclave 3602 further includes a "Logging Service Cell" and a "Control Plane Service Cell." These components are instrumental in recording and managing operational events and information flow within the platform 3600.

As shown in FIG. 36, the architecture of the digital engineering platform 3600 also includes cloud services 3604 that include services that cannot interact with customer data but can modify the software for the orchestration of digital engineering platform operations. In example implementations, several cloud resources provide support and foundational services to the platform. For example, in the embodiment of the DE platform 3600 shown in FIG. 36, the cloud services 3604 include a "Customer IAM Service," where "IAM" stands for "Identity and Access Management." The Identity and Access Management Service ensures secure and controlled access to the platform 3600.

In the embodiment of the DE platform 3600 shown in FIG. 36, the cloud services 3604 also include a "Test Service," which involves testing tools to validate platform operations.

In the embodiment of the DE platform 3600 shown in FIG. 36, the cloud services 3604 also include an "Orchestration Service," which controls and manages the lifecycle of containers on the platform 3600.

In the embodiment of the DE platform 3600 shown in FIG. 36, the cloud services 3604 also include an "Artifact Service" and "Version Control and Build Services." These cloud services are crucial in maintaining the evolution of projects, codes, and instances in the system, while also managing artifacts produced during the product development process.

As shown in FIG. 36, the architecture of the digital engineering platform 3600 also includes a customer environment 3610 with an "Authoritative Source of Truth" 3612, customer tools 3614, and an optional DE platform exclave 3616. The customer environment 3610 is the site where customer data resides and is processed in a zero trust manner by the digital engineering platform 3600. As described previously, the DE platform enclave 3602, in focusing on both zero trust principles and hyperscale-like properties, provides a robust and scalable environment for the secure processing of significant workloads, according to the customer's unique needs. In some examples, a DE platform exclave 3616, is situated within the customer environment 810 in order to assist the customer(s) 3606 with their digital engineering tasks and operations.

When a customer 3606 (e.g., user 104A, 104B) intends to perform a digital engineering task using the digital engineering platform 3600 (e.g., interconnected digital engineering and certification ecosystem 100), typical operations include secure data ingestion and controlled data retrieval. Derivative data generated through the digital engineering operations, such as updated digital model files or revisions to digital model parameters, are stored only within the customer environment 3610, and the digital engineering platform 3600 may provide tools to access the metadata of the derivative data. Example implementations may include secure data ingestion, which utilizes zero-trust principles to ensure customer data is securely uploaded to the customer environment 3610 through a pre-validated secure tunnel, such as Secure Socket Layer (SSL) tunnel. This can enable direct and secure file transfer to a designated cloud storage, such as an S3 bucket, within the customer environment 3610. Example implementations may also include controlled data retrieval, in which temporary, pre-authenticated URLs generated via secure token-based mechanisms are used for controlled data access, thereby minimizing the risk of unauthorized interactions. Example implementations may also include immutable derivative data, with transformed data generated through operations like data extraction being securely stored within the customer environment 3610 while adhering to zero-trust security protocols. Example implementations may also include tokenization utility, in which a specialized Digital Engineering (DE) platform tool referred to as a "tokenizer" is deployed within the customer environment 3610 for secure management of derivative metadata, conforming to zero-trust guidelines.

The customer environment 3610 interacts with other elements of the secure digital engineering (DE) platform 3600 and includes multiple features that handle data storage and secure interactions with the platform 3600. For example, one element of the customer environment 3610 is the "Authoritative Source of Truth" 3612, which is a principal repository for customer data, ensuring data integrity and accuracy. Nested within this are the "Customer Buckets" where data is securely stored with strict access controls, limiting data access to authorized users or processes through pre-authenticated URL links. This setup ensures uncompromising data security within the customer environment 3610 while providing smooth interaction with other elements of the DE platform 3600.

The customer environment 3610 also includes additional software tools (e.g., customer tools 3614) that can be utilized based on specific customer requirements. For example, the "DE Tool Host" is a component that handles the necessary data engineering applications for working with customer data. It includes the DET CLI (Data Engineering Tools Command-Line Interface), enabling user-friendly command-line operation of DE tools (e.g., the digital engineering tools 102). The "DE platform Agent" ensures smooth communication and management between the customer environment 3610 and elements of the DE platform 3600. Furthermore, there can be another set of optional DE tools designed to assist customer-specific data engineering workflows.

In some cases, an optional feature known as a "DE Platform Exclave" 3616 can be employed within the customer environment 3610 for enhanced security. The Exclave 3616 operates within the customer's network, supervising data processing, and rigorously adhering to zero trust principles while delivering hyperscale-like platform performance. The Exclave 3616 contains a "DE Tool Host" that runs the DE tools and the agent necessary for operation.

Other embodiments and applications not specifically described herein are also within the scope of the following claims. Elements of different implementations described herein may be combined to form other embodiments.

What is claimed is:

1. A computer-implemented method comprising:
receiving, from a user device and by a digital platform, a request to interact with a digital model;
determining whether a user operating the user device is authorized to access the digital platform;
in response to determining that the user is authorized to access the digital platform, generating a token that provides the user with access to the digital platform;
determining whether the request includes malicious activity;
in response to determining that the request is absent of the malicious activity, executing, using data from the request and the generated token enabling the user access to the digital platform, a digital thread that executes one or more operations using one or more digital tools and the digital model, wherein executing the digital thread comprises executing, across a multi-cellular environment, the one or more operations using the one or more digital tools on the digital model, each cell of the multi-cellular environment executing one or more of the one or more operations upon the digital model; and
providing data indicative of the one or more operations executing the digital thread to the user device for presenting on a user interface of the user device.

2. The computer-implemented method of claim 1, wherein determining whether the request includes malicious activity comprises analyzing, using a permissions model, the request to detect a presence of the malicious activity.

3. The computer-implemented method of claim 2, further comprising:
in response to determining that the request includes the malicious activity, preventing, by the permissions model, the request from accessing the digital platform; or in response to determining that the request does not include the malicious activity, permitting, by the permissions model, the request to access the digital platform.

4. The computer-implemented method of claim 1, wherein executing, using the data extracted from the request and the generated token enabling access to the digital platform, the digital thread that executes the one or more operations using the one or more digital tools and the digital model comprises: authenticating and authorizing, the request using the generated token; in response to authenticating the request using the generated token, extracting data from the request by a service mesh, wherein the extracted data comprises the one or more operations to be performed using the one or more digital tools upon the digital model; creating the digital thread using the extracted data from the request; and executing the digital thread upon the digital model.

5. The computer-implemented method of claim 1, wherein executing, across the multi-cellular environment, the digital thread that executes the one or more operations using the one or more digital tools and the digital thread comprises: executing, by a first cell, a first operation of the one or more operations on the digital model; encrypting, by the first cell, a result of performing the first operation; providing, by the first cell, the encrypted result to a second cell; decrypting, by the second cell, the encrypted result; and executing, by the second cell, a second operation of the one or more operations on the digital model based on the decrypted results.

6. The computer-implemented method of claim 1, wherein each cell of the multi-cellular environment comprises: one or more microservices and APIs for performing one or more operations on one or more digital models, and a splicer that enables each cell of the multi-cellular environment to communicate with one or more other cells.

7. The computer-implemented method of claim 1, further comprising generating audit data that tracks movement of the request across each cell in the multi-cellular environment for executing the one or more operations.

8. The computer-implemented method of claim 1, further comprising: monitoring an amount of network data transmitted between each cell in the multi-cellular environment; and throttling the amount of network data transmitted between each cell when the amount of network data satisfies a threshold value.

9. The computer-implemented method of claim 1, further comprising: storing, by the digital platform, one or more digital engineering tools in a tools database, the one or more digital engineering tools comprise model-based systems engineering (MBSE) tools, augmented reality (AR) tools, computer aided design (CAD) tools, computational fluid dynamics (CFD) tools, finite element analysis (FEA) tools, electronic design automation (EDA) tools, data analytics tools, modeling and simulation (M&S) tools, product lifecycle management (PLM) tools; and storing one or more digital engineering models, the one or more digital engineering models comprise simulation engines, requirements models, electronics models, test-plan models, cost-models, schedule models, software modeling, supply-chain models, manufacturing models, cyber security models, multi-attribute trade-space tools, and mission effects models.

10. A system comprising: one or more computers and one or more storage devices storing instructions that are operable, when executed by the one or more computers, to cause the one or more computers to perform operations comprising: receiving, from a user device and by a digital platform, a request to interact with a digital model; determining whether a user operating the user device is authorized to access the digital platform; in response to determining that the user is authorized to access the digital platform, generating a token that provides the user with access to the digital platform; determining whether the request includes malicious activity; in response to determining that the request is absent of the malicious activity, executing, using data from the request and the generated token enabling the user access to the digital platform, a digital thread that executes one or more operations using one or more digital tools and the digital model, wherein executing the digital thread comprises executing, across a multi-cellular environment, the one or more operations using the one or more digital tools on the digital model, each cell of the multi-cellular environment executing one or more of the one or more operations upon the digital model; and providing data indicative of the one or more operations executing the digital thread to the user device for presenting on a user interface of the user device.

11. The system of claim 10, wherein determining whether the request includes malicious activity comprises analyzing, using a permissions model, the request to detect a presence of the malicious activity.

12. The system of claim 11, further comprising: in response to determining that the request includes the malicious activity, preventing, by the permissions model, the request from accessing the digital platform; or in response to determining that the request does not include the malicious activity, permitting, by the permissions model, the request to access the digital platform.

13. The system of claim 10, wherein executing, using the data extracted from the request and the generated token enabling access to the digital platform, the digital thread that executes the one or more operations using the one or more digital tools and the digital model comprises: authenticating and authorizing, the request using the generated token; in response to authenticating the request using the generated token, extracting data from the request by a service mesh, wherein the extracted data comprises the one or more operations to be performed using the one or more digital tools upon the digital model; creating the digital thread using the extracted data from the request; and executing the digital thread upon the digital model.

14. The system of claim 10, wherein executing, across the multi-cellular environment, the digital thread that executes the one or more operations using the one or more digital tools and the digital thread comprises: executing, by a first cell, a first operation of the one or more operations on the digital model; encrypting, by the first cell, a result of performing the first operation; providing, by the first cell, the encrypted result to a second cell; decrypting, by the second cell, the encrypted result; and executing, by the second cell, a second operation of the one or more operations on the digital model based on the decrypted results.

15. The system of claim 10, wherein each cell of the multi-cellular environment comprises: one or more microservices and APIs for performing one or more operations on one or more digital models, and a splicer that enables each cell of the multi-cellular environment to communicate with one or more other cells.

16. The system of claim 10, further comprising generating audit data that tracks movement of the request across each cell in the multi-cellular environment for executing the one or more operations.

17. The system of claim 10, further comprising: monitoring an amount of network data transmitted between each cell in the multi-cellular environment; and throttling the amount of network data transmitted between each cell when the amount of network data satisfies a threshold value.

18. The system of claim 10, further comprising: storing, by the digital platform, one or more digital engineering tools in a tools database, the one or more digital engineering tools comprise model-based systems engineering (MBSE) tools, augmented reality (AR) tools, computer aided design (CAD) tools, computational fluid dynamics (CFD) tools, finite element analysis (FEA) tools, electronic design automation (EDA) tools, data analytics tools, modeling and simulation (M&S) tools, product lifecycle management (PLM) tools; and storing one or more digital engineering models, the one or more digital engineering models comprise simulation engines, requirements models, electronics models, test-plan models, cost-models, schedule models, software modeling, supply-chain models, manufacturing models, cyber security models, multi-attribute trade-space tools, and mission effects models.

19. One or more non-transitory computer-readable media storing software comprising instructions that are operable, when executed by one or more computers, to cause the one or more computers to perform operations comprising: receiving, from a user device and by a digital platform, a request to interact with a digital model; determining whether a user operating the user device is authorized to access the digital platform; in response to determining the user is authorized to access the digital platform, generating a token that provides the user with access to the digital platform; determining whether the request includes malicious activity; in response to determining that the request is absent of the malicious activity, executing, using data from the request and the generated token enabling the user access to the digital platform, a digital thread that executes one or more operations using one or more digital tools and the digital model, wherein executing the digital thread comprises executing, across a multi-cellular environment, the one or more operations using the one or more digital tools on the digital model, each cell of the multi-cellular environment executing one or more of the one or more operations upon the digital model; and providing data indicative of the one or more operations executing the digital thread to the user device for presenting on a user interface of the user device.

20. The one or more non-transitory computer-readable media of claim 19, wherein determining whether the request includes malicious activity comprises analyzing, using a permissions model, the request to detect a presence of the malicious activity.

21. The one or more non-transitory computer-readable media of claim 20, further comprising: in response to determining that the request includes the malicious activity, preventing, by the permissions model, the request from accessing the digital platform; or in response to determining that the request does not include the malicious activity, permitting, by the permissions model, the request to access the digital platform.

22. The one or more non-transitory computer-readable media of claim 19, wherein executing, using the data extracted from the request and the generated token enabling access to the digital platform, the digital thread that executes the one or more operations using the one or more digital tools and the digital model comprises: authenticating and authorizing, the request using the generated token; in response to authenticating the request using the generated token, extracting data from the request by a service mesh, wherein the extracted data comprises the one or more operations to be performed using the one or more digital tools upon the digital model; creating the digital thread using the extracted data from the request; and executing the digital thread upon the digital model.

23. The one or more non-transitory computer-readable media of claim 19, wherein executing, across the multi-cellular environment, the digital thread that executes the one or more operations using the one or more digital tools and the digital thread comprises: executing, by a first cell, a first operation of the one or more operations on the digital model; encrypting, by the first cell, a result of performing the first operation; providing, by the first cell, the encrypted result to a second cell; decrypting, by the second cell, the encrypted result; and executing, by the second cell, a second operation of the one or more operations on the digital model based on the decrypted results.

24. The one or more non-transitory computer-readable media of claim 23, further comprising generating audit data that tracks movement of the request across each cell in the multi-cellular environment for executing the one or more operations.

25. The one or more non-transitory computer-readable media of claim 19, wherein each cell of the multi-cellular environment comprises: one or more microservices and APIs for performing one or more operations on one or more digital models, and a splicer that enables each cell of the multi-cellular environment to communicate with one or more other cells.

\* \* \* \* \*